US006719902B1

(12) United States Patent
Alvarez et al.

(10) Patent No.: US 6,719,902 B1
(45) Date of Patent: Apr. 13, 2004

(54) FE(O)-BASED BIOREMEDIATION OF AQUIFERS CONTAMINATED WITH MIXED WASTES

(75) Inventors: Pedro J. Alvarez, Iowa City, IA (US); Brian A. Till, Milwaukee, WI (US); Lenly J Weathers, Cookeville, TN (US); Gene F. Parkin, Iowa City, IA (US); Jerald L. Schnoor, Iowa City, IA (US)

(73) Assignee: The University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 09/446,581

(22) PCT Filed: Apr. 24, 1998

(86) PCT No.: PCT/US98/08196

§ 371 (c)(1),
(2), (4) Date: Aug. 27, 2001

(87) PCT Pub. No.: WO98/49106

PCT Pub. Date: Nov. 5, 1998

Related U.S. Application Data

(60) Provisional application No. 60/044,810, filed on Apr. 25, 1997.

(51) Int. Cl.⁷ .............................. C02F 3/34; C02F 3/28
(52) U.S. Cl. .................. 210/601; 210/617; 210/631; 210/170; 210/903; 210/909; 210/913; 210/914; 435/176; 435/177; 405/128.45
(58) Field of Search ................................. 210/601, 170, 210/615–617, 631, 747, 150, 151, 903, 909, 912–914; 435/262, 262.5, 176, 177, 180; 405/128.15, 128.45

(56) References Cited

U.S. PATENT DOCUMENTS

| 4,493,895 A | * | 1/1985 | Colaruotolo et al. ........ 435/262 |
| 4,554,101 A | | 11/1985 | Hopp |
| 4,566,469 A | * | 1/1986 | Semp et al. ................. 131/308 |
| 4,839,052 A | * | 6/1989 | Maree .......................... 210/603 |
| 5,266,213 A | | 11/1993 | Gillham ....................... 210/747 |
| 5,318,699 A | | 6/1994 | Robertson et al. .......... 210/151 |
| 5,342,769 A | * | 8/1994 | Hunter et al. ................ 435/166 |
| 5,362,394 A | | 11/1994 | Blowes et al. .............. 210/617 |

(List continued on next page.)

FOREIGN PATENT DOCUMENTS

| EP | 0522946 | | 1/1993 |
| EP | 0595441 | | 5/1994 |
| JP | 52130150 | | 11/1977 |
| JP | 52-130150 | * | 11/1977 |
| JP | 02/119992 | | 5/1990 |
| JP | 2-119992 | * | 5/1990 |

OTHER PUBLICATIONS

Aguilar et al., "Degradation of volatile fatty acids by differently enriched methanogenic cultues: Kinetics and inhibition," *Water Res.*, 29(2):505–509, 1995.

(List continued on next page.)

Primary Examiner—Fred G. Prince
(74) Attorney, Agent, or Firm—Fulbright & Jaworski, LLP

(57) ABSTRACT

Disclosed are methods, devices and apparatus for bioremediation of mixed waste aquifers, based on a synergistic combination of reductive treatment using zero-valent iron and anaerobic biotransformations. Also disclosed are methods for in situ and ex situ remediation of groundwater and wastewater via these iron-bacterial compositions in a variety of devices including batch reactors, permeable and semipermeable reactive barriers, flow-through reactors, fluidized bed reactors, and sediment tanks.

41 Claims, 16 Drawing Sheets

U.S. PATENT DOCUMENTS

Figure 1:
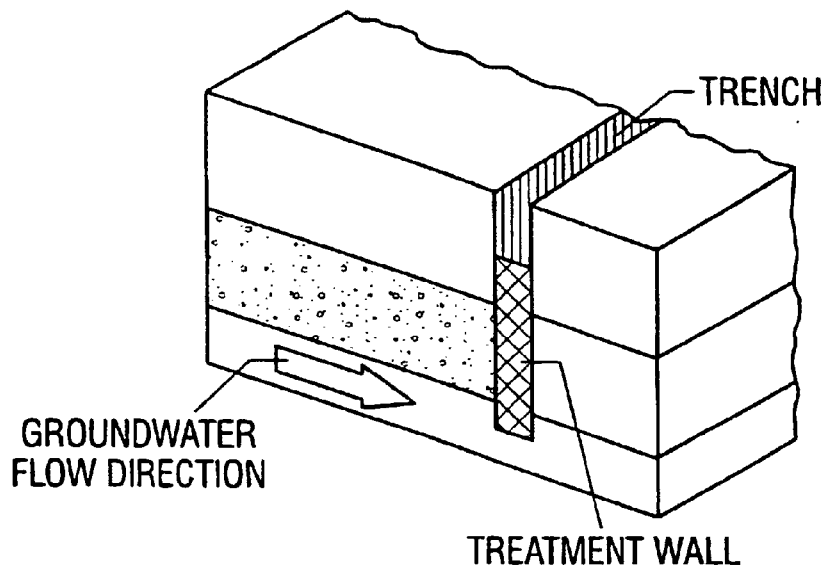

| | | | | | |
|---|---|---|---|---|---|
| 5,415,777 | A | * | 5/1995 | Krempen et al. | 435/262.5 |
| 5,510,033 | A | * | 4/1996 | Ensley et al. | 210/611 |
| 5,512,479 | A | * | 4/1996 | Steffan | 435/262.5 |
| 5,514,279 | A | | 5/1996 | Blowes et al. | 210/617 |
| 5,534,154 | A | | 7/1996 | Gillham | 210/668 |
| 5,587,317 | A | * | 12/1996 | Odom | 435/262 |
| 5,618,427 | A | * | 4/1997 | Seech et al. | 210/601 |
| 5,679,568 | A | * | 10/1997 | Imamura et al. | 435/262.5 |
| 5,733,067 | A | * | 3/1998 | Hunt et al. | 405/128.5 |
| 5,789,649 | A | * | 8/1998 | Batchelor et al. | 588/206 |
| 5,833,855 | A | * | 11/1998 | Saunders | 210/611 |
| 5,908,267 | A | * | 6/1999 | Schuring et al. | 405/128.65 |

OTHER PUBLICATIONS

Assaf–Anid et al.,"Reductive dechlorination of carbon tetrachloride by cobalmin(II) in the presence of dithiothreitol: Mechanistic study, effect of redox potential and pH," *Environ. Sci. Technol.*, 28(2):246–250, 1994.

Belay and Daniels, "Elemental metals as electron sources for biological methane formation from carbon dioxide," *Antonie van Leeuwenhoek*, 57(1):1–8, 1990.

Blowes et al., "Passive remediation of groundwater using in situ treatment curtains," *In: Geoenvironment 2000: Characterization, Containment, Remediation, and Performance in Environmental Geotechnics*, Yalcin BA, Daniel DE, eds., Geotechnical Special Publication No. 46, American Society of Civil Engineers, New York, 2:1608–1621, 1995.

Chiu and Reinhard, "Metallocoenzyme–mediated reductive transformation of carbon tetrachloride in titanium (III) citrate aqueous solution," *Environ. Sci. Technol.*, 29(3):595–603, 1995.

Chiu and Reinhard, "Transformation of carbon tetrachloride by reduced vitamin $B_{12}$ in aqueous cysteine solution," *Environ. Sci. Technol.*, 30:1882–1889, 1996.

Daniels et al., "Bacterial methanogenesis and growth from $CO_2$ with elemental iron as the sole source of electrons," *Science*, 237:509–511, 1987.

Doong and Wu, "Reductive dechlorination of chlorinated hydrocarbons in aqueous solutions containing ferrous and sulfide ions," *Chemosphere*, 24(8):1063–1075, 1992.

Freedman and Gossett, "Biodegradation of dichloromethane and its utilization as a growth substate under methanogenic conditions," *Appl. Environ. Microbiol.*, 57(10):2847–2857, 1991.

Gantzer and Wackett, "Reductive dechlorination catalyzed of bacterial transition–metal coenzymes," *Environ. Sci. Technol.*, 25(4):715–722, 1991.

Gillham and O'Hannesin, "Enhanced degradation of halogenated aliphatics by zero–valent iron," *Groundwater*, 32(6):958–967, 1994.

Gould, "The kinetics of hexavalent chromium reduction by metallic iron," *Water Res.*, 26:871–877, 1992.

Hansen et al., "Abiotic nitrate reduction to ammonium: Key role of green rust," *Envir. Sci. Technol.*, 30(6):2053–2056, 1996.

Helland et al., "Reductive dechlorination of carbon tetrachloride with elemental iron," *J. Hazard Mater.*, 41:205–216, 1995.

Holliger et al., "A highly purified enrichment culture couples the reductive dechlorination of tetrachloroethylene to growth," *Appl. Environ. Microbiol.*, 59:2991–2997, 1993.

Johnson et al., "Kinetics of halogenated organic compound degradation by iron metal." *Environ. Sci. Technol.*, 30:2634–2640, 1996.

Lewis, "Factors influencing the stability and properties of green rusts," *Advances in GeoEcology*, 30:345–372, 1997.

Matheson and Tratnyek, "Reductive dehalogenation of chlorinated methanes by iron metal," *Environ. Sci. Technol.*, 28:2045–2053, 1994.

Matheson and Tratnyek, "Abiotic and biotic processes affecting the dechlorination of chlorinated solvents by zero–valent iron," *Abstracts of Papers*, 20th ACS National Meeting, American Chemical Society, Mar. 13–17, 1994, Abstract No. 135.

Morrison et al., "Coupled Reaction/Transport Modeling of a Chemoical Barrier for Controlling Uranium(VI) contamination in Groundwater," *J. Contaminant Hydrology*, 17:343–363, 1995.

Myneni et al., "Abiotic selenium redox transformations in the presence of Fe(II,III) oxides," *Science*, 278:1106–1109, 1997.

O'Hannesin and Gillham, "In situ degradation of halogenated organics by permeable reaction wall," *EPA Groundwater Currents*, 542:1–2, 1993.

Olowe et al., "La présence simultanée de rouille verte 2 et de bactéries sulfato–réductrices en corrosion perforante de palplanches en zone portuaire," *C.R. Acad. Sci. Paris*, t. 314, Série II, p1. 1157–1163, 1992.

Orth and Gillham, "Dechlorination of trichloroethylene in aqueous solution using $Fe^0$," *Environ. Sci. Technol.*, 30:66–71, 1996.

Perkins et al., "Effects of electron donors and inhibitors on reductive dechlorination of 2,4,6–trichlorophenol," *Water Res.*, 28(10):2101–2107, 1994.

Powell et al., "Coupled iron corrosion and chromate reduction: mechanisms for subsurface remediation," *Environ.Sci. Technol.*, 29:1913–1922, 1995.

Powell & Puls,. "Proton Generation by Dissolution of Intrinsic or Augmented Aluminosilicate Ninerals for In Situ Contaminant Generation by Zero–Valence–State Iron," *Environ. Sci. Technol. 1997, 31*(8), 2224–2251.

Reardon, "Anaerobic corrosion of granular iron: measurement and interpretation of hydrogen evolution rates," *J. Environ. Sci. Technol.*, 29:2936–2945, 1996.

Roberts et al., "Reductive elimination of chlorinated ethylenes by zero–valent metals," *Environ. Sci. Technol.*, 30(8):2654–2659, 1996.

Stromeyer et al., "Dichloromethane utilized by an anaerobic mixed culture: acetogenesis and methanogenesis," Abstract, *Biodegradation*, 2(2):129–137, 1991.

Sweeny, "The reductive treatment of industrial wastewaters. II process applications," *AIChE Symp. Ser.*, 77:72–78, 1980.

Tatara et al., "Effects of medium and trace metals on kinetics of carbon tetrachloride transformation by Psudomonas sp. strain KC," *Appl. Environ. Microbiol.*, 59(7):2126–2131, 1993.

Thiel, "The effect of methane analogues on methanogenesis in anaerobic digestion," *Water Res.*, 3:215–223, 1969.

Till et al., "Fe(0)–supported autotrophic denitrification," *Environ. Sci. Technol.*, 32(5), 634–639, 1998.

Trolard et al., "Mise en évidence d'un constituant de type <<rouilles vertes <<dans les sols hydromorphes. Proposition de l'existence d'un nouveau minéral: la <<fougérite>>," Trolard, Abdelmoula, Bourrié, Humbert and Génin, *C.R. Acad. Sci. Paris*, t. 323, série II a, p. 1015–1022, 1996.

Vidic and Pohland, "Treatment Walls", *Groundwater Remediation Technologies Analysis Center*, Technology Evaluation Report TE–96–01. Uiniversity of Pittsburgh, Pittsburgh, PA, Oct. 1996.

Weathers et al., "Chloroform cometabolism by a methanogenic consortium utilizing zero–valent iron as ultimate electron donor," *Abst. Gen. Meet. Am. Soc. Microbiol.*, 95(0):399, 1995.

Weathers, "Biological and metallic iron–promoted transformations of carbon tetrachloride and chloroform under methanogenic conditions," Ph.D. Dissertation, University of Iowa, 1995.

Weathers et al., "Methanogens couple anaerobic Fe(0) oxidation and $CHCl_3$ reduction," *Abst. Papers Am. Chem. Soc..*, 209(1–2):ENVR225, 1995.

Wild et al., "Anaerobic dechlorination of trichloroethene, tetrachloroethene and 1,2–dichloroethane by an acetogenic mixed culture in a fixed–bed reactor," Abstract, *Biodegradation*, 6(4):309–318, 1995.

Wong and Neumann, "Electric field mediated gene transfer," *Biochim. Biophys. Res. Commun.*, 107(2):584–587, 1982.

Yamamoto et al., "Kinetics and modeling of hexavalent chromium reduction in *Enterobacter cloacae*," *Biotechnol. Bioeng.*, 41:129–133, 1993.

Yang and Speece, "The effects of chloroform toxicity on methane fermentation," *Water Res.*, 20(10):1273–1280, 1986.

Holliger, "The anaerobic microbiology and biotreatment of chlorinated ethenes," *Curr. Opin. Biotechnol.*, 6:347–351, 1995.

Kaplan et al., "Formation of a barrier to groundwater contaminants by injection of zero–valent iron colloids: suspension properties," *Proc. In Situ Remediation: Scientific Basis for Current and Future Technologies Symposium. Thirty–third Hanford Symposium on Health and the Environment*; Nov. 7–11, 1994, Abstract and Table of contents from the Battelle website: www.battelle.org (Dec. 11, 2001).

MSE Technology Applications. "Analysis of Technologies for the Emplacement and Performance Assessment of Subsurface Reactive Barriers for DNAPL Containment". Report for U.S. Department of Energy (TTP# PEI–6–PL–341) under Contract No. DE–AC22–88ID12735, 1996. Abstract from US Dept. of Energy website (Nov. 1, 2001).

National Research Council, "Alternatives for groundwater cleanup," *Report of the National Academy of Science Committee on Groundwater Cleanup Alternatives*, National Academy Press, Washington, DC, 1994.

Zhang et al., "Enhancement of Fe(III), Co(III), and Cr(VI) reduction at elevated temperatures and by a thermophilic bacterium," *Appl. Biochem. Biotech.*, 57/58:923–932, 1996.

* cited by examiner

FE(O)-BASED BIOREMEDIATION OF AQUIFERS CONTAMINATED WITH MIXED WASTES

This is a 371 application of co-pending application Serial No. PCT/US98/08196, filed Apr. 24, 1998, which claims priority to U.S. provisional application No. 60/044,810, filed Apr. 25, 1997.

The present invention is a continuing application of U.S. Provisional Patent Application Serial No. 60/044,810 filed Apr. 25, 1997, the entire contents of which is specifically incorporated by reference in its entirety.

The United States government has rights in the present invention pursuant to Contract No. R-819653-01 from the Environmental Protection Agency.

BACKGROUND OF THE INVENTION

1.1 Field of the Invention

The present invention relates generally to the field of bioremediation. More particularly, it concerns compositions, methods and apparatus for the removal of nitrogenous and halocarbon pollutants from environmental sources including agricultural areas, soils, ground and surface water, sewage, sludges, landfill leachates, and wastewater. In particular embodiments, the invention discloses and claims compositions comprising zero-valent iron and hydrogenotrophic bacteria for use in removing target contaminants by a synergistic combination of abiotic and biological reductive mechanisms.

1.2 Description of Related Art

1.2.1 Abiotic Processes

Various abiotic processes have developed in recent years for the remediation of hazardous environmental pollutants (National Research Council, 1994). One process for abiotic remediation of organic and inorganic pollutants has been developed using zero-valent iron-[Fe(0)] mediated processes.

In this process, as elemental iron is oxidized (corrodes), electrons are released according to the following equations:

$$Fe^0 \rightarrow Fe^{2+} + 2e$$ (Equation 1)

These electrons are available for a variety of reduction-oxidation (redox) reactions. Water is reduced to produce hydrogen gas and alkalinity in the form of $OH^-$, with the net reaction resulting in a pH increase:

$$2H_2O + 2e^- \rightarrow H_2 + 2OH^-$$ (Equation 2)

$$Fe^0 + 2H_2O \rightarrow Fe^{2+} + H_2 + 2OH^-$$ (Equation 3)

Encouraging results in both laboratory and field experiments have stimulated a rapid increase in the use of Fe(0) as a reactive material to treat reducible contaminants (so-called reactive Fe(0) barriers). This approach has been used to degrade waste chlorinated solvents (e.g., Gillham and O'Hannesin, 1994; Johnson et al., 1996; Sweeny, 1980) and nitrate (Till et al., 1998). Reducible heavy metals such as Cr(VI) can also be removed from aqueous solution by reduction to less toxic forms (e.g., Cr(III)) and subsequent precipitation and immobilization, using Fe(0) as the sacrificial metal (Gould, 1982; Khudenko, 1987; Powell et al., 1995; Rickard and Fuerstran, 1968).

Semipermeable reactive Fe(0) barriers have been attractive for groundwater remediation in that they conserve energy and water, and through long-term low operating and maintenance costs, are considerably less costly than conventional cleanup methods. Fe(0) can be placed in the path of a contaminant plume, either on a trench (O'Hannesin and Gillham, 1992), buried as a broad continuous curtain (Blowes et al., 1995), or injected as colloids (Kaplan et al., 1994), to name a few options. However, the efficacy of Fe(0) systems can be limited by (site-specific) slow rates of reaction and by the potential accumulation of products of equal or greater toxicity (Matheson and Tratnyek, 1994; NRC, 1994; Roberts et al., 1996).

1.2.1.1 Chromium Remediation Using Abiotic Processes

Depending upon solution chemistry and pH, Cr(VI) can be present in the form of $CrO_4^{2-}$, $HCrO_4^-$, $H_2CrO_4$, and $Cr_2O_7^{2-}$. All of this hexavalent chromium species could be reduced to the less toxic, less mobile trivalent form, which is removed from solution as the hydroxide (i.e., $Cr(OH)_3$) under most conditions, using Fe(0) (Gould, 1982; Khudenko, 1987; Powell et al., 1995; Rickard and Fuerstran, 1968):

$$2Cr^{6+} + 6e^- \rightarrow 2Cr^{3+}$$ (Equation 4)

$$3Fe^0 \rightarrow 3Fe^{2+} + 6e^-$$ (Equation 5)

$$2Cr^{3+} + 6OH^- \rightarrow 2Cr(OH)_3$$ (Equation 6)

$$2Cr^{6+} + 3Fe^0 + 6OH^- \rightarrow 2Cr(OH)_3 + 3Fe^{2+}$$ (Equation 7)

The increase in pH caused by iron corrosion (Equation 3) is thus beneficial in removing Cr(III) from solution.

When present in the environment, it is possible for the various species of Cr(VI), and Cr(III) to be sorbed to soils and sediments. It has been shown that Cr(VI) can be reduced to Cr(III) spontaneously by soil organic matter and/or by microorganisms under reducing conditions (Wang et al., 1989; Ishibashi et al., 1990; Yamamoto et al., 1993). Similarly, it has been shown that U(VI) can be reduced to U(IV) by microorganisms (Lovely and Phillips, 1992a and 1992b; Gorby and Lovely, 1992; Thomas and Macaskie, 1996). Once Cr(VI) is reduced to Cr(III) whether by soil organic matter or zero-valent iron, it is highly unlikely (due to kinetic constraints) for it to be oxidized once again. Only in the presence of freshly precipitated manganese oxides ($MnO_2$) or a strong oxidant like Fenton's reagent (hydroxyl radicals) can Cr(III) be reoxidized.

Fe(0) has shown significant promise in reducing, and thus removing from solution, Cr(VI) (e.g., Blowes et al., 1995; Powell et al., 1995; Gould, 1982). Presently, however, only one field site (Elizabeth City, N.C., Coast Guard site) exists where a reactive Fe(0) barrier is being evaluated to contain and remediate a groundwater plume contaminated with both Cr(VI) and TCE. (Morrison and Spangler, Roy E. West Geotech, Grand Junction, Colo.).

1.2.1.2 Uranium Removal Using Abiotic Processes

Uranium generally exists as the uranyl cation ($UO_2^{2+}$) in soils and groundwaters. It is tightly bound to soil and aquifer media at pH values greater than 6.0. However, it can be complexed by sulfate and organic ligands as well. Longmire et al. (1990) found that the predominant species in acidic uranium mill tailings deposits of New Mexico and Colorado was uranyl disulfate, $UO_2(SO_4)_2^{2-}$; uranyl sulfate aqueous complex, $UO_2(SO_4)^0$, uranyl divalent cations, and uranyl biphosphate, $UO_2(HPO_4)_2^{2-}$; in that order. Once U(VI) is reduced to U(IV), it becomes much less mobile, similar to chromium. Immobilization is caused by the precipitation of uranium dioxide, and by strong sorption of U(IV) species to soils and sediments. Similar to Cr(III), once uranium has been reduced, it is not likely to become mobilized again unless the pH is reduced or a strong oxidizing agent is encountered. Treatment with zero-valent iron removes dissolved oxygen and increases the pH; both conditions which aid the chemical reduction of chromium and uranium and which keeps them immobilized.

Hexavalent uranium can also be reduced to the less mobile U(IV) form which is removed from solution as the oxide under most conditions:

$$U^{6+}+2e^-\rightarrow U^{4+} \tag{Equation 8}$$

$$U^{4+}+4OH^-\rightarrow UO_2+2H_2O \tag{Equation 9}$$

Here again, the increase in pH caused by Fe(0) corrosion (Equation 3) is conducive to U(IV) precipitation from solution (Lovely and Phillips, 1992a; Morrison et al., 1995; Thomas and Macaskie, 1996).

Unfortunately, no reports in the literature describe the use of reactive Fe(0) barriers to reduce and remove U(VI), although a pilot facility in Durango, Colo., is presently being tested (S. Morrison of Roy E. West Geotech, Grand Junction, Colo.).

1.2.1.3 Removal of Polychlorinated Organics Using Abiotic Processes

Polychlorinated organics can also be reduced using the $e^-$ generated by iron corrosion by replacing Cl atoms with hydrogen atoms. This form of reductive dechlorination is termed hydrogenolysis (Vogel et al., 1987). Using carbon tetrachloride (CT) as an example, first chloroform (CF) and then dichloromethane (DCM) are formed:

$$CCl_4+2e^-+H^+\rightarrow CHCl_3+Cl^- \tag{Equation 10}$$

$$CHCl_3+2e^-+H^+\rightarrow CH_2Cl_2+Cl^- \tag{Equation 11}$$

Several researches have shown that DCM is a "dead-end" product of abiotic treatment of CT or CF with Fe(0) (Helland et al., 1995; Matheson and Tratnyek, 1994). Thus, while abiotic processes are able to reduce some organic compounds, the process often results in endproducts which are toxic, themselves. As such, there are limitations to the use of abiotic processes alone in the remediation of organic compounds from the environment.

TCE is reportedly converted to ethene by hydrogenolysis using Fe(0), generally without the build-up of intermediates (Orth and Gillham, 1996), although trace amounts of chlorinated acetylenes could be formed by TCE dihaloelimination (Roberts et al., 1996). A simplified stoichiometry for TCE hydrogenolysis would be:

$$CHCl=CCl_2+6e^-+3H^+\rightarrow CH_2=CH_2+3Cl^- \tag{Equation 12}$$

$$3Fe^0\rightarrow 3Fe^{2+}+6e^- \tag{Equation 13}$$

$$CHCl=CCl_2+3Fe^0+3H^+\rightarrow CH_2=CH_2+3Fe^{2+}+3Cl^- \tag{Equation 14}$$

Unfortunately, the fact that each of the above reactions is thermodynamically feasible does not guarantee that the reactions are feasible for the removal of such compounds from solution using only abiotic processes. The contaminants must be sufficiently reactive that suitable transformation take place during the time the contaminated groundwater flows through the treatment zone. Moreover, observed removal rates may reflect a number of processes other than chemical reaction at the Fe(0) surface, including mass transport to the surface, adsorption of reactants, and desorption and mass transport of products from the surface (Helland et al., 1995). A positive correlation has been suggested between the mixing rate in batch reactors and reductive dechlorination rate (Matteson and Tratnyek, 1984), presumably due to faster mass transport resulting from the decreased thickness of the diffusion layer. That removal rates might be mass transfer rather than reaction limited, suggests the importance of enhancing contact between Fe(0) and the target contaminant.

1.2.2 Biotic Processes

1.2.2.1 Biotic Removal of Chromium and Uranium

Biotic reduction of Cr(VI) and U(VI) may be indirect or direct. Microbes can be indirectly responsible for metal reduction by producing relatively strong reductants like $H_2S$ from $SO_4^{2-}$ and Fe(II) from Fe(III). In most cases, abiotic reduction using $H_2S$ and Fe(II) is much slower than direct biotic reduction (Kriegman-King and Reinhard, 1994; Doong and Wu, 1992). A number of studies have shown that several microorganisms can directly (intracellularly) reduce Cr(VI) to Cr(III) using Cr(VI) as an electron acceptor during microbial respiration (Wang et al., 1989; Ishibashi et al., 1990; Yamamoto et al., 1993). Similarly, it has been shown that U(VI) can be reduced to U(IV) by microorganisms (Lovely and Phillips, 1992a and 1992b; Gorby and Lovely, 1992; Thomas and Macaskie, 1996). For the most part, metal reductases have been implicated in these studies. However, there is evidence that such metals can be used as electron acceptors for growth (Ormerod, 1991). These organisms, GS-15 and *Shewanella putrefaciens*, can also use nitrate and Fe(III) as terminal electron acceptors.

1.2.2.2 Biotic Processes for Remediating Halocarbons

It has also been shown that a variety of microbes can catalyze the reduction of many chlorinated hydrocarbons. A variety of chlorinated aliphatic hydrocarbons are biotransformed by pure and mixed methanogenic (Bagley and Gossett, 1996; Bouwer et al., 1981; Bouwer and McCarty, 1983; Gossett, 1985; Egli et al., 1987; Hughes and Parkin, 1996; Krone et al., 1989a;b; Mikesell and Boyd, 1990) and non-methanogenic, anaerobic cultures (Egli et al., 1987; Egli et al., 1988; Galli and McCarty, 1989; Egli et al., 1990; Fathepure and Tiedje, 1994). Unfortunately, however, with most biological reactions, when reductive dechlorination is the dominant pathway, intermediates will accumulate (e.g., chloroform and dichloromethane from CT biotransformation; vinyl chloride and the dichloroethenes from TCE and PCE biotransformation). These metabolites are often of more concern than the parent compounds, and thus, the art remains limited with respect to biological treatment of chlorinated hydrocarbons. It should be noted, however, that tetrachloroethene (PCE) and TCE can be used as electron acceptors for growth of some anaerobic organisms with the end products being ethene or ethane (Holliger et al., 1993; Holliger, 1995; Scholz-Muramatsu et al., 1995).

Anaerobic conditions are required to produce the $H_2$ from F(0) corrosion and support the growth of useful anaerobic bacteria. Dissolved oxygen, which may be present is some aquifers, is toxic to anaerobes and may inhibit their activity. Nevertheless, oxygen is quickly depleted by aerobic corrosion of Fe(0) as shown by Helland et al. (1995):

$$2Fe^0+O_2+4H^+\rightarrow 2Fe^{2+}+2H_2O \tag{Equation 15}$$

This reaction induces anoxic conditions that are favorable for anaerobic biotransformations.

1.2.2.3 Chlorinated Solvents

Chlorinated solvents such as trichloroethylene (TCE), heavy metals such as hexavalent chromium, and radionuclides such as hexavalent uranium, are among the most common contaminants found at DOE sites (Riley et al., 1992). Mixtures of such contaminants have been found in soils and sediments at 11 DOE facilities and in the groundwater at 29 sites. While numerous physical-chemical and biological processes have been proposed to manage DOE contaminated sites, many of these approaches are only marginally cost-effective and/or have detrimental side effects on environmental quality, particularly pump-and-treat processes (National Academy of Science, 1992). Consequently, there is a need to develop improved alternatives for the remediation of sites containing these contaminants.

One alternative was the use of elemental (or zero-valent) iron (Fe(0)) in the development of strictly abiotic processes. Although the reactivity of Fe(0) with chlorinated compounds was recognized as early as 1925 (Rhodes and Carty, 1925), only recently has this process received considerable attention for treating waste chlorinated solvents (e.g., Gillham and O'Hannesin, 1994; Johnson et al., 1996; Sweeny et al., 1980). Reducible heavy metal ions (e.g., hexavalent chromium) and nucleotides (e.g., hexavalent uranium) can also be removed from aqueous solution by reduction and subsequent precipitation using Fe(0) as the sacrificial metal (i.e. "cementation") (e.g., Gould, 1982; Khudenko, 1987; Rickard and Fuerstran, 1968). Results from laboratory and pilot studies awakened considerable national and international interest in the use of Fe(0) as a reactive material (so-called reactive Fe(0) barriers) to minimize subsurface migration of such reducible contaminants. Passive, semipermeable reactive walls are also particularly attractive in that they conserve energy and water, and through long-term low operating and maintenance costs, are considerably less costly than conventional cleanup methods.

Nevertheless, knowledge on the applicability and limitations of reactive Fe(0) barriers is limited, and the feasibility of this process to treat mixtures of chlorinated solvents, heavy metals, and radionuclides has not been demonstrated in the art. One limitation of abiotic reduction with Fe(0) alone to remove some polychlorinated compounds such as carbon tetrachloride is the accumulation of transformation products of equal or perhaps greater toxicity (Helland et al., 1995; Matheson and Tratnyek, 1994; Roberts et al., 1996).

Several reports have suggested that a wide variety of microbes can facilitate reductive dechlorination of polychlorinated organics (see e.g., Bouwer et al., 1981; Krone et al., 1989a;b; Holliger et al., 1993; Vogel et al., 1987). Some microbes have also been shown to facilitate the reduction and immobilization of reducible heavy metal ions, e.g., Cr(VI) (Wang et al., 1989) and radionuclides e.g., U(VI) (Lovely and Phillips, 1992a; 1992b). Anaerobic microorganisms have also been shown to respire nitrate and sulfate originating from waste acids at uranium mill tailings (e.g., Durango, Colo., and Tuba City, Ariz.), which is a major challenge facing the Uranium Mill Tailing Remediation Act (UMTRA) program. However, the availability of appropriate primary substrates has limited the success of these biotic transformations in situ. In particular, many of these contaminants are toxic to a variety of bacterial strains when present at high concentrations, and the rate of remediation by these organisms has been disappointing.

1.3 Deficiencies in the Prior Art

There are several chemical and biological technologies that remove nitrates, and other inorganic compounds as well as organic compounds from water and wastewaters. However, these processes are marginally cost-effective and/or have detrimental side-effects on water quality. For example, physical-chemical processes involving membrane filtration technologies or ion exchange resins are often prohibitively expensive and merely transfer the inorganics, such as nitrates, from one phase to another, thus creating a disposal problem, and creating large quantities of brines.

While biological denitrification processes can convert nitrate to innocuous dinitrogen gas and are typically less expensive, they have adverse side-effects on water quality due to residual organic compounds used to support heterotrophic biological activity and excessive biomass production potentially contaminating the treated water. Therefore, what is lacking in the prior art are effective means for the bioremediation of aqueous environments, particularly with respect to denitrification and the removal of organic compounds such as halocarbons, using systems which do not adversely affect the water quality.

Unfortunately, the efficacy of strictly abiotic processes relying on Fe(0) alone is limited by (site-specific) slow rates of reaction and by the accumulation of products of equal or greater toxicity than the pollutants to be remediated (Matheson and Tratnyek, 1994; NRC, 1994; Roberts et al., 1996). Early work by scientists suggested the coupling of anaerobic oxidation of Fe(0) to a reduction of chloroform was possible using methanogenic bacteria, but no evidence suggested the use of such synergistic processes for inorganic compounds, or organic compounds other than chloroform (Weathers et al., 1995a;b)

2.0 Summary of the Invention

The present invention overcomes these and other limitations in the prior art by combining Fe(0) technologies with hydrogenotrophic microorganisms to exploit favorable biogeochemical interactions to detoxifying a variety of inorganic and organic compounds. The inventors' suprising finding that such biogeochemical interactions could facilitate the reduction of not only inorganic and metal-ion containing compounds, but also haloaromatic, nitroaromatic, and organic pesticides has facilitated a revolutionary advance in the area of microbial-based bioremediation methods. Disclosed and claimed herein are devices and methods for the bioremediation of environmental sites and aqueous solutions using a synergistic combination of biotic and abiotic processes. In particular, the invention concerns iron-supported autotrophic methods which utilize a device comprising a composition containing zero-valent iron and a culture of one or more species of hydrogenotrophic bacteria to remove target contaminants.

2.1 Hydrogenotrophic Bacterial/Zero-Valent Iron Devices

In a first embodiment, the invention concerns a device which comprises a composition of zero-valent iron and a culture of one or more hydrogenotrophic bacteria. The hydrogenotrophic bacteria preferably comprise one or more species of bacteria selected from the group consisting of Acetobacterium spp., Achromobacter spp., Aeromonas spp., Acinetobacter spp., Aureobacterium spp., Bacillus spp., Comamonas spp., Dehalobacter spp., Dehalospirillum spp., Dehalococcoide spp., Desulfurosarcina spp., Desulfomonile spp., *Desulfobacterium* spp., *Enterobacter* spp., *Hydrogenobacter* spp., *Methanosarcina* spp., *Pseudomonas* spp., *Shewanella* spp., *Methanosarcina* spp., *Micrococcus* spp., and *Paracoccus* spp. Alternatively, hydrogenotrophic bacteria present in anaerobic sludge or ariaerobic sediments may also be used in the practice of the invention.

Exemplary hydrogenotrophic bacteria include one or more strains of bacteria selected from the group consisting of *Acetobacterium woodi, Aeromonas hydrophila, Aeromonas sobria, Alcaligenes eutrophus, Comamonas acidovorans, Dehalococcoide resirictus, Dehalococcoide multivorans, Dehalococcoide ethenogene, Desulfobacterium tiedje, Enterobacter agglomerans, Hydrogenobacter thermophilus, Methanosarcina barkeri, Methanosarcina mazei, Methanosarcina thermophila, Paracoccus denitrificans, Pseudomonas aureofaciens, Pseudomonas maltophilia, Pseudomonas mendocina,* and *Shewanella putrefaciens.*

In illustrative embodiments, the inventors have shown that hydrogenotrophic bacterial stains such as *Paracoccus denitrificans* ATCC17741, *Paracoccus denitrificans* ATCC35512, *Paracoccus denitrificans* ATCC13543, or *Paracoccus denitrificans* ATCC19367 are particularly useful in formulating the compositions of the invention. In certain embodiments, the inventors contemplate the use of a mixed culture of one or more of the disclosed microorganisms. Such mixed cultures may comprise two or more hydrogenotrophic organisms, and may also include one or more strains, species, or genera of non-hydrogenotrophic bacteria.

The zero-valent iron of the composition is preferably iron, iron alloy, or iron bimetal. in It may be in the form of metal filings, shavings, turnings, powder, mesh, steel wool, beads, rods, or pellets (exemplary sources include e.g, Malinkrodt, Fisher Scientific, Master Builder, Aldrich Chemical Co., scrap metal suppliers, and the like). Iron bimetallics, composed of a combination of Fe(0) and any of the following: Ni(0), Zn(0), Pt(0), and Pd(0), are also desirable for the compositions and processes of the invention, as are iron-based metallic alloys. The metal may be immobilized in a gel, matrix, or other medium, may be in combination with one or more zeolites or minerals, and may be embedded, or immobilized onto glass, ceramic, cloth, plastic, fiber, nonmetal, metalloids, crystals, polymers, and the like. In fact, any formulation of the zero-valent iron which permits contact with or proximity to the hydrogenotrophic bacterial culture, and which permits or facilitates the oxidation of the metal and the liberation of hydrogen gas to be uptaken and utilized by the bacterial culture is contemplated by the inventors to be useful in formulating the particular iron-culture composition.

In preferred embodiments the culture of hydrogenotrophic bacteria (either alone or in combination with other microorganisms) is immobilized, mixed with, or in close proximity to the solid or semi-solid substrate(s) that comprise the Fe(0) compound. The solid substrate may be, but is not limited to, matrices, columns, chromatographic media, glass or plastic beads, plates or surfaces, acrylic beads, acrylamides, polyacrylamides, beaded agarose, Sepharose, tubing, vials, metal supports, mesh, fibers, polymers, ceramics, or cloth and the like. The Fe(0) component may be attached to the solid substrate by any suitable means known to those of skill in the art. Alternatively, the iron itself, or the device housing may serve as a substrate for the growth of the bacterial cells. The device may be a cartridge, a filter, a vessel (including e.g., a reactor, flask, beaker, funnel, bottle, cannister, or tank), a flow-through tubing, radiator, fermenter, or such like. In the case of in situ remediation, the device may be comprised within a system or remediation apparatus, and may comprise a reactive barrier, a membrane, a cylindrical barrier, a gate-and-funnel apparatus, or any other apparatus suitable for placement in an environmental site, and suitable for providing a means for containing the bacterial-Fe(0) composition within the device.

The Fe(0)-containing compound may typically be present at a concentration of from between about 1% and about 99%, more preferably from between about 10% and about 80%, or more preferably from between about 15% and about 50% or so by weight. The iron compound may be alone, or may be added to a porous medium or semi-porous substrate. This medium may contain one or more aluminosilicate minerals (e.g., bentonite, montmorillonite, kaolinite, gibbsite, microline feldspar, albite feldspar) to enhance proton generation at the Fe(0) surface and accelerate corrosion, as described by Powell et al. (1997). The porous medium may also be amended with one or more zeolite minerals to retard the movement of halogenated and nitrated organic contaminants through reactive barriers. This increases both retention time and the removal efficiency. The medium may be formulated to promote adherence by the bacterial culture to the iron substrate, and may be formulated to promote growth or survival of the bacterial culture. Optionally, the medium may be formulated to contain one or more antifungal, antiviral, or antiparasitic agents to retard or prevent the growth of fungi, virus, or parasites in the composition. Also optionally, the composition may be augmented to provide one or more nutrients, vitamins, minerals, or substrates for utilization by the microbial colony. In certain instances, sorbants, such as charcoal, zeolites, or the like, may be added to the composition.

2.2 Methods for Bioremediation

In a second embodiment, the invention provides methods for detoxifying, decontaminating, altering, removing or reducing the concentration of one or more organic or inorganic compounds from an aqueous solution, leachate, runoff, aquifer, groundwater, surface water, well water, an environmental site, soils, and/or agricultural or industrial sources. In particular, compositions and methods are provided for removing, detoxifying, or reducing the concentration of one or more inorganic or organic compound (including nitrates, nitrites, sulfates, sulfites, strontium-, cesium-, chromium- and uranium-containing compounds, halocarbons, haloaromatics, nitroaromatics, and compounds containing one or more nitro- or nitroso-groups) from one or more such site. The methods encompass both in situ and ex situ remediation procedures, and provide both apparatus for large-scale remediation, and devices for remediation of particular pollutants. The inorganic and organic compounds may be naturally occuring pollutants, or may be introduced into the site by the hand of man. The compounds may be present in one or more sites, and may be present in such sites either in pure or nearly-pure form, or may be present along with a plurality of toxic or polluting compounds. Examples of such pollutants may include herbicides, pesticides, industrial chemicals, chemical manufacturing byproducts, byproducts of natural decomposition processes, human or non human wastes, landfill components, mining wastes or runoff, agricultural leachates, industrial runoff, fertilizers and fertilizer byproducts, poisons, and the like. Such pollutants may be present in an enviromental site as the result of a chemical spill, industrial or agricultural accident, pipeline and storage tank failures, derailment of train cars, accidents involving motorized transport of chemicals, explosions, storage tank ruptures, acts of sabotage, and the like.

In an overall and general sense, the methods of the invention generally involve identifying or selecting an aqueous solution or a soil sample or an environmental site that is known to contain, or suspected of containing, or shown to contain, or shown to be susceptible to pollution by, one or more of the inorganic or organic contaminants as disclosed herein, and contacting the solution, soil, or site with a composition comprising a culture of one or more hydrogenotrophic bacteria and a zero-valent iron composition. The aqueous solution may be present in a pipeline, a water or sewage treatment facility, an aqueduct, drainage pond, settling basin, reservoir, storage vessel, or other man-made facility or the like. Alternatively, the aqueous solution may be an environmental site such as a lake, creek, river, stream, aquifer, pond, drainage ditch, or part of an agricultural area, irrigation system, industrial waste facility, landfill, or the like. The environmental site may include any of these areas, and may also include soils, subsurface areas, aquifer recharge zones, leachate areas, embankments in proximity to agricultural sites, water sources, groundwaters, wells, and the like. The environmental site may be defined as, or may be in proximity to, an industrial plant, a treatment plant, a mine, or mining facility, a processing plant, a construction site, a ranch, farm, or cultivated region, a potable or non-potable water supply, a pipeline or utility supply region, sewage facilities, drains, or pipelines, culverts, basins, storm drains, or flood plain control systems. In fact, the inventors contemplate that any site or aqueous solution that is suspected of containing, or is susceptible to pollution by, or is in proximity to a region either contaminated with, or polluted by, one or more inorganic and organic compounds may be a site chosen for remediation using the disclosed methods and compositions.

In certain embodiments, it will be preferable to provide devices which comprise the disclosed compositions to a source to be remediated. This is particularly preferred with the treatment methods are in situ, such as reactive barriers, and the like which are placed into a particular polluted site. Alternatively, where ex situ treatment is desired (e.g., in the treatment of water supplies, pipelines, drainage or collection facilities, storage tanks, sewage treatment plants, etc.) the inventors contemplate the use of the compositions in the manufacture of apparatus and water treatment devices to detoxify such systems. This is particularly desirable in the manufacture of water treatment cartridges, treatment facility machinery, and other apparatus which may be utilized to treat a contaminated sample not present in its native environment.

In one embodiment, the invention provides a method for removing or detoxifying nitroaromatic compounds from an aqueous solution. The method generally involves contacting an aqueous solution suspected of containing a nitroaromatic compound (such as trinitrotoluene, RDX, HMX, 2-aminodintrotoluene, 4-aminodinitrotoluene, and parathion) with a composition consisting of a culture of one or more hydrogenotrophic bacteria and an Fe(0) composition.

In a further embodiment, the invention provides a method for removing or dehalogenating a halocarbon in an aqueous solution. This method generally involves contacting an aqueous solution suspected of containing a halocarbon, such as chlorinated benzenes, trichloroethylene, perchloroethylene, dichloroethylene, vinyl chloride, chloroethane, bromoform, dichlorodifluoromethane, trihalomethanes, tetrachlorodibenzodioxin pentachlorophenol, chlorobenzoates, atrazine, 1,1,1-TCA, $CCl_4$, $CHCl_3$, DCM, or a PCB, with a composition comprising one or more autotrophic bacteria and an Fe(0) composition.

A further aspect of the invention is a method for removing, detoxifying, or reducing the concentration of a poison, herbicide fungicide, nematocide, or pesticide in an aqueous solution or an environmental site. This method generally involves contacting the solution or site suspected of containing such a chemical with a composition comprising one or more hydrogenotrophic bacteria and Fe(0). Exemplary pesticides remediable by these methods include methoxyclor, alachlor, metolachlor, lindane, DDT, DDE, DDD, dieldrin, aldrin, heptachlor, chlordane, 2,4-dichlorophenoxyacetic acid, 2,4,5-trichlorophenoxyacetic acid and atrazine.

In another embodiment, the invention provides a method for detoxifying, removing or reducing the concentration of redox-sensitive metal ions, such as strontium (II), cesium (I), chromium (VI), uranium (VI), technetium ( ), silver (I), or mercury (II) ions in an aqueous solution or an environmental site. This method generally involves contacting the solution or site suspected of containing one or more of such ions, either free in solution or complexed by organic ligands, with a composition comprising one or more hydrogenotrophic bacteria and Fe(0).

In a further embodiment, the invention provides a method for removing, detoxifying, or reducing the concentration of an inorganic compound such as nitrite, nitrate, sulfite, or sulfate in an aqueous solution or an environemental site. This method comprises contacting the solution or site suspected of containing such an inorganic compound with a composition comprising one or more hydrogenotrophic bacteria and Fe(0).

Another aspect of the invention is a method for reducing a nitroaromatic or a haloaromatic compound in a sample. The method involves selecting or identifying a sample that contains or is suspected of containing one or more such compounds with a composition comprising one or more hydrogenotrophic bacteria and Fe(0).

The present invention further provides methods for the bioaugmentation of in situ reactive permeable barriers, packed or fluidized bed reactors for industrial wastewater or landfill leachate treatment, sand filtration technologies for drinking water treatment, anaerobic digestion for sludge treatment, cylindrical reactive barriers surrounding groundwater wells for well head protection, and combinational approaches using membrane technologies well-known in the art for purification and treatment of water, and in particular, municipal, potable, or water suitable for animal and human consumption.

The efficiency of each method may be calculated as the ratio of the amount of contaminant removed divided by the amount of contaminant initially present in the sample. The rate of decomination may be estimated as the amount of contaminant removed divided by its retention time in the particular treatment zone utilized for remediation. The amount of contaminants present in a site and the amount remaining in a site following treatment may be measured using standard analytical techniques developed for each of the particular contaminants.

2.3 Apparatus and Devices for Synergistic Bioremediation

The inventors contemplate at least two different approaches for employing the present methods for the bioremediation of water, agricultural extracts or soil leachates, surficial sediments, surface waters, aquifers, groundwaters, springs, and other environmental aqueous areas contaminated with pollutants which are remediable utilizing these methods.

Figure 15A:
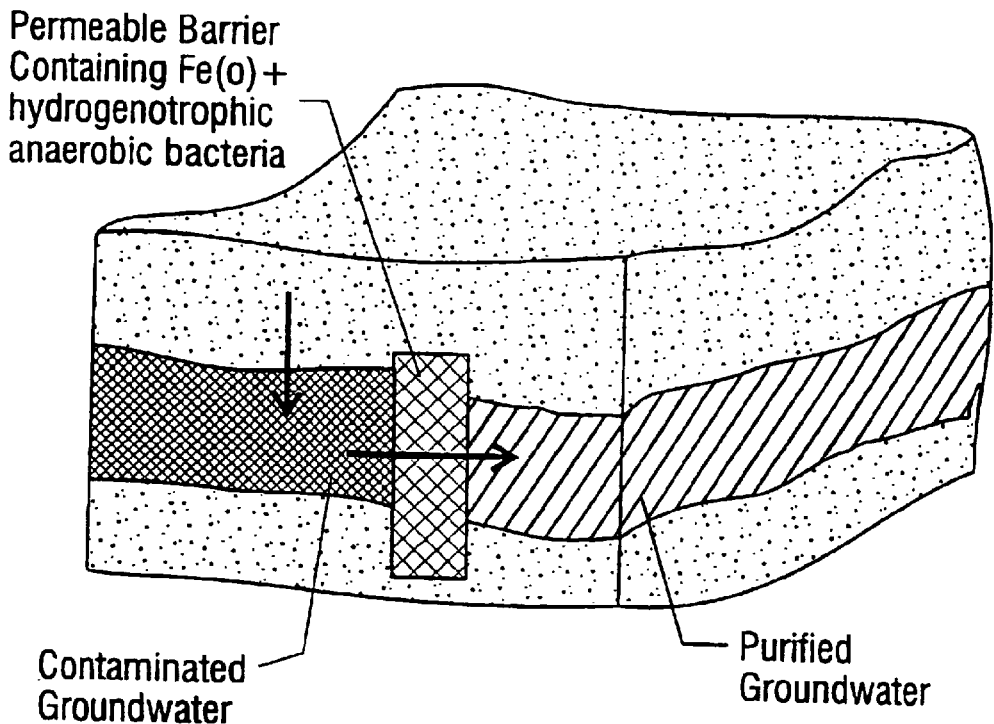
Figure 15B:
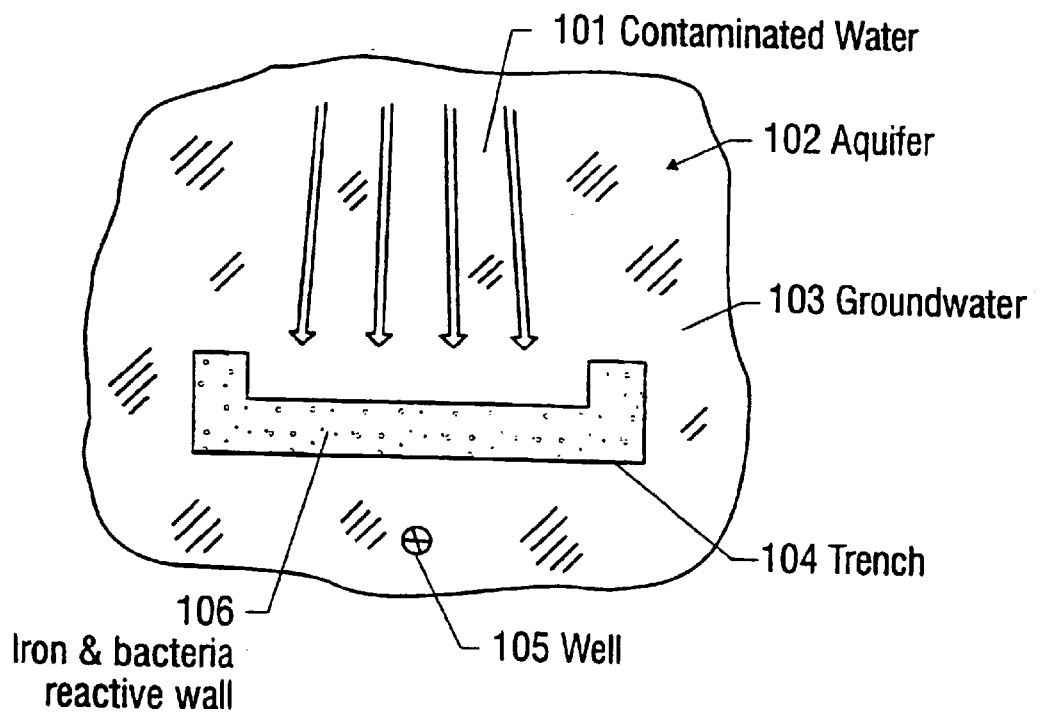
Figure 15C:
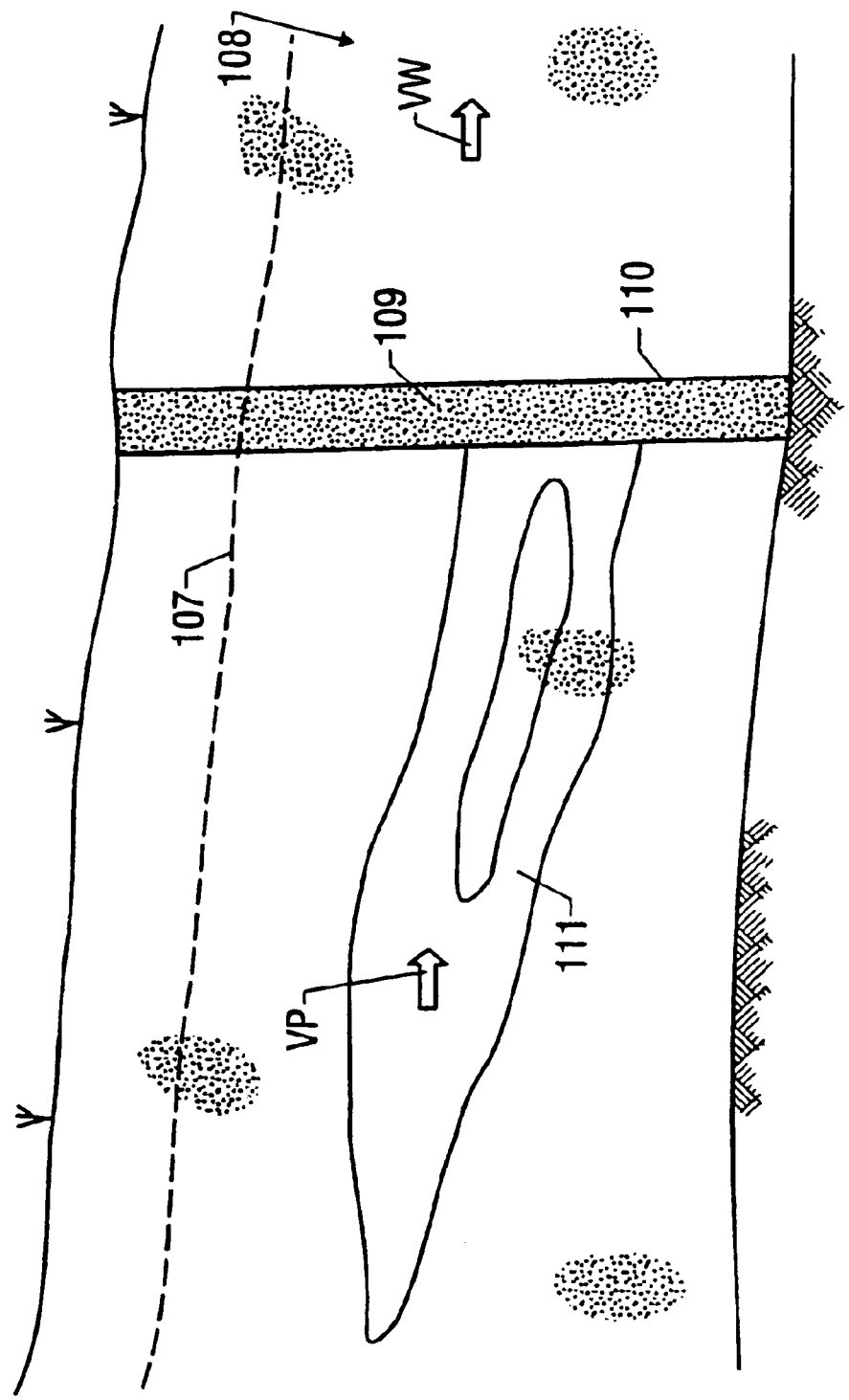

In one embodiment, the invention provides in situ remediation methods, and in particular, the use of permeable and semipermeable barriers. In situ permeable barriers, such as those described in Great Britain Patents GB 2238533A and GB 2255081A represent illustrative embodiments adaptable to the methods of the present invention. The disclosed technique is substantially improved using the present method through the pumping of bacteria either into the groundwater up-gradient from the permeable barrier, or directly into the barrier (FIG. 15A, FIG. 15B, and FIG. 15C). Preferred permeable barrier dimensions range from about 2 to about 6 ft thick, about 25 to about 50 ft long, and from about 15 to about 30 ft deep.

In another embodiment, the invention provides methods and apparatus comprising a treatment wall in a trench. In the simplest case, a trench of the appropriate width can be excavated to intercept the contaminated strata and backfilled with reactive material. The reactive material would consist of Fe(0) mixed with some of the alumniosilicate and/or zeolite minerals and with some anaerobic hydrogenotrophic bacteria mentioned previously (FIG. 2).

Shoring of the trench and use of an appropriate slurry or steel sheet piling may be required for excavation to depths greater than 10 feet. Unlike conventional approaches for groundwater cut-off walls that utilize a soil-bentonite slurry, installation of permeable treatment walls may require the use of biodegradable polymers instead of bentonite or cement to avoid the problem of plugging the wall with residual slurry material (Vidic and Pohland, 1996).

To overcome potential limitations to the life expectancy of the added Fe(0), the reactive media can be placed in the subsurface in removable cassettes, as described by MSE (1996). A temporary sheet pile box or a larger diameter caisson can be installed into the subsurface and the screen panels can be placed on the up- and down-gradient sides, while impermeable panels are placed on the lateral sides. Steel rail guides for the cassettes are installed within this interior compartment and the temporary sheet piles or caisson are removed. The cassette can be a steel frame box (e.g., 8 ft long, 5 ft wide, 1.5 ft thick) with two opposing screened sides and two impermeable sides which is filled with the reactive media and lowered into the cavity. By allowing replacement of cassettes with depleted reactive media, the remediation system operation life can be extended near indefinitely.

Figure 3:
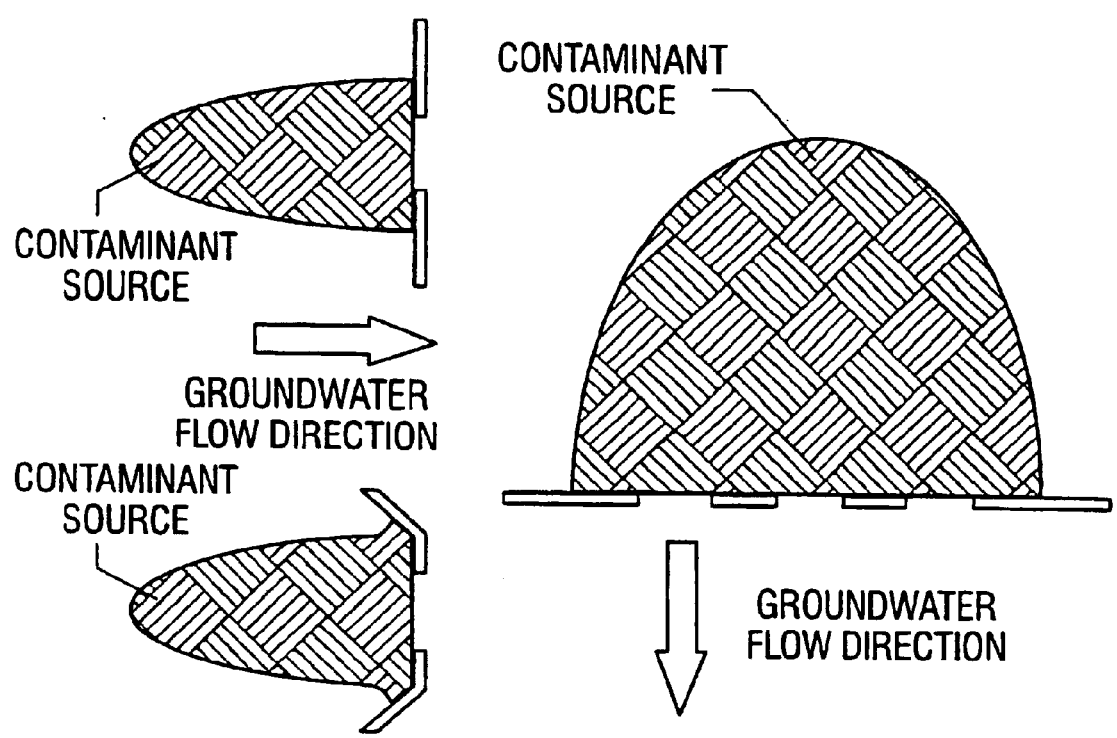

In a further embodiment, the invention provides methods and apparatus using an injected treatment zone. A treatment zone which (unlike the treatment wall) is not confined within strict boundaries can be established by using injection wells or by hydraulic fracturing (FIG. 3).

Well systems typically involve injection of fluids or fluid/particulate mixtures for distribution into a treatment zone within the target area of the aquifer (Vidic and Pohland, 1996). Potential advantages of this approach are that there is no need to construct a trench and possible aquifer access at greater depths.

In a further embodiment, the invention provides methods and apparatus using a "funnel and gate" system: In these embodiments, low-permeability cut-off walls (e.g., $10^{-6}$ cm/s) could be installed with gaps that contain in situ reactive zones (FIG. 4). Cut-off walls (the funnel) modify flow patterns so that groundwater primarily flows through high conductivity gaps (the gates). The cut-off wall could be slurry walls, sheet piles, or solid admixtures applied by soil mixing or jet grouting. The gate would consist of a treatment wall similar to those described above.

Alternatively, in situ remediation may be achieved using barrier technologies such as that of and the compositions of the present invention may also be placed in the path of a contaminant plume, either on a trench (O'Hannesin and Gillham, 1992), buried as a broad continuous curtain (Blowes et al., 1995), or injected as colloids (Kaplan et al., 1994).

In general, these methods involved the use of a large plastic wall or retainer, which is inserted into the subsurface, for example, in a "funnel and gate" design. This method permits the installation and removal of one or more cartridges into the system, without the need for changing the entire system. In this scheme, the inventors contemplate utilizing one or more cartridges which each comprise an Fe(0) substrate and an autotrophic bacterial population. Then, if the bacterial culture or iron substrate needs amending, replenishing, or replacement, the cartridge may be retrieved and a new one re-inserted with fresh substrate and microorganisms. When indicated, natural zeolite materials may be used within the matrix of these reactive barriers to sorb target pollutants and allow for a longer retention time, thus allowing for thinner barriers.

The second general embodiment concerns ex situ treatment methods and devices. Ex situ treatment includes various bioreactor modes and schemes such as sequencing batch reactors (SBR) (FIG. 16), fluidized beds (FIG. 17), and flow-through packed columns (FIG. 18).

The SBR is a periodically operated batch, fill-and-draw reactor containing a support structure for Fe(0) and the bacteria (FIG. 13). Each reactor in an SBR system has five discrete cycles in each cycle. For a nitrate removal scheme these would include, (i) fill/deoxygenate, anaerobic stir and react, (iii) settle, (iv) decant, and (v) idle, cycle adjustment and waste sludge. An advantage of this type of treatment scheme is the flexibility in reaction times depending on the waste being treated. Fluidized bed (FIG. 14) and flow-through packed columns (FIG. 15) are attached growth reactors where contaminated water is continuously pumped through a reactor containing Fe(0) and bacteria. In a fluidized bed reactor, a fine-grained iron would serve as the support media for bacterial growth. Fluidization significantly increases the specific surface area and allows for high biomass concentrations in the reactor. It also reduces the clogging potential when the contaminated fluid contains suspended solids. Flow-through packed column reactors contain Fe(0) support structures to allow for biological growth and attachment.

In general, the inventors contemplate that any apparatus which comprises at least a first inlet port, at least a first outlet port and at least one compartment that comprises an Fe(0)-hydrogenotrophic bacterial composition may be developed to remediate target pollutants from an aqueous solution passed through the device. Exemplary devices include flow-through bioreactors and fluidized bed reactors. These devices may also include cartridges or self-contained modules which form a part of a larger apparatus designed for the treatment of a water source or aqueous supply. Such devices may be combined with other water treatment devices, or may be placed inline with one or more additional water purifying devices as part of an apparatus such as a water purificationsystem, a wastewater or sewage treatment system, or any system designed to remove or reduce the concentration of inorganic and/or organic compounds in an aqueous solution.

Also disclosed is an apparatus for denitrifying an aqueous solution. The apparatus generally consists of one or more devices, each device comprising a culture of one or more autotrophic bacteria, an Fe(0) composition, and a container means for contacting the solution with the bacteria in the presence of the Fe(0) composition in such a device. Exemplary apparatus include sequencing bactch reactor, a continuous culture system, a water treatment plant, a sewage treatment facility, a water purifying system, a wastewater treatment facility, or a detoxification system for aqueous solutions.

A further aspect of the invention is a semipermeable reactive barrier used for denitrifying groundwater in situ. This device generally consists of an in-ground barrier onto which a culture of one or more autotrophic bacteria and an Fe(0) composition is provided. The groundwater is in contact with the bacteria and the Fe(0) composition, such that the pollutants present in the water are remediated via the synergistic abiotic and biotic processes disclosed herein. Illustrative examples of compounds which may be remediated by such devices include nitrogen- or sulfur-containing compounds such as nitrate, nitrite, sulfate, and sulfite, and compounds containing one or more redox-sensitive metal ions such as mercury, strontium, technetium, silver, cesium, chromium, and uranium.

The present further provides compositions for use in the apparatus and devices used in situ and ex situ for the remediation of toxic compounds from aqueous environments. Such Fe(0)-bacterial compositions are useful in devices such as flow-through reactors, biofermenters, reactive barriers, packed or fluidized bed reactors, and the like which are useful in the practice of the methods disclosed herein.

The solid support used in the composition may be in the form of an apparatus or device which comprises a chamber, one or more inlet ports, one or more outlet ports, and a matrix within the chamber to which the Fe(0) and bacterial cells are in proximity. In an illustrative embodiment, the inventors passed a solution containing nitrate over a column containing Fe(0) and a culture of autotrophic denitrifying bacteria, and nitrate was removed from solution via the combined biotic/abiotic processes which occurred in the flow-through bioreactor.

3.0 BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 1. An example of a treatment wall using a ditch configuration (from Vidic and Pohnand, 1996).

Figure 2:
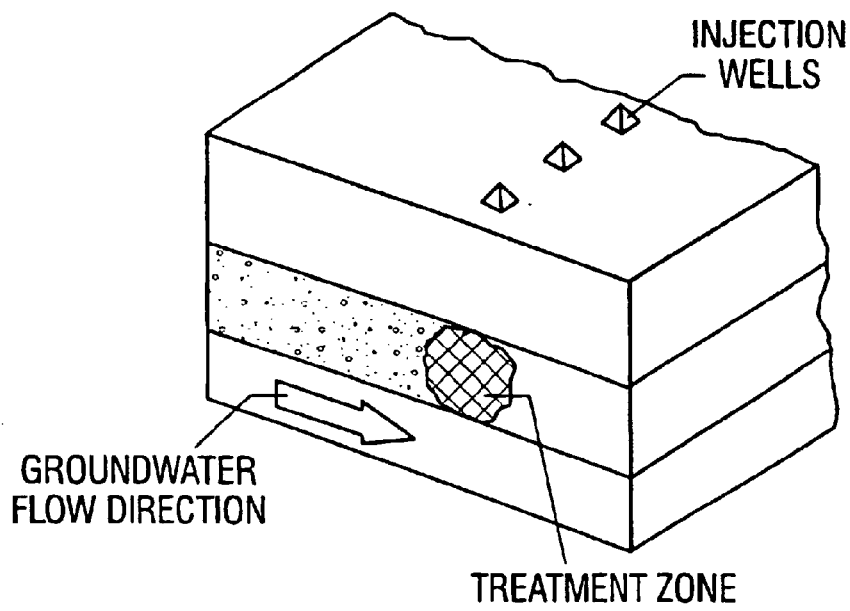

FIG. 2. An example of an injected treatment zone (from Vidic and Pohnand, 1996).

FIG. 3. An example of a funnel and gate system (from Vidic and Pohnand, 1996).

Figure 4A:
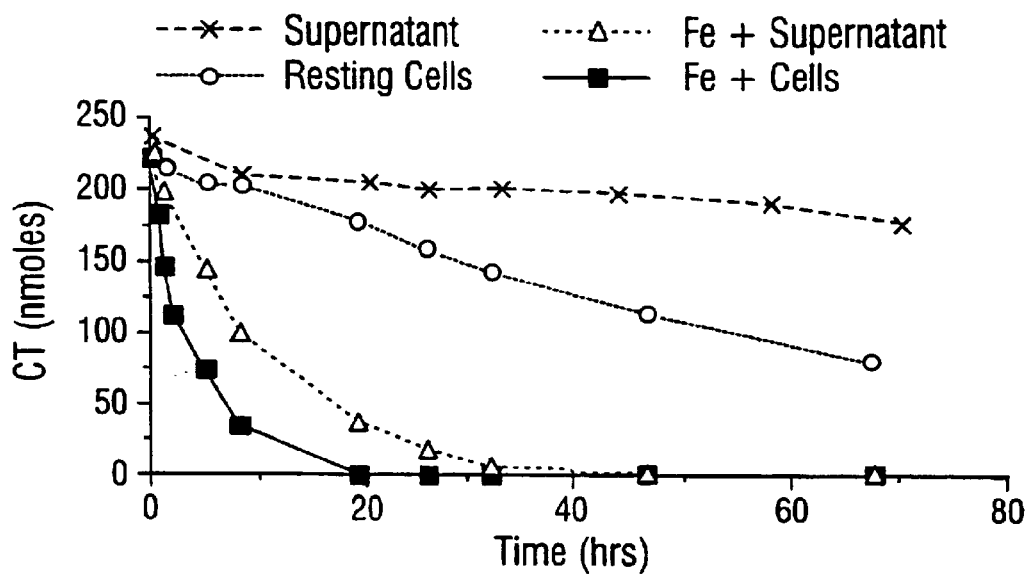

FIG. 4A. CT degradation with concomitant CF production (after Weathers and Parkin, 1995).

Figure 4B:
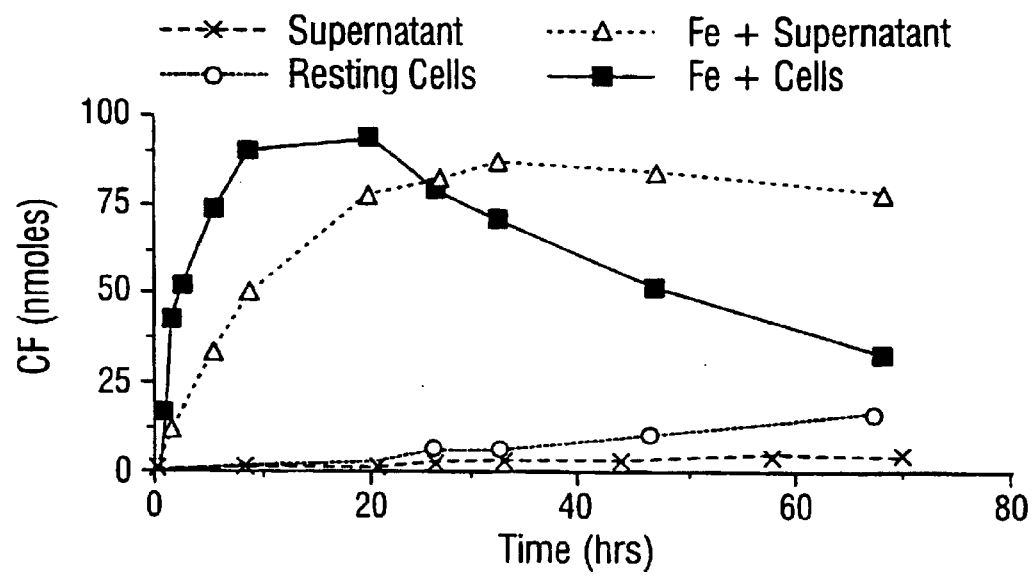

FIG. 4B. CT degradation with concomitant CF production and subsequent degradation (after Weathers and Parkin, 1995). The degradation process is faster and more complete with the Fe(0)-methanogen combination.

Figure 5:
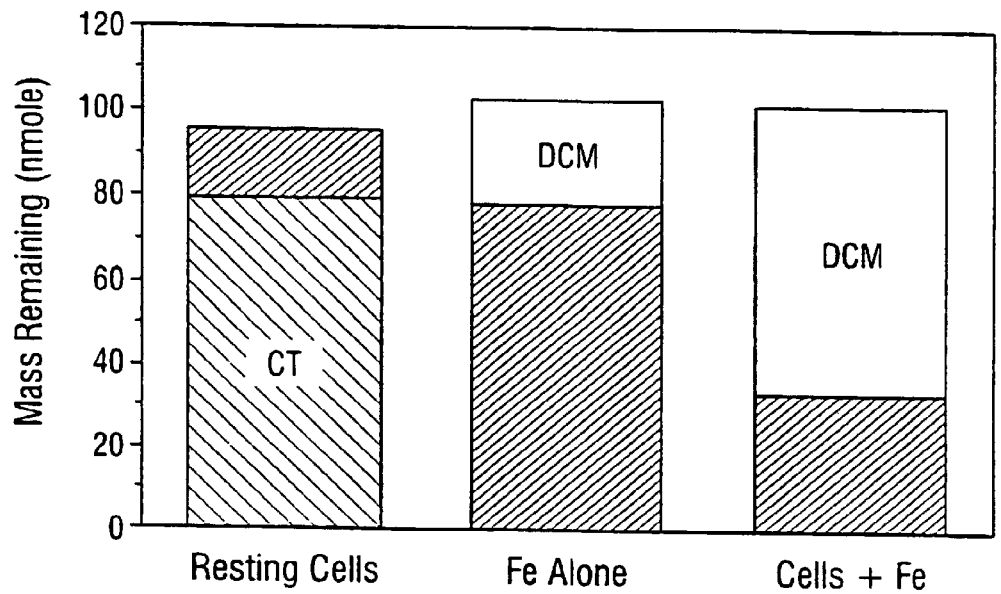

FIG. 5. Chlorinated methanes remaining after 68 h. About one-half of the added CT (200 nm) was converted to dechlorinated products (e.g., formate, CO, and $CO_2$). Product distribution changed significantly with more complete dechlorination with the iron-methanogen combination.

Figure 6:
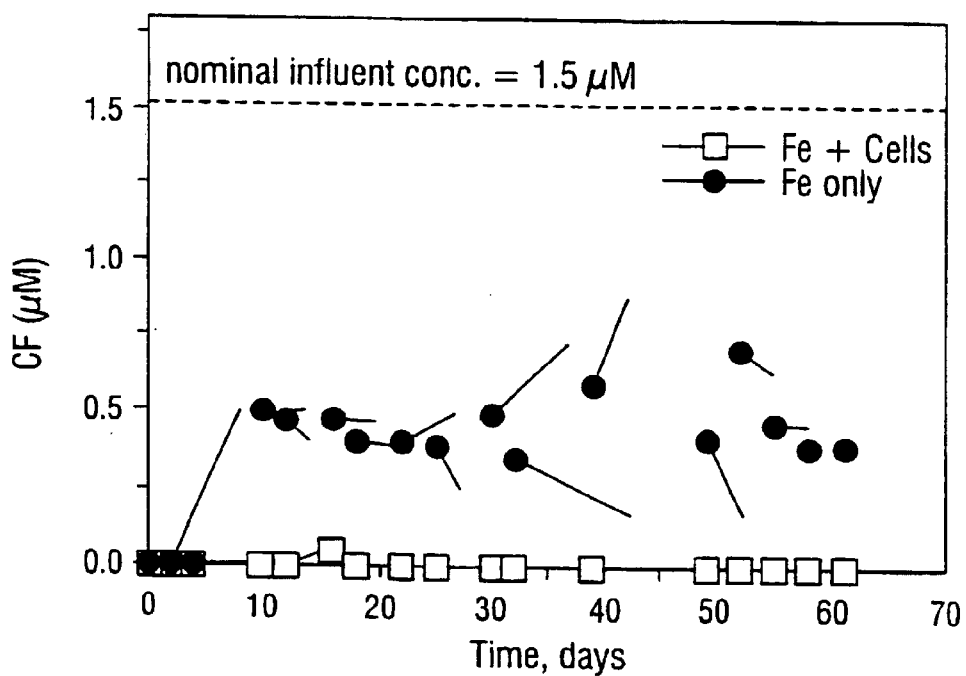

FIG. 6. Removal of CF in steel-wool columns (after Weathers et al., 1997). The iron-methanogen combination consistently removes more CF, and the process appears to be sustainable.

Figure 7:
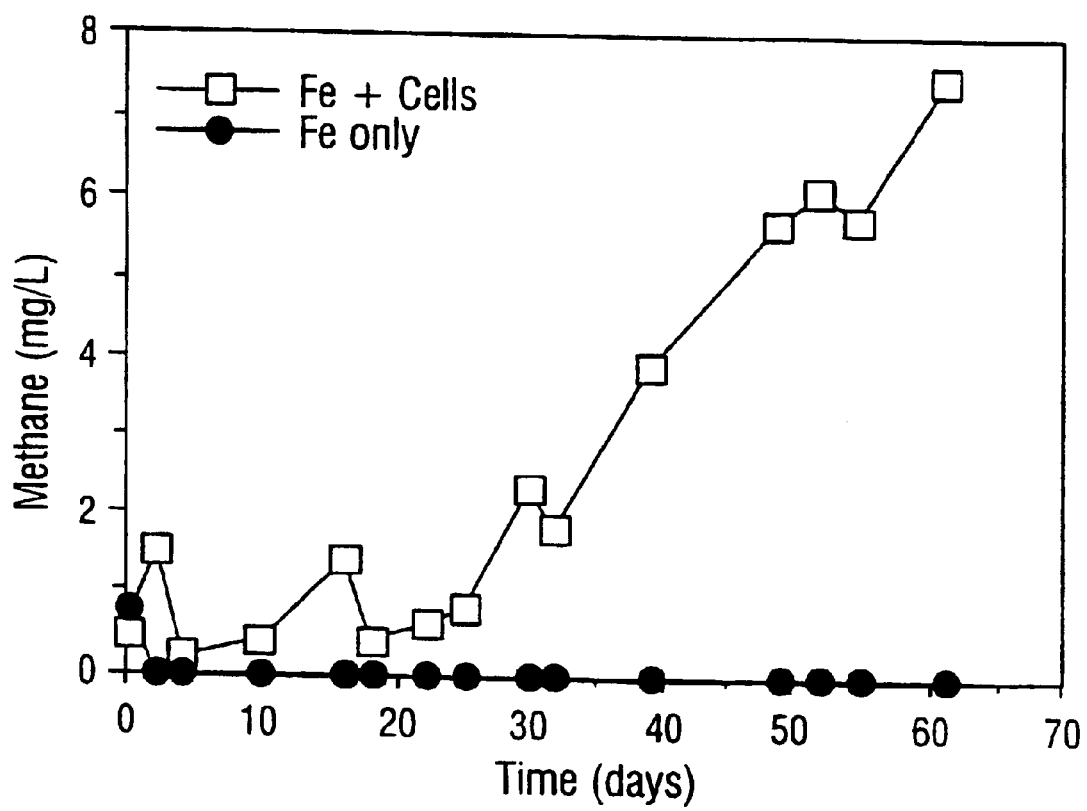

FIG. 7. Effluent methane concentration in steel-wool columns (after Weathers et al., 1997). A healthy population of methanogens was established while removing 1.5 $\mu$M of CF.

Figure 8:
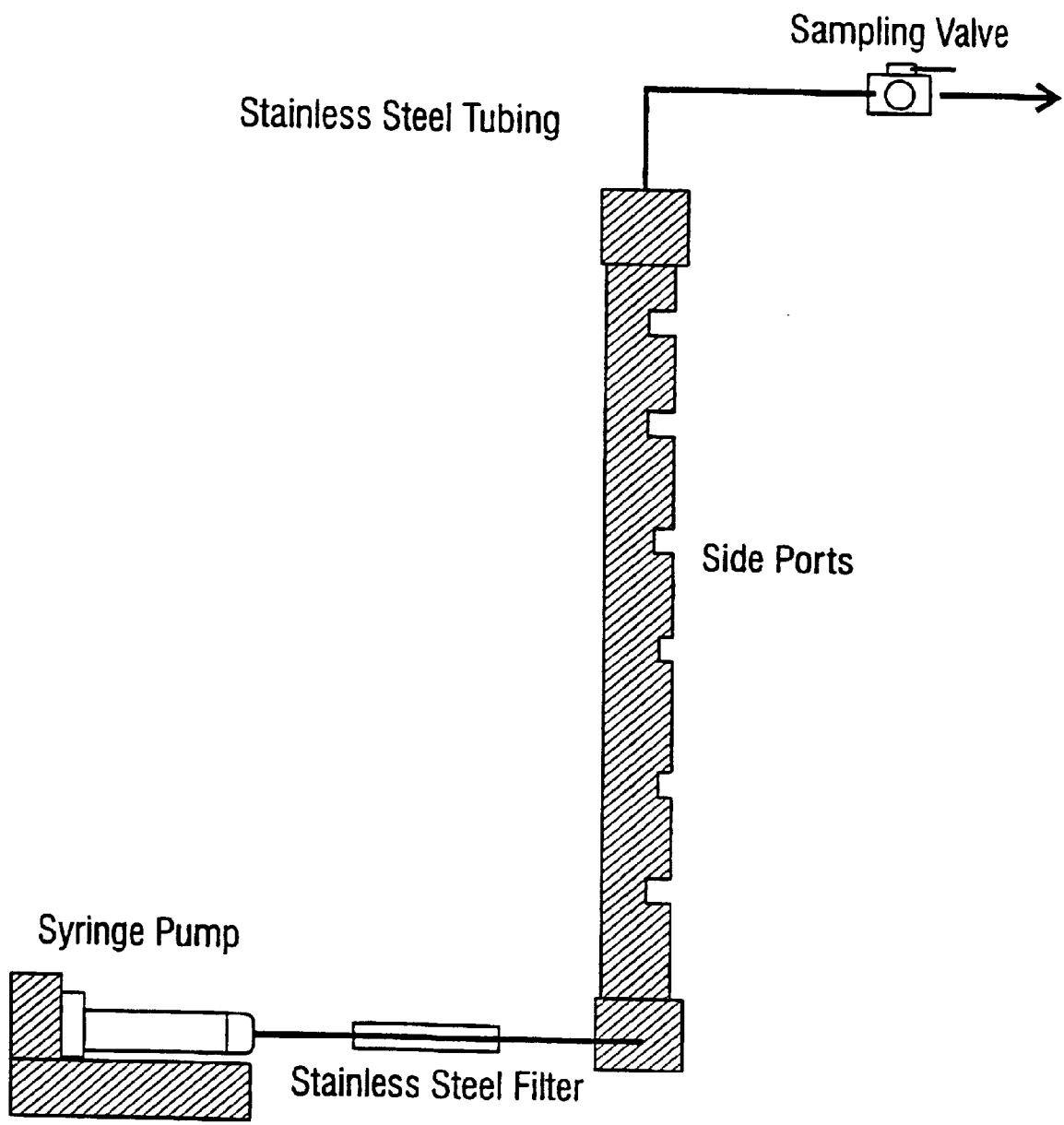

FIG. 8. Laboratory apparatus for flow-through aquifer columns.

Figure 9A:
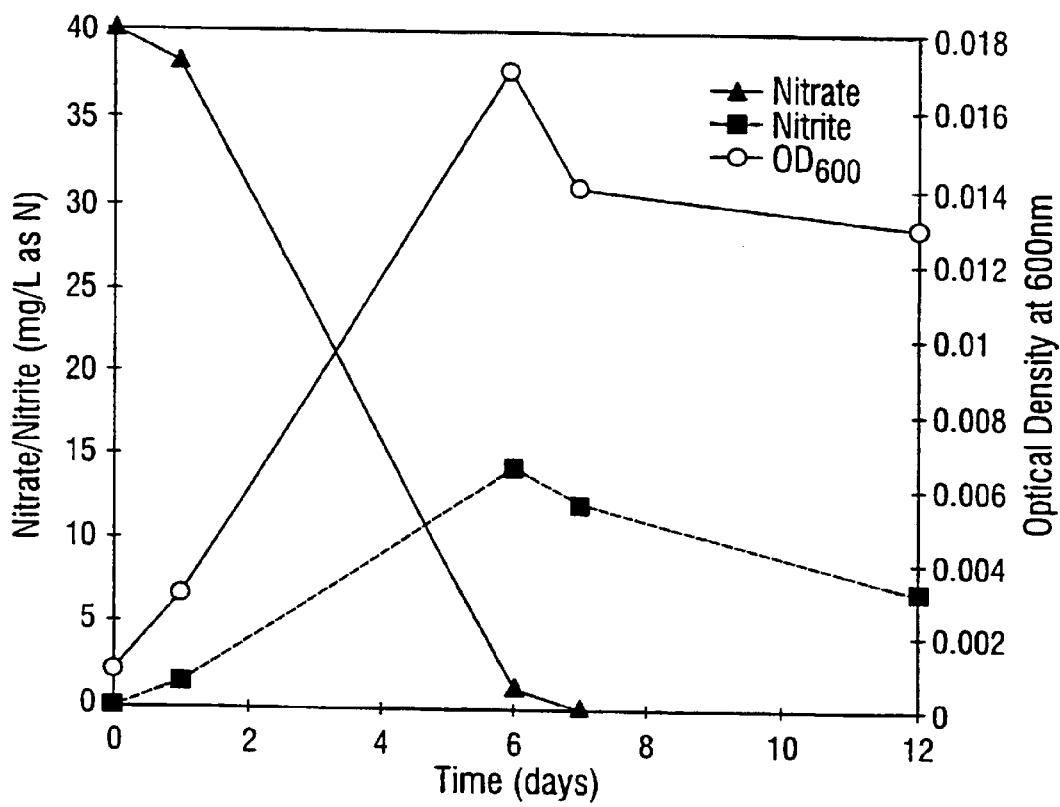
Figure 9B:
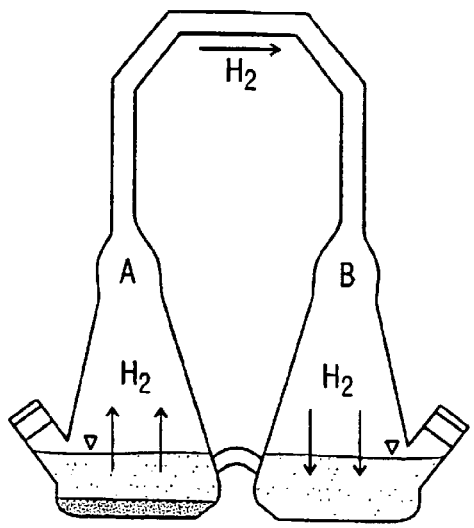

FIG. 9A–FIG. 9B. FIG. 9A. Autotrophic growth of *P. denitrificans* ATCC 17741 in a dual flask apparatus was coupled to Fe(0) corrosion and nitrate reduction. FIG. 9B. Flask A contained metallic iron and water, and flask B contained nitrate-amended, carbonate-buffered medium inoculated with bacteria FIG. 10A. CF degradation in batch reactors containing 2 g of iron filings and killed or live cells, or mineral medium. Filled symbols indicate treatments that were not amended with iron. All incubations received CF except those designated CF free.

Figure 10A:
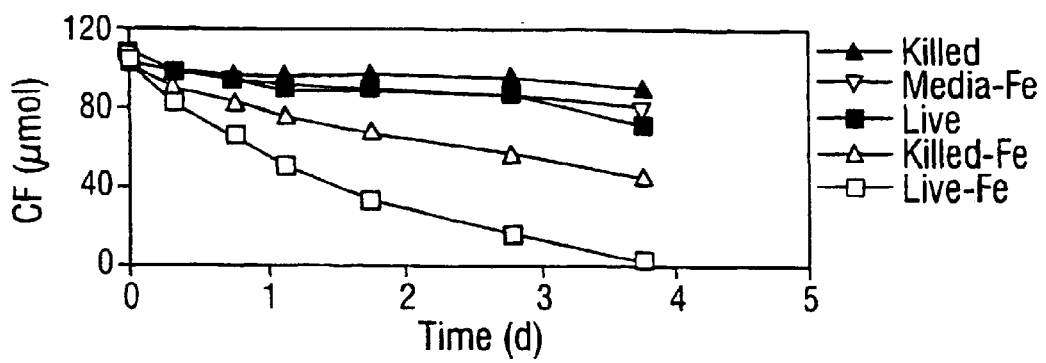
Figure 10B:
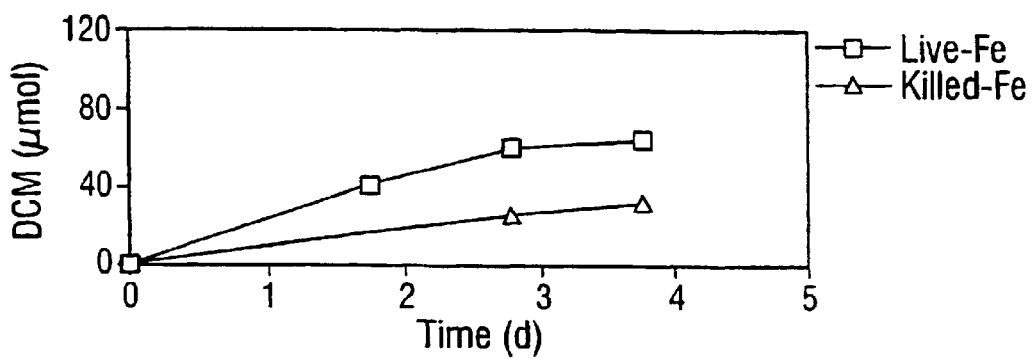

FIG. 10B. DCM formation in batch reactors containing 2 g of iron filings and killed or live cells, or mineral medium. Filled symbols indicate treatments that were not amended with iron. All incubations received CF except those designated CF free.

Figure 10C:
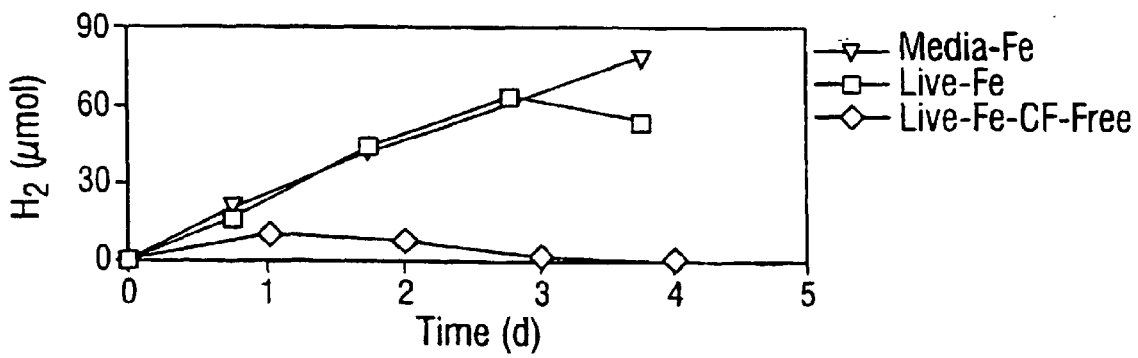

FIG. 10C. Hydrogen evolution and utilization in batch reactors containing 2 g of iron filings and killed or live cells, or mineral medium. Filled symbols indicate treatments that were not amended with iron. All incubations received CF except those designated CF free.

Figure 10D:
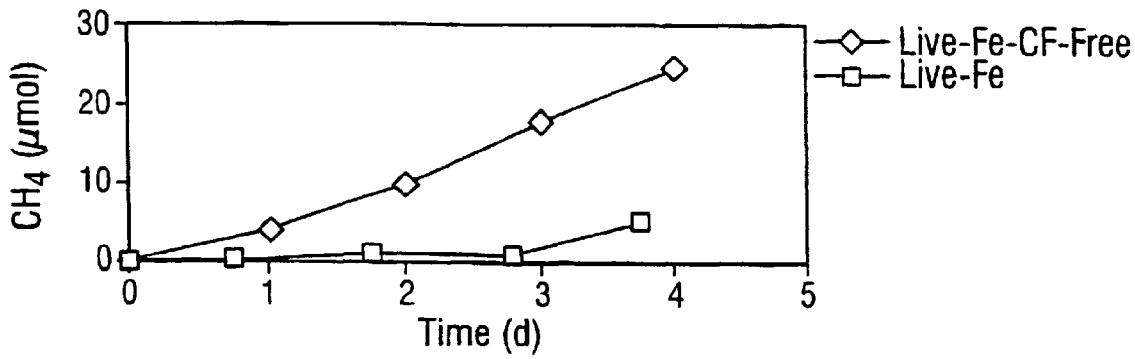

FIG. 10D. Methane production in batch reactors containing 2 g of iron filings and killed or live cells, or mineral medium. Filled symbols indicate treatments that were not amended with iron. All incubations received CF except those designated CF free.

Figure 11:
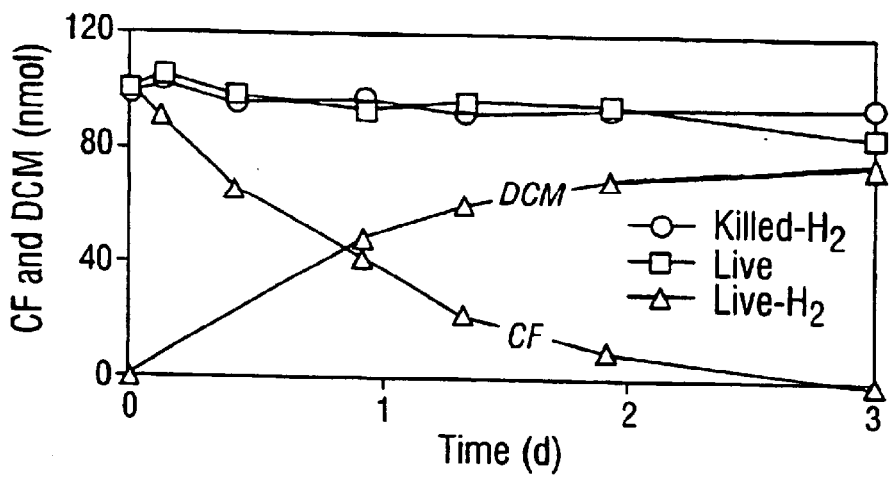

FIG. 11. CF degradation and DCM production in batch reactors amended with hydrogen.

Figure 12A:
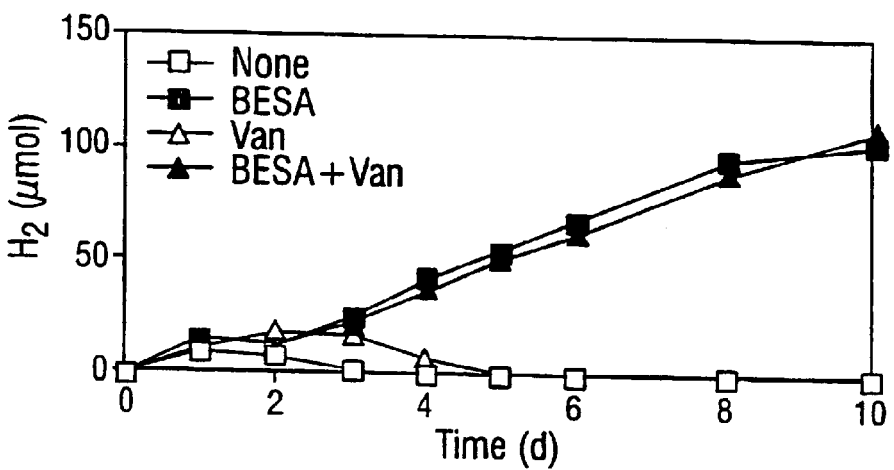

FIG. 12A. Hydrogen evolution and utilization in batch reactors containing 2 g of iron filings. None, inhibitor-free control; BESA, 50 mM BESA; Van, 100 mg/L vancomycin; BESA+Van, 50 mM BESA and 100 mg/L vancomycin.

Figure 12B:
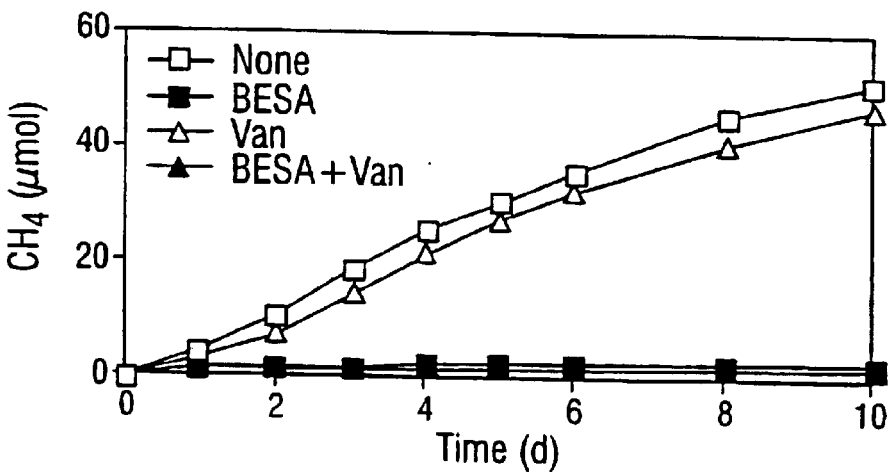

FIG. 12B. Methane production in batch reactors containing 2 g of iron filings. None, inhibitor-free control; BESA, 50 mM BESA; Van, 100 mg/L vancomycin; BESA+Van, 50 mM BESA and 100 mg/L vancomycin FIG. 13A. Hydrogen evolution and utilization in batch reactors amended with hydrogen. DI, deionized water control; None, inhibitor-free control; BESA, 50 mM BESA; Van, 100 mg/L vancomycin; BESA+Van, 50 mM BESA and 100 mg/L vancomycin.

Figure 13A:
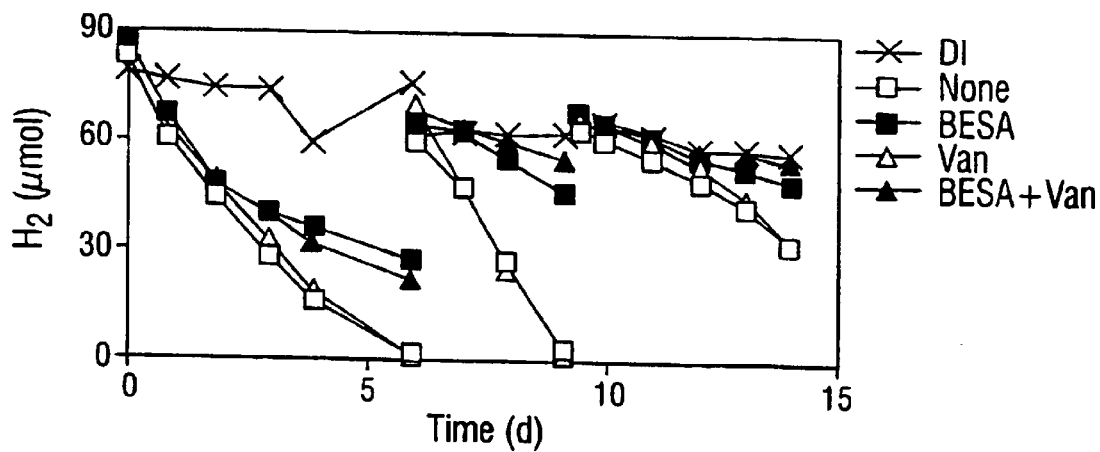
Figure 13B:
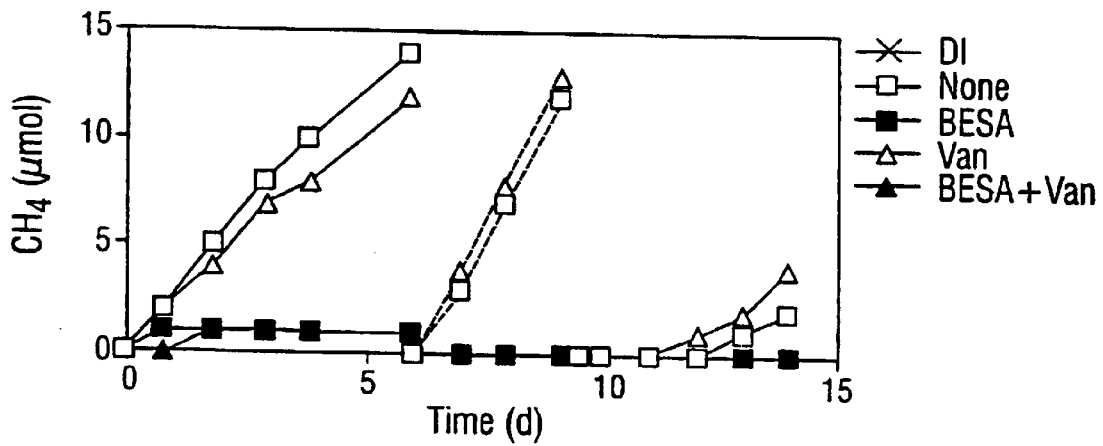

FIG. 13B. Methane production in batch reactors amended with hydrogen. DI, deionized water control; None, inhibitor-free control; BESA, 50 mM BESA; Van, 100 mg/L vancomycin; BESA+Van, 50 mM BESA and 100 mg/L vancomycin.

Figure 13C:
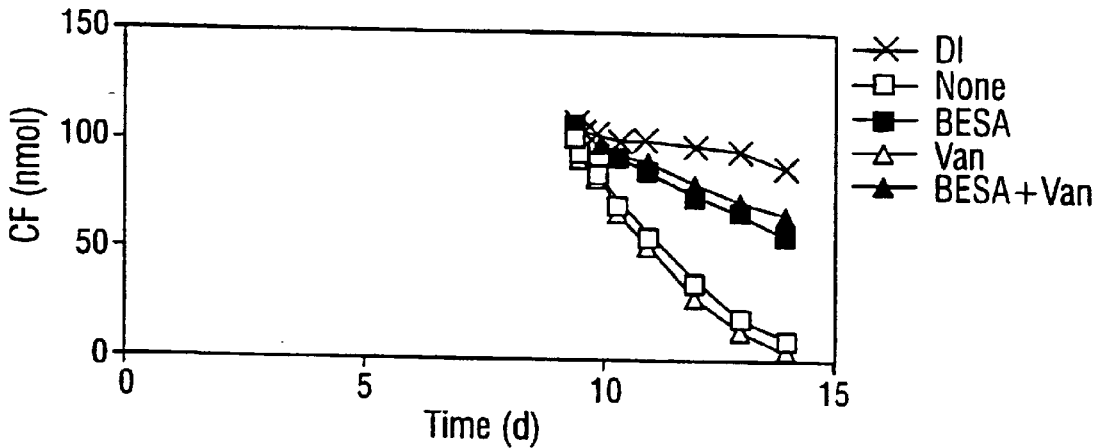

FIG. 13C. CF degradation in batch reactors amended with hydrogen. DI, deionized water control; None, inhibitor-free control; BESA, 50 mM BESA; Van, 100 mg/L vancomycin; BESA+Van, 50 mM BESA and 100 mg/L vancomycin.

Figure 14A:
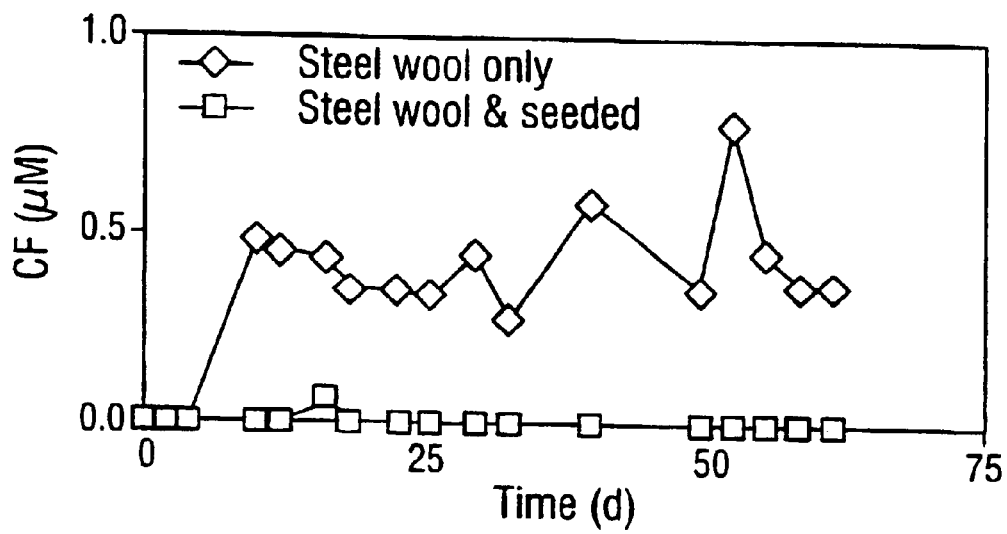

FIG. 14A. CF concentrations in the column reactor effluents. The average influent CF concentration was 1.61±0.49 $\mu$M, and the average effluent CF concentration in the glass bead control column was 1.29±0.85 $\mu$M.

Figure 14B:
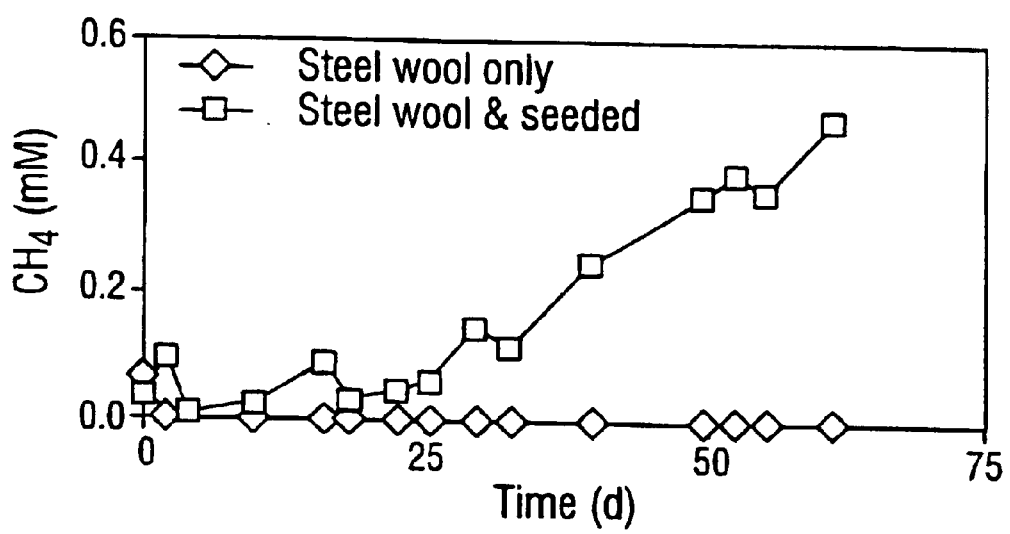

FIG. 14B. Methane concentrations in the column reactor effluents. The average influent CF concentration was 1.61±0.49 $\mu$M, and the average effluent CF concentration in the glass bead control column was 1.29±0.85 $\mu$M.

FIG. 15A. Permeable barrier for groundwater remediation.

FIG. 15B. Plan view of the permeable barrier for groundwater remediation. Shown is 101 Contaminated water, 102 Aquifer, 103 Groundwater, 104 Trench, 105 well and 106 iron and bacteria reactive wall.

FIG. 15C. Profile view of the permeable barrier.

Figure 16A:
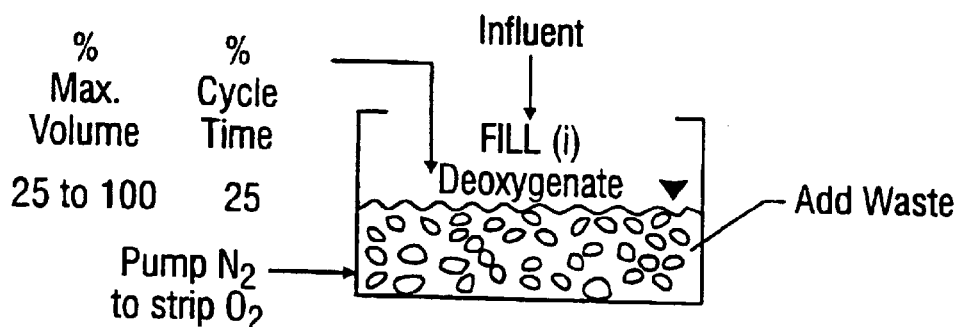
Figure 16B:
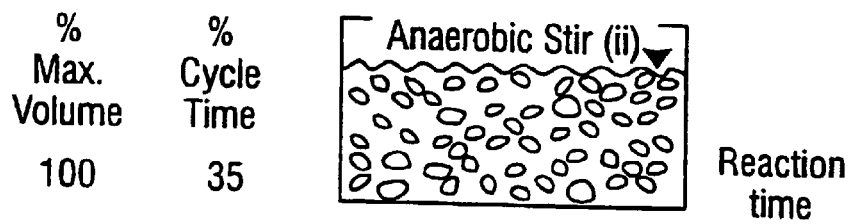
Figure 16C:
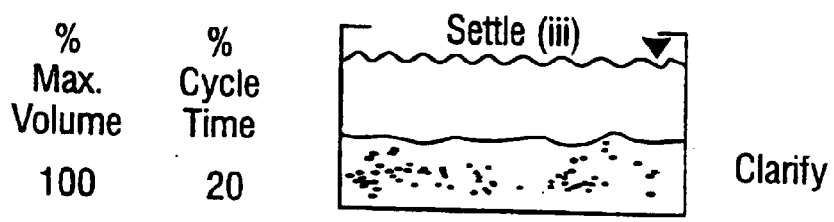
Figure 16D:
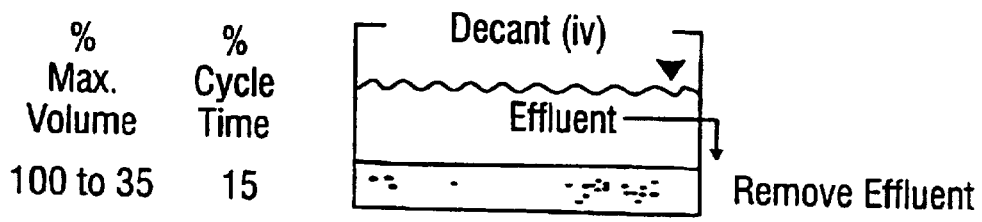
Figure 16E:
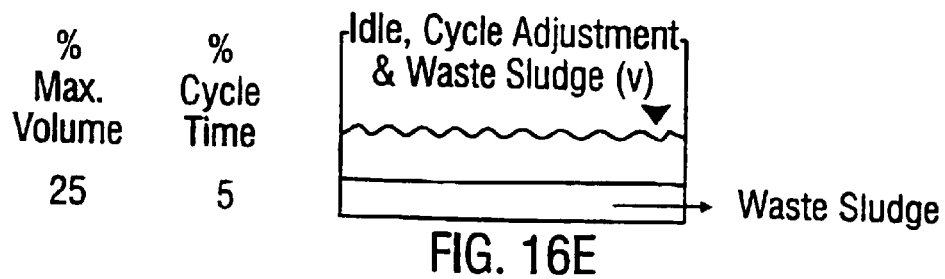

FIGS. 16A–16D. Example of a sequencing batch reactor. FIG. 16A Fill (i) Deoxygenate, FIG. 16B Anaerobic Sitr (ii), FIG. 16C Settle (iii), FIG. 16D Decant (iv), FIG. 16E Idle, Cycle Adjustment and Waste Sludge (v).

Figure 17:
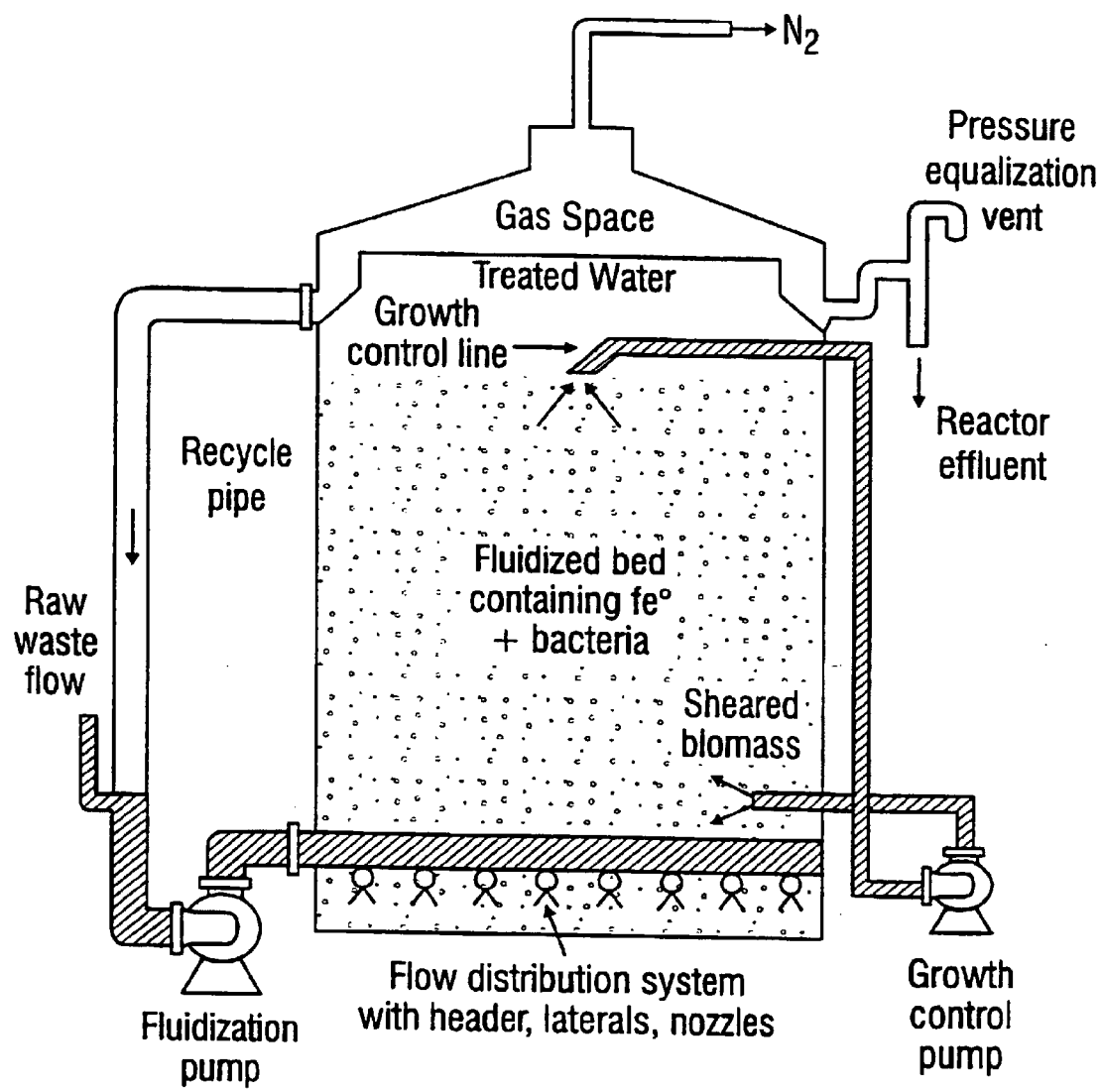
Figure 18:
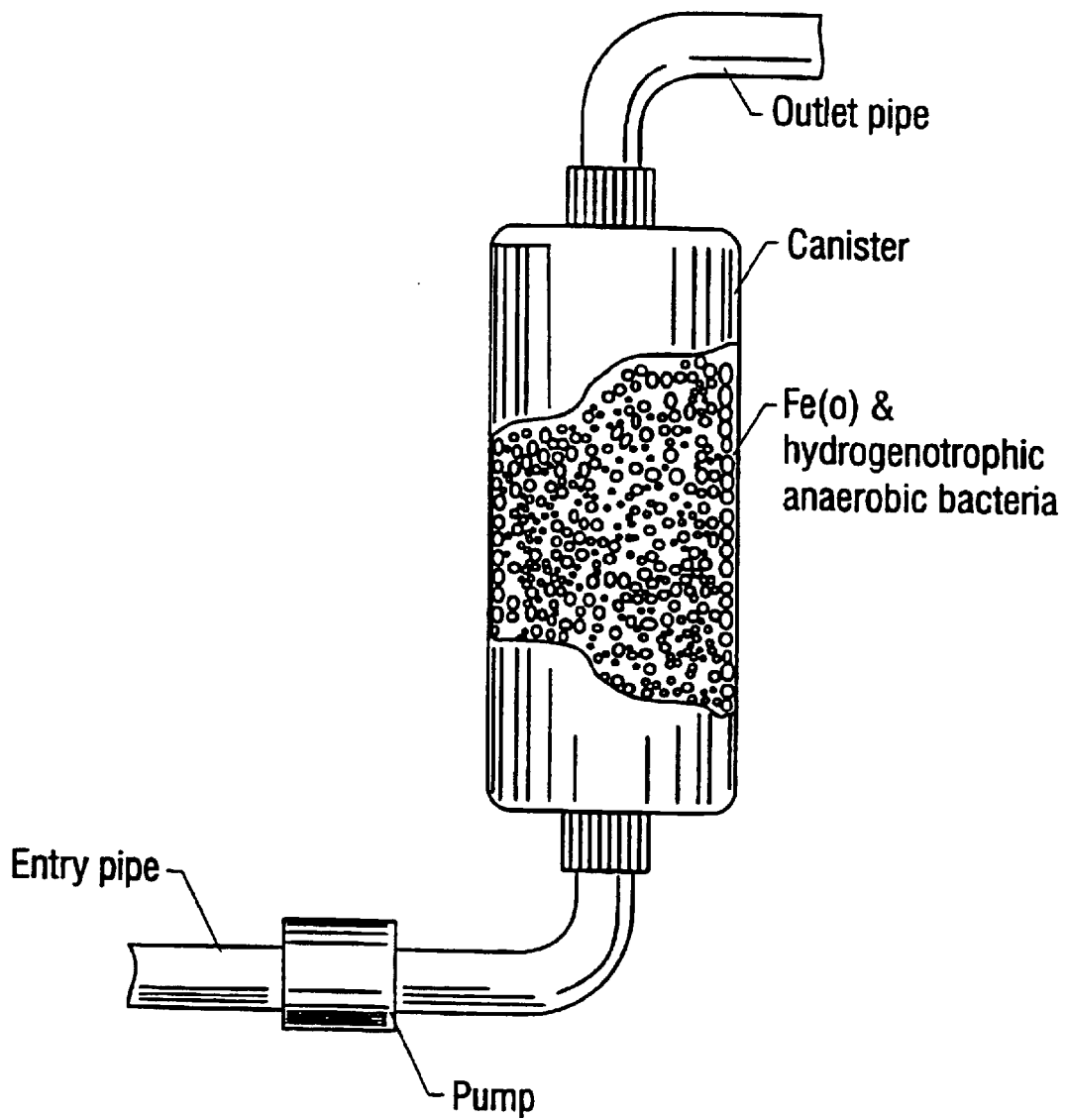

FIG. 17. Example of a fluidized bed reactor.

FIG. 18. Example of flow-through packed column device of the present invention. The column contains a composition comprising Fe(0) and autotrophic bacteria.

4.0 DESCRIPTION OF ILLUSTRATIVE EMBODIMENTS

The present invention overcomes limitations in the prior art such as those which rely on exclusively biotic or exclusively abiotic processes. For example, the invention is superior to the expensive "green rust" process in two critical areas: 1) the end product of "green rust" reduction is ammonium ion, which is toxic and pollutes the water source; and 2) "green rust" processes have remediation rates which are unsuitable for commercial-scale flow-through reactors and in situ remediation of leachates.

In contrast, the present invention provides gaseous (volatile) end products which are dissipated from the aqueous solution or environmental site, and as such, the compositions of the invention do not foul or pollute a site where it is employed. Likewise, the remediation rates afforded by the present compositions and methods are substantially higher than those afforded by "green rust" processes, and are therefore useful in commercial application of in situ or inline bioremediation. Moreover, the invention provides an important economical improvement over the existing art, by utilizing inexpensive, readily-available Fe(0), rather than relying on expensive or scarce components such as "green rust."

The invention further provides improvements over the prior art processes which require extraneous addition of hydrogen gas to fuel systems which rely on purely biotic processes such as those methods involving hydrogen-utilizing bacteria. A major shortcoming of these prior art methods is that large-scale $H_2$ delivery is neither cost-effective nor readily accomplished. $H_2$ gas is only slightly soluble in water and its hazardous (and explosive) properties make handling and storage problematic and often prohibitively expensive. The present invention overcomes these limitations by providing a process in which the production of $H_2$ is accomplished by the concomitant corrosion of Fe(0) substrates in solution. This invention overcomes these and other prior-art limitations by providing a composition which comprises Fe(0) and a culture of one or more hydrogenotrophic bacteria to permit the development of remediation processes which exploit favorable biogeochemical interactions.

The present invention further overcomes limitations of prior art systems which utilize methanol, a common electron donor, to support autotrophic biotic denitrification. The stoichiometric requirement for the metabolism of methanol and nitrate is 2.5 mg $CH_3OH$/mg $NO_3$—N. The diffusion coefficient of methanol is one-half that of nitrate, so in order to prevent methanol from being flux limiting in biofilm systems, it must be fed at twice the stoichiometric requirement (i.e. at 5 mg $CH_3OH$/mg $NO_3$—N) (Williamson and McCarty, 1976). This excess methanol has detrimental side-effects on water quality, such as the production of excess biomass and the formation of trihalomethanes. Moreover, methanol can cause blindness. Such side-effects are absent in the present invention through the use of Fe(0) as a source for the production of hydrogen gas. Hydrogen gas offers a second advantage over prior art methods, due to its higher diffusivity in aqueous media. Therefore, the accumulation of toxic compounds such as trihalomethane, and the need for disinfecting excess biomass is eliminated when employing the processes of the present invention.

4.1 Definitions

The following words and phrases have the meanings set forth below:

a, an: In keeping with the well-established precedent in patent law, the use of the articles "a" and "an" are intended in all instances to mean "one or more."

Expression: The combination of intracellular processes, including transcription and translation undergone by a coding DNA molecule such as a structural gene to produce a polypeptide.

Promoter: A recognition site on a DNA sequence or group of DNA sequences that provide an expression control element for a structural gene and to which RNA polymerase specifically binds and initiates RNA synthesis (transcription) of that gene.

Structural gene: A gene that is expressed to produce a polypeptide.

Transformation: A process of introducing an exogenous DNA sequence (e.g., a vector, a recombinant DNA molecule) into a cell or protoplast in which that exogenous DNA is incorporated into a chromosome or is capable of autonomous replication.

Transformed cell: A cell whose DNA has been altered by the introduction of an exogenous DNA molecule into that cell.

Transgenic cell: Any cell derived or regenerated from a transformed cell or derived from a transgenic cell.

Vector: A DNA molecule capable of replication in a host cell and/or to which another DNA segment can be operatively linked so as to bring about replication of the attached segment. A plasmid is an exemplary vector.

4.2 Halocarbon Contamination

Fe(0) will enhance microbial activity by serving as electron donor (via water-derived hydrogen, produced by cathodic depolarization) to support hydrogenotrophic growth and reductive biotransformations. Bacterial viability may be further enhanced by abiotic removal of toxic compounds by Fe(0) below toxic levels. The bacteria, in turn, might enhance the abiotic process by removing the passivating (cathodic) hydrogen layer from the Fe(0) surface and by further degrading some products of reductive treatment with Fe(0). Chlorinated aliphatic hydrocarbons (CAHs) are frequent groundwater contaminants (Riley et al., 1992).

They are susceptible to biotransformations catalyzed by pure and mixed methanogenic (Bouwer et al., 1981; Bouwer and McCarty, 1983; Gossett, 1985; Egli et al., 1987; Krone et al., 1989a; Mikesell and Boyd, 1990; Bagley and Gossett, 1995; Hughes and Parkin, 1996) and nonmethanogenic, anaerobic cultures (Egli et al., 1987; Egli et al., 1990; Egli et al., 1988; Galli and McCarty, 1989; Fathepure and Tiedje, 1994). Electron donors that have been investigated for methanogenic biotransformation of CAHs include methanol (Mikesell and Boyd, 1990; Bagley and Gossett, 1995), acetate (Bouwer et al., 1981; Bouwer and McCarty, 1983; Hughes and Parkin, 1996), and hydrogen (DiStefano et al., 1992). Hydrogen is a more thermodynamically favorable electron donor than either methanol or acetate (Zinder, 1993), and its high diffusivity through biofilms ensures that the target CAHs would be flux-limiting to optimize removal rates. Nevertheless, practical problems exist with regard to the use of hydrogen due to its low solubility in water, about 1.6 mg/L at 20° C., based on a Henry's constant of $6.83 \times 10^4$ atm/mol (Metcalf and Eddy, Inc., 1991).

One way that hydrogen can be introduced into aqueous solution involves the use of iron metal. When $Fe^0$ is immersed in anoxic water, hydrogen is produced (Reardon, 1996):

(Equation 16)

Pure cultures of methanogenic (Daniels et al., 1987; Rajagopal and LeGall, 1989; Belay and Daniels, 1990; Lorowitz et al., 1992), homoacetogenic (Rajagopal and LeGall, 1989), and sulfate-reducing bacteria (Rajagopal and LeGall, 1989) have demonstrated the ability to use cathodic hydrogen as an energy source for growth in short-term batch studies. Also, anaerobic bacteria are commonly associated with the corrosion of metals (Hamilton, 1985; Lee et al., 1995). However, the ability of methanogens to sustain growth on cathodic hydrogen in the presence of CAHs has not been established. This is particularly important because many CAHs, especially chloroform (CF), extremely inhibitory to methanogens (Hughes and Parkin, 1996; Bauchop, 1967; Thiel, 1969; Swanwick and Foulkes, 1971; Prins et al., 1972; Yang and Speece, 1986; Hickey et al., 1987).

The biotransformation of CAHs using cathodic hydrogen as electron donor is confounded by the direct, abiotic reduction of CAHs by $Fe^0$ (Gillham and O'Hannesin, 1994; Matheson and Tratnyek, 1994; Helland et al., 1995; Orth and Gillham, 1995). In the presence of 100-mesh iron powder, carbon tetrachloride (CT) underwent sequential dehalogenation to CF and then to dichloromethane (DCM), which was not further degraded (Matheson and Tratnyck, 1994).

Thus it is well-known that anaerobic bacteria can catalyze the reductive dechlorination of CAHs, that CAHs can be transformed abiotically using $Fe^0$, and that $Fe^0$ can support the growth of anaerobic bacteria. Furthermore, there are limitations of the biotic process because of potential toxicity of parent CAHs and their metabolites and to the abiotic process because of the potential buildup of "dead-end" products. It is hypothesized that the presence of an active methanogenic consortium in the presence of $Fe^0$ may enhance the rate and extent of degradation of selected CAHs.

4.3 Sr(II), Cs(I), Cr(VI) and U(VI) Reduction

Pure cultures of methanogenic, homoacetogenic, sulfate-reducing, and denitrifying bacteria have demonstrated the ability to use cathodic hydrogen (reaction 3 above) as an energy source for growth in short-term, batch studies (Daniels et al., 1987; Rajagopal and LeGall, 1989; Till et al., 1998). As noted, such organisms have also been shown to facilitate reductive dechlorination and reduction of Cr(VI) and U(VI).

The present invention improves upon these results by providing methods for the remediation of a variety of toxic ions using the bioaugmented Fe(0) compositions disclosed herein. These methods improve both the rate and extent of overall contaminant removal when compared to solely biotic based methods. In particular, compounds containing Cs(I), Sr(II), Cr(VI), and U(VI) are contemplated by the inventors to be remediable using the disclosed compositions and methods. These combined biotic-abiotic processes have a number of advantages in addition to the removal of the parent compounds. For example, abiotic removal of Cs(I), Sr(II), Cr(VI) and/or U(VI) from solution or soils reduces the toxicity of these metals to the microbes, and abiotic removal of the chlorinated compounds may reduce their concentrations to levels that are not toxic to the microbes. The microorganisms, in turn, may further degrade dead-end products that accumulate during abiotic transformation (e.g., CF and DCM from CT).

4.4 Iron-Supported Autotrophic Denitrification (ISAD)

ISAD is an improvement over existing biological nitrate removal processes because the autotrophic organisms used in this process grow on hydrogen gas produced by the corrosion of zero-valent iron by water (i.e., "cathodic hydrogen", $H_2$, is derived from water, $H_2O$). Hydrogen gas is thermodynamically a more favorable reductant and has a greater diffusivity through biofilms compared to the organic substrates that are commonly used to support biological denitrification (e.g., methanol and acetate). While these properties are conducive to enhanced nitrate removal, previous use of hydrogen as a substrate to support denitrification has been limited by its low solubility and its hazardous (explosive) properties during handling and storage. These limitations are overcome by using Fe(0) to continuously generate cathodic hydrogen to support autotrophic dentrification. In this process, Fe(0) is also used as a direct reductant to remove nitrates abiotically. In addition, autotrophic bacteria use $CO_2$ as carbon source to synthesize new cell tissue and thus have lower biomass production that the bacteria used in conventional denitrification systems fed organic substrates. Thus, adverse side-effects on water quality due to residual organic compounds and excessive biomass production are eliminated.

4.5 Organisms Useful in the Practice of the Invention

Mixed cultures of autotrophic, hydrogen-oxidizing, denitrifying bacteria are often found in groundwater systems. Smith et al. (1994) isolated a mixed culture of hydrogenotrophic denitrifiers from a nitrate-contaminated sand and gravel aquifer in Cape Cod, Mass. Nine strains of hydrogen-oxidizing, denitrifying bacteria were isolated from the aquifer with all of the strains able to grow heterotrophically as well. None of the strains were similar to *P. denitrificans*.

*P. denitrificans* is one of the most intensively studied denitrifying microorganism due to its nutritional versatility (Mateju et al., 1992). Its well-known capability to reduce nitrogenous compounds with hydrogen is the basis of several approaches for denitrification of drinking water (Dries et al., 1988; Gros et al., 1988; Kurt et al., 1987). Using hydrogen as an oxidizable substrate for water treatment offers a number of important benefits, such as food-grade quality of the reductant, process reliability, low excess sludge production, and no need for intensive monitoring or biological post-treatment to control and remove residual reductant (Selenka and Dressler, 1990). The main disadvantages of using hydrogen in water treatment involve its low solubility and delivering difficulty, and the slow growth rate of autotrophic bacteria using carbon dioxide as their sole carbon source (Dries et al., 1988).

Few bacterial strains are known to completely denitrify with hydrogen gas as the sole energy source. Evidence exists that a consortium of bacteria is often responsible for hydrogenotrophic denitrification. A list of several microorganisms isoalted from and identified in hydrogenotrophic, denitrifying biofilms is show in Table 1. Liessens et al. (1992) isolated a large diversity of organisms from a hydrogenotrophic denitrification reactor. Acinetobacter sp., Aeromonas sp., Pseudomonas sp., and *Shewanella putrefaciens* were repeatedly isolated from the hydrogenotrophic sludge. In a hydrogenotrophic denitrification reactor at Rasseln, Germany, Selenka and Dressler (1990) characterized the chemolithotrophic bacteria present in the plant. They found bacterial strains as representatives of the genera Pseudomonas, Alcaligenes, and Achromobacter. The opportunistic presence of Acinetobacter spp. unable to reduce nitrate in the plant was unclear, although these species may be involved in creating anoxic conditions (Liessens et al., 1992).

Several genera of hydrogenotrophic bacteria have been identified by the inventors to be useful in the preparation of zero-valent iron-supported cultures for remediation of a variety of contaminants and pollutants. In particular, species of bacteria selected from the group consisting of Acetobacterium spp., Achromobacter spp., Aeromonas spp., Acinetobacter spp., Aureobacterium spp., Bacillus spp., Comamonas spp., Dehalobacter spp., Dehalospirillum spp., Dehalococcoide spp., Desulfurosarcina spp., Desulfomonile spp., Desulfobacterium spp., Enterobacter spp., Hydrogenobacter spp., Methanosarcina spp., Pseudomonas spp., Shewanella spp., Methanosarcina spp., Micrococcus spp., and Paracoccus spp are particularly preferred for the practice of the invention. These bacterial compositions may include one or more strains of bacteria selected from the group consisting of *Acetobacterium woodi, Aeromonas hydrophila, Aeromonas sobria, Alcaligenes eutrophus, Comamonas acidovorans, Dehalococcoide restrictus, Dehalococcoide multivorans, Dehalococcoide ethenogene, Desulfobacterium tiedje, Enterobacter agglomerans, Hydrogenobacter thermophilus, Methanosarcina barkeri, Methanosarcina mazei, Methanosarcina thermophila, Paracoccus denitrificans, Pseudomonas aureofaciens, Pseudomonas maltophilia, Pseudomonas mendocina,* and *Shewanella putrefaciens.* Alternatively, hydrogenotrophic bacteria present in anaerobic sludge or anaerobic sediments may also be used in the practice of the invention, and may be combined with one or more pure cultures of hydrogenotrophic bacteria for the development of compositions comprising mixed microbial cultures in combination with zero-valent iron.

4.6 Hydrogenotrophic Denitrifiers

Since denitrification is a respiratory process, an oxidizable substrate or electron donor is required. Most of the research and work done in the area of denitrification has been done with heterotrophic bacteria that utilize organic compounds. The present invention focuses on autotrophic bacteria that are characterized by their ability to obtain energy by the oxidation of gaseous hydrogen ($H_2$) via anaerobic respiration with nitrate and synthesize cell material by the reductive assimilation of carbon dioxide ($CO_2$) via the Calvin cycle.

TABLE 1

MICROORGANISMS FROM HYDROGENOTROPHIC, DENITRIFYING BIOFILMS

| Bacteria | Location | Reference |
|---|---|---|
| Achromobacter sp. | Denitrification reactor | Selenka and Dressler, 1990 |
| Acinetobacter sp. | Denitrification reactor | Liessens et al., 1992 |
| Aeromonas hydrophila | Denitrification reactor | Liessens et al., 1992 |
| A. sobria | Denitrification reactor | Liessens et al., 1992 |
| Alcaligenes sp. | Denitrification reactor | Selenka and Dressler, 1990 |
| Alcaligenes eutrophus | Denitrification reactor | Dries et al., 1988 |
| Aureobacterium sp. | Denitrification reactor | Liessens et al., 1992 |
| Bacillus sp. | Denitrification reactor | Liessens et al., 1992 |
| Comamonas acidovorans | Denitrification reactor | Liessens et al., 1992 |
| Hydrogenobacter thermophilus | Denitrification reactor | Liessens et al., 1992 |
| Micrococcus sp. | Denitrification reactor | Liessens et al., 1992 |
| Mixed culture | Oligotrophic aquifer | Smith et al., 1994 |
| Paracoccus denitrificans | Denitrification reactor | Liessens et al., 1992 |
| Pseudomonas aureofaciens | Denitrification reactor | Liessens et al., 1992 |
| P. maltophilia | Denitrification reactor | Dries et al., 1988 |
| P. mendocina | Denitrification reactor | Liessens et al., 1992 |
| P. putrefaciens | Denitrification reactor | Dries et al., 1988 |
| P. stutzeri | Denitrification reactor | Liessens et al., 1992 |
| P. syringae | Denitrification reactor | Liessens et al., 1992 |
| Serratia odorifera | Denitrification reactor | Liessens et al., 1992 |
| Shewanella putreficans | Denitrification reactor | Liessens et al., 1992 |
| Thiobacillus denitrificans | Denitrification reactor | Lewandowski et al., 1987 |

Hydrogen metabolism is widely distributed among various well-described physiological groups of bacteria, such as the methanogenic and acetogenic bacteria, the sulfate-reducers, the organotrophic fermentative bacteria, or the $N_2$-fixing bacteria (Madigan et al., 1987). Hydrogen is also reported to be a driving mechanism for the microbial degradation of micropollutants, such as atrazine, in soils and in drinking water (Wierinck et al., 1990). Aerobic hydrogen bacteria belong to different taxonomic groups and are all facultative autotrophs with one exception, *Hydrogenobacter thermophilus*, which is an obligate autotroph. The hydrogen bacteria all show versatile metabolism; many of them, especially those regarded as Pseudomonas and Alcaligenes are characterized by the ability to use a wide variety of carbon substrates (Mateju et al., 1992). So far, relatively few bacteria have been found that are able to denitrify nitrate, nitrite, or nitrous oxide under hydrogenotrophic conditions (Liessens et al., 1992). Hydrogen-utilizing, denitrifying bacteria take up hydrogen gas by using two hydrogenase enzymes. The first enzyme is membrane bound and used in the production of ATP. The second enzyme is cytoplasmic (soluble) and directly reduces $NAD^+$ to NADH for autotrophic growth via the Calvin cycle (Madigan et al., 1997). It can be seen from the following equation that the theoretical consumption of hydrogen is 0.35 mg $H_2$ per 1 mg NO3—N reduced to dinitrogen gas ($N_2$):

$$2NO_3^- + 5H_2 + 2H^+ = N_2 + 6H_2O$$

$$\Delta G_0 = -565.96 \text{ kJ}$$

Experimental $H_2$ requirements have been shown to be slightly higher than the stoichiometric values and range from 0.38 to 0.40 mg $H_2$ per 1 mg $NO_3$—N reduced to $N_2$ (Gros et al., 1988; Dries et al., 1988).

4.7 Methods of Nucleic Acid Delivery and DNA Transfection

In certain embodiments, it is contemplated that nucleic acid segments encoding one or more of the bacterial enzymes required for the detoxification of one or more of the target pollutants may be cloned and used to transfect appropriate host cells to provide genetically engineered recombinant microorganisms with enhanced activity for bioremediation of particular contaminants. Technology for introduction of nucleic acids into cells is well-known to those of skill in the art. Four general methods for delivering a nucleic segment into cells have been described:

(1) chemical methods (Graham and Van Der Eb, 1973);
(2) physical methods such as microinjection (Capecchi, 1980), electroporation (Wong and Neumann, 1982; Fromm et al., 1985) and the gene gun (Yang et al., 1990);
(3) viral vectors (Lu et al., 1993; Eglitis and Anderson, 1988); and
(4) receptor-mediated mechanisms (Curiel et al., 1991; Wagner et al., 1992).

In a preferred embodiment, the engineering of recombinant autotrophic bacterial cells to contain DNA segments encoding modified denitrifying enzymes is desirable for improved denitrifying bioreactors. In such an embodiment, a mutant nucleic acid is preferable in which the oxygen repression of the genes has been lessened or eliminated.

4.8 Recombinant Host Cells and Vectors

Particular aspects of the invention concern the use of plasmid vectors for the cloning and expression of various genes encoding detoxifying enzymes such as those involved in bioremediation of pollutants, and in particular, denitrification by autotrophic bacteria. The generation of recombinant vectors, transformation of host cells, and expression of recombinant proteins is well-known to those of skill in the art. Prokaryotic hosts are preferred for such expression, with those organisms listed in Table 1 being particularly preferred.

In general, plasmid vectors containing replicon and control sequences which are derived from species compatible with the host cell are used in connection with these hosts. The vector ordinarily carries a replication site, as well as marking sequences which are capable of providing phenotypic selection in transformed cells.

Those promoters most commonly used in recombinant DNA construction include the β-lactamase (penicillinase) and lactose promoter systems (Chang et al., 1978; Itakura et al., 1977; Goeddel et al., 1979) or the tryptophan (trp) promoter system (Goeddel et al., 1980). The use of recombinant and native microbial promoters is well-known to those of skill in the art, and details concerning their nucleotide sequences and specific methodologies are in the public domain, enabling a skilled worker to construct particular recombinant vectors and expression systems for the purpose of producing recombinantly engineered autotrophic bacterial host cells of the present invention.

4.9 Site-Specific Mutagenesis

Site-specific mutagenesis is a technique useful in the preparation of individual peptides, or biologically functional equivalent proteins or peptides, through specific mutagenesis of the underlying DNA. The technique, well-known to those of skill in the art, further provides a ready ability to prepare and test sequence variants, for example, incorporating one or more of the foregoing considerations, by introducing one or more nucleotide sequence changes into the DNA. Such mutations are particularly desirable in generating mutant strains of autotrophic bacteria capable of detoxifying the pollutants of interest with improved properties or greater efficiency than native, unengineered bacterial cell lines.

Site-specific mutagenesis allows the production of mutants through the use of specific oligonucleotide sequences which encode the DNA sequence of the desired mutation, as well as a sufficient number of adjacent nucleotides, to provide a primer sequence of sufficient size and sequence complexity to form a stable duplex on both sides of the deletion junction being traversed. Typically, a primer of about 14 to about 25 nucleotides in length is preferred, with about 5 to about 10 residues on both sides of the junction of the sequence being altered.

In general, the technique of site-specific mutagenesis is well known in the art, as exemplified by various publications. As will be appreciated, the technique typically employs a phage vector which exists in both a single stranded and double stranded form. Typical vectors useful in site-directed mutagenesis include vectors such as the M13 phage. These phage are readily commercially-available and their use is generally well-known to those skilled in the art. Double-stranded plasmids are also routinely employed in site directed mutagenesis which eliminates the step of transferring the gene of interest from a plasmid to a phage.

In general, site-directed mutagenesis in accordance herewith is performed by first obtaining a single-stranded vector or melting apart of two strands of a double-stranded vector which includes within its sequence a DNA sequence which encodes the desired peptide. An oligonucleotide primer bearing the desired mutated sequence is prepared, generally synthetically. This primer is then annealed with the single-stranded vector, and subjected to DNA polymerizing enzymes such as $E.\ coli$ polymerase I Klenow fragment, in order to complete the synthesis of the mutation-bearing strand. Thus, a heteroduplex is formed wherein one strand encodes the original non-mutated sequence and the second strand bears the desired mutation. This heteroduplex vector is then used to transform appropriate cells, such as $E.\ coli$ cells, and clones are selected which include recombinant vectors bearing the mutated sequence arrangement.

The preparation of sequence variants of the selected peptide-encoding DNA segments using site-directed mutagenesis is provided as a means of producing potentially useful species and is not meant to be limiting as there are other ways in which sequence variants of peptides and the DNA sequences encoding them may be obtained. For example, recombinant vectors encoding the desired peptide sequence may be treated with mutagenic agents, such as hydroxylamine, to obtain sequence variants. Specific details regarding these methods and protocols are found in the teachings of Maloy et al., 1994; Segal, 1976; Prokop and Bajpai, 1991; Kuby, 1994; and Maniatis et al., 1982, each incorporated herein by reference, for that purpose.

4.10 Biological Functional Equivalents

In certain embodiments, the inventors contemplate the preparation of engineered microorganisms having the ability to detoxify water and wastewater contaminants using the methods disclosed herein. In one embodiment, the inventors contemplate the transformation of autotrophic bacterial cultures, such as those listed in Table 2, to provide "second generation" denitrifying cell lines which have improved detoxification properties. Modification and changes may be made in the structure of the enzymes (or regulatory proteins) involved in this detoxification to provide such recombinantly engineered host cells. Such modifications would still lead to the creation of a host cell which encodes the necessary proteins, enzymes, or peptides to perform such biotic bioremediation.

The following is a discussion based upon changing the amino acids of a protein to create an equivalent, or even an improved, second-generation molecule. The amino acid changes may be achieved by changing the codons of the DNA sequence, according to Table 2.

For example, certain amino acids may be substituted for other amino acids in a protein structure without appreciable loss of interactive binding capacity with structures such as, for example, antigen-binding regions of antibodies or binding sites on substrate molecules. Since it is the interactive capacity and nature of a protein that defines that protein's biological functional activity, certain amino acid sequence substitutions can be made in a protein sequence, and, of course, its underlying DNA coding sequence, and nevertheless obtain a protein with like properties. It is thus contemplated by the inventors that various changes may be made in the peptide sequences of the disclosed compositions, or corresponding DNA sequences which encode said peptides without appreciable loss of their biological utility or activity.

TABLE 2

| Amino Acids | | | Codons | | | | | |
|---|---|---|---|---|---|---|---|---|
| Alanine | Ala | A | GCA | GCC | GCG | GCU | | |
| Cysteine | Cys | C | UGC | UGU | | | | |
| Aspartic acid | Asp | D | GAC | GAU | | | | |
| Glutamic acid | Glu | E | GAA | GAG | | | | |
| Phenylalanine | Phe | F | UUC | UUU | | | | |
| Glycine | Gly | G | GGA | GGC | GGG | GGU | | |
| Histidine | His | H | CAC | CAU | | | | |
| Isoleucine | Ile | I | AUA | AUC | AUU | | | |
| Lysine | Lys | K | AAA | AAG | | | | |
| Leucine | Leu | L | UUA | UUG | CUA | CUC | CUG | CUU |
| Methionine | Met | M | AUG | | | | | |
| Asparagine | Asn | N | AAC | AAU | | | | |
| Proline | Pro | P | CCA | CCC | CCG | CCU | | |
| Glutamine | Gln | Q | CAA | CAG | | | | |
| Arginine | Arg | R | AGA | AGG | CGA | CGC | CGG | CGU |
| Serine | Ser | S | AGC | AGU | UCA | UCC | UCG | UCU |
| Threonine | Thr | T | ACA | ACC | ACG | ACU | | |
| Valine | Val | V | GUA | GUC | GUG | GUU | | |
| Tryptophan | Trp | W | UGG | | | | | |
| Tyrosine | Tyr | Y | UAC | UAU | | | | |

In making such changes, the hydropathic index of amino acids may be considered. The importance of the hydropathic amino acid index in conferring interactive biologic function on a protein is generally understood in the art (Kyte and Doolittle, 1982, incorporate herein by reference). It is accepted that the relative hydropathic character of the amino acid contributes to the secondary structure of the resultant protein, which in turn defines the interaction of the protein with other molecules, for example, enzymes, substrates, receptors, DNA, antibodies, antigens, and the like. Each amino acid has been assigned a hydropathic index on the basis of their hydrophobicity and charge characteristics (Kyte and Doolittle, 1982), these are: isoleucine (+4.5); valine (+4.2); leucine (+3.8); phenylalanine (+2.8); cysteine/cystine (+2.5); methionine (+1.9); alanine (+1.8); glycine (−0.4); threonine (−0.7); serine (−0.8); tryptophan (−0.9); tyrosine (−1.3); proline (−1.6); histidine (−3.2); glutamate (−3.5); glutamine (−3.5); aspartate (−3.5); asparagine (−3.5); lysine (−3.9); and arginine (−4.5).

It is known in the art that certain amino acids may be substituted by other amino acids having a similar hydropathic index or score and still result in a protein with similar biological activity, i.e., still obtain a biological functionally equivalent protein. In making such changes, the substitution of amino acids whose hydropathic indices are within ±2 is preferred, those which are within ±1 are particularly preferred, and those within ±0.5 are even more particularly preferred. It is also understood in the art that the substitution of like amino acids can be made effectively on the basis of hydrophilicity. U.S. Pat. No. 4,554,101, incorporated herein by reference, states that the greatest local average hydrophilicity of a protein, as governed by the hydrophilicity of its adjacent amino acids, correlates with a biological property of the protein.

As detailed in U.S. Pat. No. 4,554,101, the following hydrophilicity values have been assigned to amino acid residues: arginine (+3.0); lysine (+3.0); aspartate (+3.0±1); glutamate (+3.0±1); serine (+0.3); asparagine (+0.2); glutamine (+0.2); glycine (0); threonine (−0.4); proline (−0.5±1); alanine (−0.5); histidine (−0.5); cysteine (−1.0); methionine (−1.3); valine (−1.5); leucine (−1.8); isoleucine (−1.8); tyrosine (−2.3); phenylalanine (−2.5); tryptophan (−3.4). It is understood that an amino acid can be substituted for another having a similar hydrophilicity value and still obtain a biologically equivalent, and in particular, an immunologically equivalent protein. In such changes, the substitution of amino acids whose hydrophilicity values are within ±2 is preferred, those which are within ±1 are particularly preferred, and those within ±0.5 are even more particularly preferred.

As outlined above, amino acid substitutions are generally therefore based on the relative similarity of the amino acid side-chain substituents, for example, their hydrophobicity, hydrophilicity, charge, size, and the like. Exemplary substitutions which take various of the foregoing characteristics into consideration are well known to those of skill in the art and include: arginine and lysine; glutamate and aspartate; serine and threonine; glutamine and asparagine; and valine, leucine and isoleucine.

4.11 Means for Preparing Site-Directed Mutagenized Enzymes

In certain embodiments, engineered microorganisms may be developed to enhance the rate or specificity of pollutant detoxification by the autotrophic microorganisms. In particular, enzymes responsible for bacterial degradation of target pollutants, and the underlying DNA sequences which encode them may be mutagenized to improve performance of the biotic processes. As such, the invention concerns the preparation of mutants using recombinant DNA methodologies which are known to those of skill in the art.

Nucleic acid segments encoding degradative enzymes may be subjected to site directed mutagenesis to prepare variants having improved remediation properties as described above. One preferred method for the mutagenesis of such polynucleotides is the PCR™-based strand overlap extension (SOE) (Ho et al., 1989) method. The techniques of PCR™ are well-known to those of skill in the art, as described hereinabove. The SOE procedure involves a two-step PCR™ protocol, in which a complementary pair of internal primers (B and C) are used to introduce the appropriate nucleotide changes into the wild-type sequence. In two separate reactions, flanking PCR™ primer A (restriction site incorporated into the oligo) and primer D (restriction site incorporated into the oligo) are used in conjunction with primers B and C, respectively to generate PCR™ products AB and CD. The PCR™ products are purified by agarose gel electrophoresis and the two overlapping PCR™ fragments AB and CD are combined with flanking primers A and D and used in a second PCR™ reaction. The amplified PCR™ product is agarose gel purified, digested with the appropriate enzymes, ligated into an expression vector, and transformed into *E. coli* JM101, XL1-Blue™ (Stratagene, La Jolla, Calif.), JM105, or TG1 (Carter et al., 1985) cells. Clones are isolated and the mutations are confirmed by sequencing of the isolated plasmids.

4.12 Means for Expressing Enzymes Using Recombinant Vectors

In many cases, it may be desirable to engineer the disclosed microorganisms to improve the detoxification activity of the cells in situ. A particular aspect of the present invention is the production of recombinant degradative enzymes in large quantity. Such methods are well-known to those of skill in the art, and have been described in detail hereinabove. To overexpress one or more of the enzymes necessary for the detoxification of environmental contaminants, DNA fragments encoding the appropriate polypeptides may be cloned into a variety of expression vectors. Such vectors may contain a multiple restriction enzyme cloning site that situates the nucleic acid segment of interest such that its expression is controlled from an inducible promoter. Methods for determining orientation of the inserted segment, induction of the promoter, growth conditions, and restriction enzyme analysis, and recovery of the produced protein are well-known to those of skill in the art. Expression and quantitation of the polypeptides are determinable via standard methods such as SDS-PAGE, Western blot analysis, and protein determination assays.

5.0 EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

5.1 Example 1

Bioaugmentation of Fe(0) Barriers

The inventors have shown that combining Fe(0) with an active methanogenic population can enhance the removal of chlorinated aliphatic compounds. Batch serum bottle assays with iron powder, iron filings, or steel wool were used to investigate the potential of the iron-methanogen treatment process. Flow-through column reactors packed with steel wool were also used. Systems were seeded with a methanogenic enrichment culture or with pure cultures of *Methanosarcina barkeri* or *Methanosarcina thermophila*. The transformation of carbon tetrachloride (CT) and its dechlorinated homologs, chloroform (CF) and dichloromethane (DCM), are described in this example.

The iron-methanogen combination resulted in higher rates of removal and more complete dechlorination. FIG. 4A shows that CT removal is faster when both Fe(0) and the methanogenic enrichment are together. The effect is even more pronounced with CF, which is produced from hydrogenolysis of CT and is subsequently removed much with the iron-methanogen combination (FIG. 4B). Product distribution is also better for the iron-methanogen combination, which exhibited more complete dechlorination (FIG. 5). These data and other studies have shown that when the methanogenic enrichment is present, the predominant product is DCM while CF is the dominant product with Fe(0) alone. With acclimation (5–10 days), DCM is subsequently biodegraded readily. Preliminary studies with pure cultures of *Methanosarcina barkeri* and *Methanosarcina thermophila* have shown that there may be a pathway shift (from hydrogenolysis towards reductive hydrolysis) when Fe(0) is bioaugmented; more $^{14}CO_2$ is formed when the bacteria and Fe(0) are incubated together.

Pseudo-first-order rate coefficients were determined in a different set of studies to evaluate the kinetic advantage of the iron-methanogen combination. For both carbon CT and CF, decay rate coefficients were significantly higher for the iron-methanogen combination than for the iron-only, bacteria-only, and iron-killed bacteria systems (Table 3). The rate coefficient for the combined Fe(0) and live cell treatment was 2.4 times the sum of the rate coefficients for the separate treatments containing Fe(0) or live cells. Hence, abiotic and microbial CF degradation processes were not independent when Fe(0) and cells were combined in a single reactor. This synergism was attributed to the production of cathodic (water-derived) hydrogen as a result of the oxidation of Fe(0). This increased the availability of primary substrates available for CF cometabolism.

TABLE 3

PSEUDO-FIRST-ORDER RATE COEFFICIENTS FOR CF

| Treatment | Pseudo-first-order rate coefficient (day$^{-1}$) |
| --- | --- |
| Fe(0) + live cells | 0.72 |
| Fe(0) + killed cells | 0.20 |
| live cells alone | 0.10 |
| Fe(0) alone | 0.08 |

Column studies with CF and steel wool showed that the process is stable over time (FIG. 6). Removal of CF in the steel-wool column seeded with a methanogenic enrichment was consistently higher than the steel-wool-only column. These data show that CF removal by anaerobic bacteria using $H_2$ as the sole electron donor is sustainable, an observation that was uncertain based on batch studies where methanogenesis was inhibited by the presence of CF. An active consortium of methane-producing organisms was established as evidenced by the increased production of methane (FIG. 7).

It was shown that Fe(0) abiotically reduced nitrate to ammonium and that this process could be enhanced by the presence of autotrophic denitrifiers which reduce nitrate to more innocuous products (i.e., $N_2O$ and $N_2$). Such results are particularly important for environmental sites such as uranium mill tailings, where waste nitric acid is a common contaminant.

It has also been shown that removal of chlorinated compounds such as carbon tetrachloride can be accomplished under denitrifying conditions with the production of more oxidized end products ($CO_2$) than usually seen under sulfate-reducing or methanogenic conditions (Criddle et al., 1990). Denitrifiers have also been shown to directly participate in the removal of Cr(VI) from the aqueous phase (Guan et al., 1993). Thus, the invention provides a means for the combined synergistic processes that combine Fe(0) substrates and detoxifying autotrophic bacterial systems to remove target environmental pollutants.

Studies demonstrate that microbial-Fe(0) treatment systems offer significant advantages over approaches where either process is used alone to treat reducible contaminants such as chlorinated compounds, Cr(VI), U(VI), nitroaromatic compounds, and various agrochemicals. In a field-scale application, cells grown in a fermenter or sludge from an anaerobic digester could be injected into a permeable, iron-containing, reactive barrier similar to that proposed by Blowes et al. (1995). For some compounds, combined microbial-abiotic systems may accelerate the rate of transformation and extent of mineralization. Nevertheless, the proliferation of bacteria in an improperly designed reactive barrier could reduce the hydraulic conductivity of the barrier, thereby hindering the flow of groundwater through it.

Hydrogen produced from the corrosion of Fe(0) by $H_2O$ serves as energy source for the microbes and as electron donor for the biotransformation of reducible contaminants. The present invention provides the first reported combination of iron-microbial consortia for remediating pollution in situ and ex situ.

Although $H_2$ is one of the most thermodynamically favorable substrates for anaerobic microbes, its use as electron donor for bioremediation purposes has been limited by its low solubility. The observation that cathodic $H_2$ can support reductive dechlorination and other reductive biotransformations by anaerobic bacteria has significant application.

5.1.1 Materials and Methods

5.1.1.1 Experimental Design

Batch aquifer microcosms have been used to evaluate the potential for anaerobic bacteria to enhance the removal of Cr(VI), U(VI), and TCE in the presence of Fe(0). In order to determine the effect of competing electron acceptors commonly found in the subsurface, Fe(0) bioaugmentation studies were conducted under four electron acceptor conditions: denitrifying, iron reducing, sulfate reducing, and methanogenic. For each condition, biological and abiotic transformation mechanisms are studied separately and interactively to evaluate potential synergistic effects and interaction mechanisms. Some microcosms were amended with Fe(0) alone, some with bacteria, and some received both bacteria and Fe(0). Positive controls for microbial activity consisted of Fe(0)-free microcosms fed $H_2$. Sterile controls without Fe(0) were included to discern biodegradation from other potential losses (Table 4).

To investigate potential synergistic or antagonistic substrate interactions, the transformation of the target compounds was studied when present together and separately. Differences in removal efficiencies and product distribution were evaluated statistically using Student's t-test at the 95% confidence level. These studies demonstrated the benefits of combining Fe(0) with anaerobic bioremediation to remove various contaminant combinations. The data also establish time scales for removal of the target contaminants below acceptable levels, and assesses the nature of the contaminant mixture and redox conditions and how they affect removal kinetics and product distribution.

TABLE 4

BATCH REACTOR SETS FOR EACH ELECTRON ACCEPTOR CONDITION

| Set Number | Description | Number of Replicates |
|---|---|---|
| 1 | Abiotic reactor with Fe(0), amended with TCE + Cr(VI) + U(VI) | 3 |
| 2 | Abiotic reactor with Fe(0), amended with TCE | 3 |
| 3 | Abiotic reactor with Fe(0), amended with Cr(VI) | 3 |
| 4 | Abiotic reactor with Fe(0), amended with U(VI) | 3 |
| 5 | Resting cells (without Fe(0)) amended with TCE + Cr(VI) + U(VI) | 3 |
| 6 | Resting cells (without Fe(0)) amended with TCE | 3 |
| 7 | Resting cells (without Fe(0)) amended with Cr(VI) | 3 |
| 8 | Resting cells (without Fe(0)) amended with U(VI) | 3 |
| 9 | Biologically active (without Fe(0), fed $H_2$) amended with TCE + Cr(VI) + U(VI) | 3 |
| 10 | Biologically active (without Fe(0), fed $H_2$) amended with TCE | 3 |
| 11 | Biologically active (without Fe(0), fed $H_2$) amended with Cr(VI) | 3 |
| 12 | Biologically active (without Fe(0), fed $H_2$) amended with U(VI) | 3 |
| 13 | Bioaugmented Fe(0), amended with TCE + Cr(VI) + U(VI) | 3 |
| 14 | Bioaugmented Fe(0), amended with TCE | 3 |
| 15 | Bioaugmented with Fe(0), amended with Cr(VI) | 3 |
| 16 | Bioaugmented Fe(0), amended with U(VI) | 3 |
| 17 | Abiotic controls (without Fe(0), fed $H_2$), amended with TCE + Cr(VI) + U(VI) | 3 |
| | TOTAL | 51 |

In one study, an objective was to determine the effect that Fe(0) had on the viability of various microbial populations (i.e., denitrifiers, iron reducers, sulfate reducers, and methanogens) exposed to Cr(VI), U(VI), and chlorinated solvent mixtures, and to evaluate the effect that bacteria have on the abiotic reduction of the target contaminants by Fe(0).

Another study determined how environmental factors and substrate interactions affected the efficiency of bioaugmented Fe(0) barriers to attenuate the migration of chlorinated solvents, radionuclide, and heavy metal mixtures under various electron acceptor conditions. Continuous flow aquifer columns were constructed to mimic in situ conditions of microbial and Fe(0) exposure to contaminant mixtures (Table 5). As was the case with microcosm studies, biological and abiotic processes were studied separately and interactively to analyze the synergistic effect of combining Fe(0) with microorganisms. Selected perturbations of the hydraulic regime and of the redox conditions were applied to evaluate how engineered manipulations affect removal efficiency and product distribution.

The ability of bioaugmented Fe(0) barriers to remove excess nitrate and sulfate from uranium mill tailings is also evaluated in these columns. The effect of microbial growth on hydrodynamic properties may also be evaluated using tracer studies.

TABLE 5

FLOW-THROUGH COLUMN SETS

| Set Number | Description | Number of Replicates |
|---|---|---|
| 1 | Abiotic columns, packed with aquifer material + Fe(0), fed TCE + Cr(VI) + U(VI) | 2 |
| 2 | Biologically active, packed with aquifer material (no Fe(0)), fed TCE + Cr(VI) + U(VI) | 2 |

TABLE 5-continued

FLOW-THROUGH COLUMN SETS

| Set Number | Description | Number of Replicates |
|---|---|---|
| 3 | Biologically active, packed with aquifer material + Fe(0), fed TCE + Cr(VI) + U(VI) | 2 |
| 4 | Controls, packed with aquifer material (no Fe(0)), fed bactericide + TCE + Cr(VI) + U(VI) | 2 |
| | TOTAL | 8 |

5.1.1.2 Microcosm Preparation

Aquifer microcosms are prepared in triplicate with 200 mL of basal mineral medium and 50 g of aquifer material in 250-mL serum bottles. The medium is bicarbonate-buffered near pH 7. This provides bicarbonate for autotrophic growth and precludes confounding effects by phosphate buffers reacting with iron. Microcosms are purged continuously with $N_2/CO_2$ (80/20 vol./vol.) to remove dissolved oxygen. Prior to capping them with Mininert valves, microcosms are amended with either Master Builder→Fe(0) filings (15% by weight) (Orth and Gillham, 1996), anaerobic bacteria, or both. The anaerobic bacteria are enriched from soil and sewage sludge under appropriate electron acceptor conditions. Sterile controls are autoclaved and poisoned with $HgCl_2$ (200 mg/l). No treatment controls (without Fe(0) or bacteria addition) are also prepared to obtain a baseline for comparing the effectiveness of different treatments. All microcosms are incubated quiescently in the dark at 20° C.

The basal medium provides inorganic nutrients for microbial growth (e.g., $NH_4^+$, trace metals, and the respective electron acceptor(s)) and contains various combinations of target contaminants (Table 3). Initial concentrations are representative of those found at natural sites. Levels of TCE contamination have been reported as 0.0002–870 mg/L in groundwaters and 0.0002–12,000 mg/kg in soils and sediments; levels of chromium contamination have been reported as 0.004–9 mg/L in groundwater and 1–6,900 mg/kg in soils and sediments; and levels of uranium contamination have been reported as 0–11,700 mg/L in groundwater and 0.0002–16 mg/kg in soils and sediments (Riley et al., 1992).

Electron acceptors, $H_2$, $CH_4$, Cr(VI), Cr(III), U(VI), U(IV), TCE and its dechlorinated homologues are monitored over time in each microcosm to compare lag periods and biodegradation rates for different treatment sets.

The lag period is determined as the time during which contaminant concentrations remain constant. Pseudo zero-order rates can be estimated as the ratio of contaminant removed (corrected for appropriate controls) to the corresponding time after the lag period. This information is used to statistically evaluate the ability of different treatments and mixtures to stimulate (or inhibit) the degradation of individual contaminants.

5.1.13 Aquifer Columns

Eight glass columns,(58 cm long, 2.2 cm ID) equipped with lateral sampling ports are packed with aquifer material as described by Siegrist and McCarty (1987) (FIG. 8). One pair ("treatment" set) is packed with a mixture of aquifer material and Master Builder→Fe(0) filings (15% by weight) (Orth and Gillhan, 1996) and is seeded with anaerobic microorganisms. Two pairs ("no-treatment" sets) are packed with either seeded aquifer material alone or a aquifer material with Fe(0) filings alone; and a fourth pair ("sterile control" set) is packed with aquifer material and autoclaved for 4 h at 120° C. The feed solution to the sterile set also contains a bactericide ($HgCl_2$ at 200 mg/L). Cr(VI), U(VI), and TCE is initially fed at 10 mg/l (each). Influent analogue concentrations are based on the findings of the aquifer slurry studies. Columns are fed in an upflow mode at 2 ml/h (about 0.5 ft/day superficial velocity) using Harvard Model 22 syringe pumps equipped with 100 ml gas-tight glass and Teflon syringes (FIG. 9). Column effluents are analyzed regularly for residual target contaminants, pH, dissolved oxygen, nitrate, nitrite, sulfate, ferrous iron, and methane. A Microtox→system is used to evaluate the efficacy of different columns in reducing the effluent toxicity.

Bromide tracer studies are performed at the beginning and end of the study to determine changes in liquid detention time, pore volume, and dispersion in the packed columns. A bromide solution (50 mg/l) is continuously injected at 2 ml/h. Effluent bromide concentrations are monitored until they reach influent levels. The mean liquid detention time is estimated as the time required for the effluent bromide concentration to reach 50% of the influent concentration. This time is multiplied by the flow rate in order to estimate the pore volume of the aquifer column. Porosity is calculated as the ratio of pore volume to the total volume of the column. The liquid detention time is also used as a baseline to evaluate potential retardation of target contaminants caused by adsorption. Retardation factors is estimated as the ratio of the time required for 50% breakthrough of BTX in sterile columns to the mean liquid retention time. The dispersion coefficient is estimated by fitting the bromide breakthrough data to an advection/dispersion solution (van Genutchten and Parker, 1984).

5.1.1.4 Analytical Methods

Gas chromatography with mass spectrometry (GC-MS), flame ionization (GC-FID), or electron capture (GC-ECD) is used for measurement of TCE and its degradation products. GC-MS is performed using a Finnigan MAT GCQ mass spectrometer (San Jose, Calif.). A purge and trap extraction system (Tekmar 3000 Purge and Trap, Cincinnati, Ohio) is used for GC-MS analysis of volatiles, as described in EPA Method 8260A. The volatile organic chemicals perchloroethylene, trichloroethylene, dichloroethylenes, vinyl chloride, ethene and ethane are analyzed via these methods.

Reduced iron is analyzed in solution by the ferrozine method or the phenanthroline method (1992 Standard Methods 3500-Fe D), and total dissolved iron is analyzed after 0.2 μm membrane filtration by Perkin Elmer 3300 Atomic Absorption Spectrometer (Norwalk, Conn.) with carbon furnace (Standard Methods 3500-Fe B).

Hexavalent chromium is analyzed calorimetrically using a modified SW-846 Method 7196A. In the absence of interfering amounts of substances such as molybdenum, vanadium, and mercury, Cr(VI) is determined by a red-violet color producing reaction with diphenylcarbizide in acid solution. 95 mL of sample extracted with 3% sodium carbonate (Katz, 1991) is mixed with 2 mL of diphenylcarbazide solution and sulfuric acid is added to bring solution pH to approximately 2. The solution is allowed to stand for 10 min and is then transferred to a 1 cm cuvette for colorimetric measurement at 540 nm. Kazi and Katz (1987) showed that this extraction procedure selectively removes both the soluble and insoluble hexavalent chromium without oxidizing the trivalent chromium. Digestion of the sample with a sulfuric-nitric acid mixture, and then oxidation with potassium permanganate, converts all chromium species to Cr(VI) (Clesceri et al., 1989). This is then reacted with diphenylcarbide and filtered to determine total chromium. The amount of Cr(III) is determined as the difference between total chromium and Cr(VI). The presence of Cr(III) may be confirmed by electron spin resonance spectroscopy (Lieber et al., 1964).

Total dissolved uranium is measured by radiochemical methods (Standard Methods 7500-U B). Radioisotopes 235, and 238 may be separated by the isotopic method using electrodeposition (Standard Method 7500-U C). These analyses are performed using a Beckman LS6000IC liquid scintillation counter (Fullerton, Calif.).

5.2 Example 2

Fe(0) as an Electron Donor and Energy Source for ISAD

To demonstrate that Fe(0) can serve as the ultimate electron donor and energy source for chemoautotrophic, biological denitrification, a dual-flask apparatus was used (see FIG. 9, insert). Two 250-ml Erlenmeyer flasks were fused at the top. An opening was made on the side of each flask for sample addition or removal. One flask contained 10 g of Fe(0) and 100 ml of water, and the other flask contained 100 ml of mineral medium with nitrate (40 mg/l as N). The flasks were purged with $N_2/CO_2$ (80:20, vol./vol.) following inoculation with *P. denitrificans*. This set up permitted the diffusion of cathodic $H_2$ from the Fe(0)-containing flask through the connecting glass tubing to the seeded flask while avoiding potential microbial inhibition by iron species. Nitrate was removed below detection limits within 5 days in this apparatus with a concomitant increase in microbial concentration as measured by optical density at 600 nm (FIG. 9). No nitrate removal or microbial growth was observed in control runs, lacking either nitrate, Fe(0) or inoculum, indicating the Fe(0) corrosion and nitrate reduction were coupled via hydrogenotrophic denitrifiers.

Studies were also conducted in batch reactors to investigate nitrate reduction kinetics and to determine biotic and abiotic nitrate removal products in the presence of iron powder (2.02 $m^2/g$, Aldrich Chemical Co., Milwaukee, Wis.), iron filings (0.14 $m^2/g$, Fisher Chemical Co., Fairlawn, N.J.), and steel wool (0.0075 $m^2/g$, Rhodes American, Chicago, Ill.). Serum bottles (250 ml) capped with Miniert® valves were filled with 100 ml of carbonate-buffered, minimal medium with nitrate (50 mg/l as N). Ten g of acid-washed Fe(0) powder, Fe(0) filings, steel wool, or 40 ml $H_2$ (1 atm) gas were used as electron donors. Some reactors were seeded with hydrogenotrophic denitrifiers, either axenic cultures of *P. denitrificans* ATCC 17741 and *P. denitrificans* (formerly *Thiosphaera pantotropha*), ATCC 35512, or mixed cultures of indigenous aquifer microorganisms enriched with $H_2$ and nitrate. Control (unseeded) reactors were similarly prepared. The reactors were purged with $N_2/CO_2$ (80:20, vol./vol.) following inoculation to remove dissolved oxygen and to provide a carbon source of autotrophic growth.

In the absence of bacteria, Fe(0) powder exhibited faster rates for both nitrate removal and $H_2$ production than Fe(0) filings. This was attributed to the higher specific surface area available for reaction in the Fe(0) powder. In seeded reactors, however the more reactive Fe(0) powder had an inhibitory effect on biological dentrification. This was attributed to the large increase in pH (pH>10) due to Fe(0) corrosion. The inhibitory effect of high pH on dentrification was verified in separate incubations with $H_2$-fed *P. denitrificans*, which ceased to remove nitrate at pH values greater than 10. Rectors containing Fe(0) filings and bacteria did not exhibit such a large pH increase and completely removed the added nitrate within one month, while abiotic reactors with Fe(0) filings did not. Thus, denitrifiers had a more beneficial effect when combined with the less reactive Fe(0) filings than with the more reactive Fe(0) powder.

Batch studies were also conducted to compare the fate of nitrate when Fe(0) powder, steel wool, or $H_2$ gas served as electron donors. An axenic culture of *P. denitrificans* was used for inoculation. An acetylene block technique was performed on seeded reactors to quantify biological dentrification (per $N_2O$ accumulation) As in the previous study, faster nitrate removal occurred in reactors containing Fe(0) powder than in reactors containing steel wool or $H_2$ gas. Incubation times to remove all of the added nitrate (50 mg/l as N) were 8 days for the seeded reactors amended with Fe(0) powder and 12 days for the seeded reactors amended with steel wool or with $H_2$ gas. Nevertheless, the end products for the reactors containing steel wool more closely resembled the ideal $H_2$-amended reactors (Table 6), where most of the initial nitrate was biologically denitrified (as shown by $N_2O$ accumulation) rather than reduced to the less favorable product, ammonium, as seen in the reactors containing Fe(0) powder.

TABLE 6

FATE OF NITRATE IN BATCH REACTORS EXPRESSED AS A PERCENTAGE OF THE ADDED 50 MG/L NITRATE (AS N)

| Treatment | Unreacted $(N)_3$—N | Denitrified Biologically $(N_2O$—N) | Reduced by Fe(0) Abiotically $(NH_4^+$—N) | Assimilated by Bacteria (Organic N) | Mass Balance Closure |
|---|---|---|---|---|---|
| Fe(0) Powder | 0 | 0 | 98% ± 0.6% | 0 | 98% ± 0.6% |
| Fe(0) Powder & Bacteria | 0 | 2% ± 0.8% | 94% ± 3.0% | 2% ± 0.2% | 98% ± 1.8% |
| Steel Wool | 68% ± 3.2% | 0 | 30% ± 2.6% | 0 | 98% ± 0.6% |
| Steel Wool & Bacteria | 0 | 64% ± 10.8% | 28% ± 8.0% | 2% ± 2.0% | 94% ± 1.2% |
| $H_2$ Gas & Bacteria | 0 | 93% ± 2.4% | 0 | 1% ± 0.4% | 94% ± 0.8% |

To investigate the ability of bacteria to sustain nitrate removal in the presence of Fe(0) in a flow-through system, columns packed with steel wool and seeded with mixed cultures of indigenous, aquifer denitrifiers were operated over several months. The columns used were constructed by fusing two 25 mm, threaded-glass connectors (Ace Glass, Vineland, N.J.) together. The columns had an inner diameter of 2.5 cm and were 26.5 cm long. The ends were sealed with threaded, PFTE stoppers containing fitted-glass filter discs (Ace Glass). Sampling ports were made along the length of the column by making a small opening and fusing a 1.5 dram vial with the bottom cut of onto the column. The sample ports were capped with 13 mm, Teflon®-lined Mininert® valves (Alltech Associates, Inc., Deerfield, Ill.).

Mineral medium containing nitrate (50 mg/l as N) was pumped in an up-flow mode into the columns using a Masterflex® (Barrington, Ill.) 7523-30 peristaltic pump with a 7519-15 pump head. The influent reservoir was a 25-liter Nalgene™ polyethylene carboy (Nalge Co., Rochester, N.Y.). The influent reservoir was continually purged with an $N_2/CO_2$ (80:20, vol./vol.) gas mix using Masterflex® 6426-16 tubing (3.1 mm inner diameter) with a stone diffuser. The influent tubing was Masterflex® 6402-14 tubing with 1.6 mm inner diameter. The tubing was approximately 2.4 m long, running from the bottom of the influent reservoir to the head of the column. The effluent tubing was Teflon® having an inner diameter of 1.6 mm and a length of about 0.5 m. The end of the effluent tubing was adapted for sampling with a flangeless ferrule and nut arrangement, a 1/4-28 adapter male luer lock fitting. Hamilton (Reno, Nev.) 3-way sampling valves were placed influent and effluent to the columns in order to redirect flow for sample collection, dissolved oxygen measurement, or to stop flow in the system. Preliminary results over 4 months show that this is a sustainable process, and that seeded columns exhibit higher nitrate removal efficiencies (60%) than unseeded controls (40%).

5.3 Example 3

Cathodic $H_2$ as Electron Donor for $CHCl_3$ Co-Metabolism by a Mixed, Methanogenic Culture The inventors have exploited the use of elemental iron ($Fe^0$) for treatment of highly chlorinated organic compounds. While early studies found little microbiological contribution to degradation in laboratory and field tests, recent work has focused exclusively on abiotic processes. In studies conducted with a mixed, methanogenic culture, however, pseudo-first-order rate coefficients for chloroform degradation were at least 3.6 times greater in serum bottle incubations containing 40 mesh iron filings and live cells as compared to incubations containing $Fe^0$ and killed cells, $Fe^0$-free incubations with live cells. CF cometabolism and methanogenesis was apparently supported using cathodic hydrogen produced by anaerobic corrosion of the added $Fe^0$. The use of selective microbial inhibitors showed that $H_2$-consuming methanogens and not homoacetogens were responsible for CF degradation. The sustainability of the process was established in a 60-day column study using steel wool as support for microbial growth. The observation that cathodically produced $H_2$ can support reductive dechlorination by anaerobic bacteria has significant practical implications.

5.3.1 Materials and Methods

5.3.1.1 Batch Reactors

Batch studies were conducted in the dark at 20° C. using 25 mL liquid volume in sealed, 38 mL serum bottles. Duplicates were used for all treatments. Bottles were incubated in an inverted position on a circular action shaker table (Lab-Line) at 200 rpm. Initial batch studies examined the effect that amending methanogenic incubations with $Fe^0$ had on the kinetics of CF transformation. Iron filings (2 g, 40 mesh, specific surface area 0.237 $m^2/g$, Malinkrodt) were weighed into selected bottles. Bottles were then filled with DI water, sealed with Teflon™-coated rubber septa (West Co., Phoenixville, Pa.), and capped with aluminum crimp caps. Bottles were flushed with $N_2/CO_2$ gas (80:20, v/v) through the septa to displace the water. A 100 mL glass, gas-tight syringe (Scientific Glass Engineering, Australia) was used to inject bottles with 25 mL of either freshly prepared mineral medium, cell suspension from a stock culture reactor, or autoclaved cell suspension (120° C. for 20 min). The headspace gas exited through a 25-gauge needle. The mineral medium used in these studies was the same as that supplied to the stock culture reactor. Transformation studies were initiated by injecting a volume of CF stock solution through the septum with a 10 μL syringe. CF-free controls containing iron and live cell suspension were used to investigate the inhibition of methanogenesis by CF. Bottles were sampled periodically for CF, DCM, hydrogen, and methane. The liquid-gas mass transfer coefficient, $k_L\alpha$ was determined using the method of Tatara et al. (1993).

A study was conducted to elucidate the possible roles of methanogens and homoacetogens in cathodic hydrogen consumption and CF degradation. Two microbial inhibitors were used for this purpose: bromoethanesulfonic acid (BESA) and vancomycin. BESA is a specific methanogenic inhibitor (Sparling and Daniels, 1987). Vancomycin is an antibiotic that inhibits eubacterial cell wall formation (Bock and Kandler, 1985). Incubations containing 2 g of iron filings were amended with neither, one, or both of the inhibitors at concentrations of 50 mM BESA (Zinder et al., 1984; Aguilar et al., 1995) or 100 mg/L vancomycin (DiStefano et al., 1992; Aguilar et al., 1995; Freedman and Gossett, 1989; Perkins et al., 1994). $Fe^0$-free incubations with a $N_2/CO_2$ headspace received 2 mL of $H_2/CO_2$ gas and neither, one, or both of the inhibitors at the same concentrations. The bottles were sampled daily for hydrogen and methane. When hydrogen reached low levels in some of the $H_2$-amended incubations, the headspace of all of the $H_2$-additional 2 mL of $H_2/CO_2$ gas was injected into the serum bottles. This cycle was repeated once more, and this time a volume of CF-saturated stock was also injected into the bottles.

5.3.1.2 Column Reactors

A study employing column reactors was conducted over a 60-d period to determine if the CF degradation activity observed with batch reactors was sustainable. Three glass chromatography columns (2 cm i.d.×20 cm) were used to study the transformation of CF under continuous-flow conditions. Steel wool (0.0075 $m^2/g$, Medium 1, Rhodes/American, Chicago, Ill.) was used as an iron source and physical support for the attachment of bacteria. The chemical composition of the steel wool, as reported by the manufacturer, was (in %) Fe (52), Si (30), C (16), Mn (1.25), P (0.7), and S (0.05). Two columns were packed end-to-end with 5.5 g sections of an unrolled steel wool pad. The third column was used as a sterile (autoclaved) control to evaluate volatilization losses and was filled with 5 mm-diameter glass beads. One steel wool-filled column was seeded with two 100 mL aliquots of cell suspension from the stock culture reactor using a 100-mL glass, gas-tight syringe. The microorganisms were allowed to colonize the steel wool for 2 days with no flow to the column. The columns were then operated for 2 w with CF-free influent, using the same medium that was supplied to the stock culture reactor, but without the addition of acetic acid. The medium was buffered by adding 1 mL of 1 N HCl to 200 mL of fresh medium and then adjusting the pH to 6.7 with $NaHCO_3$. After 2 w, CF was added to the feed solution from the CF stock solution using a 10 µL syringe. Influent was pumped into the columns through Teflon™ tubing from 25 mL glass, gas-tight syringes (Hamilton) with a syringe pump (Harvard Apparatus). The columns were fed upflow at a volumetric flow rate of 7.9 mL/d. The porosity of the steel wool- and glass bead-filled columns was 0.90 and 0.30, respectively, resulting in superficial velocities of 2.8 and 8.4 cm/d and hydraulic retention times of 7.2 and 2.4 d, respectively. Effluent samples were taken with disposable syringes attached to Teflon™ tubing, which extended to the top of the steel wool or glass beads.

5.3.1.3 Chemicals and Stock Solutions

CF (high-performance liquid chromatography (HPLC) grade) and DCM (certified American Chemical Society (ACS) grade) were purchased from Fisher Scientific (Pittsburgh, Pa.). Stock aqueous solutions of CF and DCM were prepared by adding about 5 mL of each chemical to 25 mL of autoclaved, distilled deionized water in 43 mL glass serum bottles sealed with Teflon™-lined rubber septa and aluminum crimp caps. Other chemicals used included acetic acid (glacial, Malinkrodt), methane gas (100%, Scott Specialty Gases), 2-bromoethanesulfonic acid (98%, Aldrich Chemical Company, Milwaukee, Wis.), and vancomycin (Sigma Chemical Company, St. Louis, Mo.).

5.3.1.3 Stock Culture Reactor

The source of organisms was a magnetically stirred, 9.5 L glass reactor containing an acetate-enriched methanogenic cell suspension volume of 8 L. The reactor was maintained at 20° C. with a 40-d hydraulic retention time, such that 200 mL of cell suspension was removed daily and replaced with fresh medium. The medium recipe has been listed previously (Hughes and Parkin, 1996). The medium was buffered with $NaHCO_3$ as needed to maintain a reactor pH of 6.9±0.1. The volatile suspended solids concentration of the reactor averaged 245±20 mg/L (n=5) at the time the studies were conducted.

5.3.1.4 Analytical Methods

CF, DCM, $H_2$, and $CH_4$ were determined by gas chromatography (GC) using headspace analysis. Headspace samples were withdrawn using a locking, gas-tight syringe (Precision Sampling Corp., Baton Rouge, La.) equipped with a 22-gauge side-port needle and then injected into a GC. The headspace of 38 mL batch reactors was directly sampled by this method. For the column reactors, a 1 mL aqueous sample was taken from an effluent sample port with a 3 mL disposable plastic syringe and, using a 25-gauge needle, injected into a 5 mL glass vial sealed with a Teflon™-coated, rubber septum and screw cap. The headspace of this bottle was then injected into a GC.

CF was analyzed using an HP 5890 Series II GC equipped with an electron capture detector and a DB-5 capillary column (J and W Scientific, Folsom, Calif.). DCM and $CH_4$ were analyzed on a HP 5890 Series II GC equipped with a flame ionization detector and a DB-WAX capillary column (J and W Scientific). $H_2$ was analyzed on a HP 5890 Series II GC equipped with a thermal conductivity detector using a Hayesep Q packed column (Alltech Associates). For the 38 mL batch reactors, sample sizes for CF, DCM, $H_2$, and $CH_4$ were 100, 500, 100, and 100 µL, respectively, with corresponding detection limits of 1.7, 15.3, 188, and 9.3 nmol/bottle, respectively. For the column reactors, a 500 µL sample size was used for CF, DCM, and $CH_4$, and detection limits were 0.07, 0.78, and 2 µM, respectively.

Acetate concentrations were determined by HPLC analysis using a PRP-X300 column (Hamilton), Gilson Model 306 pump, and Model 805 manometric module (pulse dampener). Peak areas were integrated using Gilson 712 Controller Software version 1.2. The detection limit was approximately 0.08 mM.

Biomass was measured as volatile suspended solids using Method 2540 E in Standard Methods (APHA, 1985). The pH was measured with a pH meter (Beckman Model F 72) and combination electrode (Fisher Scientific, Pittsburgh, Pa.).

5.3.2 Results

5.3.2.1 Batch Reactors

CF was transformed most rapidly in the incubations containing live cells and $Fe^0$ (FIG. 10A). DCM was detected only in the treatments containing cells and $Fe^0$ (FIG. 10B). The $H_2$ concentration in the incubations containing live cells and $Fe^0$ differed sharply depending on the presence of CF. $H_2$ behavior in the incubation containing live cells, $Fe^0$, and CF was similar to $H_2$ behavior in the treatment containing mineral medium and iron until the CF concentration in the live cell-$Fe^0$—CF treatment reached low levels, whereas $H_2$ in the CF-free incubation containing live cells and $Fe^0$ remained at low levels throughout (FIG. 10C). Likewise, CF affected methane production in the live cell-$Fe^0$ treatments; low levels of methane were measured in the live cell-$Fe^0$ incubation containing CF until the CF concentration reached low levels, while methane was steadily produced at a faster rate in the CF-free live cell-$Fe^0$ incubation (FIG. 10D).

CF was rapidly transformed and DCM was produced when $Fe^0$-free incubations containing live cells were amended with 2 mL of $H_2/CO_2$ (80:20, v/v) gas (FIG. 11). The slow disappearance of CF in the $H_2$-free control containing live cells indicated that an external electron donor was required for rapid CF transformation. Furthermore, adding $H_2$ to incubations containing autoclaved cell suspension had little effect on CF transformation, indicating that CF transformation using $H_2$ as an electron donor was enzymatic.

FIG. 12A and FIG. 12B show the impact of the inhibitors on cathodic hydrogen and methane levels in the incubations containing cells and iron. The behavior of the incubations was controlled by the methanogenic inhibitor BESA: bottles containing BESA alone or BESA and vancomycin responded similarly, while bottles containing vancomycin alone or no inhibitor behaved similarly. Hydrogen levels were similar in all bottles for the first 2 days. After this, the $H_2$ concentration in the BESA-amended incubation sets continued to increase, while the concentration of $H_2$ in the vancomycin or inhibitor-free incubations decreased, eventually becoming nondetectable (FIG. 12A). Similarly, methanogenesis was inhibited in both incubation sets containing BESA as compared to the inhibitor-free incubations or the incubations containing vancomycin only (FIG. 12B).

FIG. 13A, FIG. 13B, and FIG. 13C show the impact of the inhibitors on hydrogen consumption, methane production, and CF transformation in incubations supplied with $H_2$. In general, the behavior of the incubations was controlled by BESA, and vancomycin alone had no effect. During the first 2 days, neither of the inhibitors appeared to affect $H_2$ consumption. After this, however, the rate of $H_2$ consumption in the incubations containing vancomycin or no inhibitor remained steady, while the rate of $H_2$ consumption in the incubations amended with BESA alone or BESA and vancomycin decreased (FIG. 13A). The relatively constant $H_2$ concentration in the control reactor confirmed that the decrease in the $H_2$ levels in the live cell incubations was not due to volatile losses. Acetate was not detected (<0.08 mM) in liquid samples taken from the incubations during the first 3 days. Methane production in the incubations containing BESA alone or BESA and vancomycin was severely inhibited in comparison to methane production in the vancomycin- or inhibitor-free incubations (FIG. 13B). When bottles were resupplied with $H_2$, vancomycin had no effect on either $H_2$ consumption or methane production, while BESA severely inhibited both (FIG. 13A and FIG. 13B). Bottles were resupplied with $H_2$ on the ninth day and spiked with CF. Vancomycin alone had no impact on CF transformation (FIG. 13C). Moreover, the rate of CF transformation in incubations amended with BESA alone or BESA and vancomycin was similar and lower than in BESA-free incubations. Hydrogen consumption and methane production were inhibited in the presence of CF.

5.3.2.2 Continuous-Flow Column Studies

The CF concentration in the effluent from the abiotic, steel wool column, averaging 0.41±0.17 $\mu M$, was consistently greater than that from the methanogenic, steel wool column, which averaged 0.00±0.02 $\mu M$ CF (FIG. 14A). In fact, on only one occasion was CF detectable in the methanogenic column effluent. A small peak on chromatograms was visible at the DCM elution time (2.3 min) in samples from these two columns on several sampling events; however, this peak was not integrated. The effluent from the glass bead control column, 1.29±0.85 $\mu M$ CF, was not statistically different (at the 95% level) from the influent CF concentration, 1.61±0.49 $\mu M$ CF. This indicated that the loss of CF addition was initiated and increased 1 order of magnitude during the next 36 d to 7.43 mg of $CH_4/L$ on d 61 (FIG. 14B). The pH of the effluent from the methanogenic, steel wool column and the abiotic, steel wool column was 8.3 and 8.7, respectively.

5.3.3 Discussion

When the data shown in FIG. 4A was plotted as $\ln(M/M_0)$ versus t (where M is the total mass of CF (nmol of CF) in at bottle at time t, and $M_0$ is the initial mass of CF (nmol of CF)), linear plots were produced, indicating that CF transformation rates followed first-order kinetics. Slopes of these plots, i.e., pseudo-first-order rate coefficients, $\kappa(d^{-1})$, were then compared. The CF transformation rate coefficient for the treatment containing $Fe^0$ and live cells, 0.72 $d^{-1}$ ($r^2$=0.96), was greater than the value of $\kappa$ for the treatment containing live cells only, 0.10 $d^{-1}$ ($r^2$=0.81); killed cells and $Fe^0$, 0.20 $d^{-1}$ ($r^2$=0.99); and mineral medium and $Fe^0$, 0.08 $d^{-1}$ ($r^2$=0.63). The large value of the gas-liquid mass transfer coefficient, $\kappa_L a$, 95 $d^{-1}$, ensured that CF transformation kinetics were not limited by the rate of mass transfer between the liquid and gas phase.

Interestingly, combining $Fe^0$ and live cells was synergistic with respect to CF degradation; the rate coefficient for the combined $Fe^0$ and live cell treatment was 2.4 times the sum of the rate coefficients for the separate treatments containing $Fe^0$ or live cells. Hence, abiotic and microbial CF degradation processes were not independent when $Fe^0$ and cells were combined in a single reactor. This synergism apparently resulted from the production of hydrogen as a result of the oxidation of $Fe^0$ (Reardon, 1996), which was then used as a primary substrate for CF cometabolism. The detection of hydrogen in the incubations to which $Fe^0$ was added (FIG. 4C) and the stimulation of CF degradation when hydrogen was added directly support these conclusions (FIG. 5).

Reductive dechlorination is an electron-consuming process, the stimulation of which by the addition of an exogenous electron donor is common (Bagley and Gossett, 1995; Freedman and Gossett, 1989; Fathepure and Boyd, 1988). Although $H_2$ stimulated CF degradation, CF inhibited hydrogen consumption and methane production (FIG. 4C and FIG. 4D), which is a common effect of CF on methanogenic systems (Hughes and Parkin, 1996; Bauchop, 1967; Thiel, 1969; Swanwick and Foulkes, 1971; Prins et al., 1972; Yang and Speece, 1986; Hickey et al., 1987). It should be noted that, while the consumption of $H_2$ in incubations containing CF is not noticeable (FIG. 10C), only 1 nmol of $H_2$ is required for the reduction of 1 nmol of $CHCl_3$ to $CH_2Cl_2$, according to $$CHCl_3 + H_2 \rightarrow CH_2Cl_2 + H^+ + Cl^- \qquad \text{(Equation 17)}$$

Consequently, during the first 3 d, for example, a negligible amount (about 0.1%) of the $H_2$ produced (at least 60 $\mu$mol of $H_2$) would have been required for the degradation of about 80 nmol of CF.

The studies conducted with microbial inhibitors support the hypothesis that methanogenic bacteria were responsible for cathodic hydrogen consumption and CF dechlorination using cathodic hydrogen as electron donor. Vancomycin, shown by Murray and Zinder (1984) to inhibit eubacteria at the concentration used in this study, 100 mg/L, had little or no impact on cathodic hydrogen consumption or methanogenesis when added alone to bottles containing iron (FIG. 12A and FIG. 12B). In contrast, BESA, a methanogenic inhibitor, inhibited both of these processes to a similar degree regardless if added alone or with vancomycin (FIG. 12A and FIG. 12B). Similar results were seen in treatments to which hydrogen was added directly: vancomycin had no impact on hydrogen consumption or methanogenesis when added alone, while both of these processes were inhibited in bottles that contained BESA alone or BESA and vancomycin (FIG. 13A, FIG. 13B). Utilization of hydrogen by methanogens for metabolic purposes may account for the decrease in hydrogen concentration in the BESA-inhibited incubations in the early stage of this study. Acetate, a product of homoacetogens, was not detected. Furthermore, vancomycin by itself had no impact on CF degradation as compared to an inhibitor-free control (FIG. 13C). In contrast, CF degradation was inhibited to the same degree in bottles containing BESA alone or BESA and vancomycin, compared to an inhibitor-free control (FIG. 7C). The slow rate of CF degradation in the BESA-inhibited bottles supports the hypothesis that methanogens were responsible for CF degradation. BESA is a structural analogue of coenzyme M (2-mercaptoethane sulfonic acid) (Sparling and Daniels, 1987), which is unique to methanogens (Balch and Wolfe, 1979). The prosthetic group of methyl reductase is coenzyme $F_{430}$ (Ellefson et al., 1982), a nickel porphynoid that facilitates the reduction of CF and other chlorinated aliphatics in abiotic studies when a bulk reducing agent such as titanium (III) citrate or dithiothreitol is provided (Krone et al., 1989a; Gantzer and Wackett, 1991). Methanogens contain other metallocoenzymes, such as cobalt corronoids, that are not directly affected by BESA and that have also been shown to reduce CF and other chlorinated aliphatics (Gantzer and Wackett, 1991; Krone et al., 1989b; 1991; Assaf-Anid et al., 1994; Chiu and Reinhard, 1995; 1996; Stromeyer et al., 1992; Lewis et al., 1996). Hence, although BESA may completely inhibit methanogenesis and $F_{430}$-mediated CF reduction, BESA may not stop the degradation of CF by pure or mixed methanogenic cultures.

The extent of CF removal in the microbial steel wool column was consistently greater than in the abiotic column during the 60-d experimental period. This illustrates that CF cometabolism by anaerobic bacteria using cathodic hydrogen as the sole electron donor is sustainable, a finding that was uncertain based on the batch studies where methanogenesis was strongly inhibited in the presence of CF (FIG. 10A, FIG. 10B, FIG. 10C, and FIG. 10D). The increase in the concentration of methane in the effluent from the microbial steel wool column no doubt reflects the growth of hydrogenotrophic methanogens within the column as well as acclimation to CF. Based on the presumed increase in methanogenic biomass during the study, it is reasonable to assume that higher influent CF concentrations than those studied here could be reduced to nondetectable levels in the effluent.

This example illustrates the utility of microbial metallic iron treatment systems as an advantage over abiotic zero-valent iron schemes. In a field-scale application of this technology, cells grown in a fermenter or sludge from an anaerobic digester could be injected into a permeable, iron-containing, reactive barrier similar to the reactor originally proposed by Blowes et al. (1995). For some compounds, combined microbial abiotic systems may accelerate the rate of transformation and extent of mineralization; dichloromethane, a CF dechlorination product, does not undergo measurable abiotic transformation by iron (Matheson and Tratnyek, 1994) but can be utilized as a growth substrate by acclimated anaerobes (Freedman and Gossett, 1991; Stromeyer et al., 1991; Braus-Stromeyer et al., 1993; Maegli et al., 1995). Conversely, anaerobic bacteria reduct TCE to ethene or ethane via dichloroethylene and vinyl chloride (Freedman and Gossett, 1989; Wild et al., 1995), while abiotic iron systems reduce TCE to ethene and ethane without the production of these intermediates (Orth and Gillham, 1995).

6.0 REFERENCES

The following references, to the extent that they provide exemplary procedural or other details supplementary to those set forth herein, are specifically incorporated herein by reference:

U.S. Pat. No. 4,554,101, issued Nov. 19, 1985.
Adelman, Hayflick, Vasser, Seeburg, "In vitro deletional mutagenesis for bacterial production of the 20,000-dalton form of human pituitary growth hormone," *DNA,* 2(3): 183–193, 1983.
Aguilar, Casas, Lema, "Degradation of volatile fatty acids by differently enriched methanogenic cultues: Kinetics and inhibition," *Water Res.,* 29(2):505–509, 1995.
Alvarez and Vogel, "Substrate interactions of Benzene, Toluene, and para-Xylene during microbial degradation by pure cultures and mixed culture aquifer slurries," *Appl. Environ. Microbiol.,* 57(10):2981–2985, 1991.
APHA, *Standard Methods for the Examination of Water and Wastewater,* 16th ed., American Public Health Association, Washington, D.C., 1985.
Assaf-Anid, Hayes, Vogel, "Reductive dechlorination of carbon tetrachloride by cobalmin (II) in the presence of dithiothreitol: Mechanistic study, effect of redox potential and pH," *Environ. Sci. Technol.,* 28(2):246–252, 1994.
Bagley and Gossett, "Chloroform degradation in methanogenic enrichment cultures and by *Methanosarcina barkeri* 227," *Appl. Environ. Microbiol.,* 61:3195–3201, 1995.
Balch and Wolfe, "Specificity and biological distribution of coenzyme M (2-mercaptoethanesulfonic acid)," *J. Bacteriol.,* 137(1):256–263, 1979.
Bauchop, "Inhibition of rumen methanogenesis by methane analogues," *J. Bacteriol.,* 94(1):171–175, 1967.
Belay and Daniels, "Elemental metals as electron sources for biological methane formation from carbon dioxide," *Antonie van Leeuwenhoek,* 57(1):1–8, 1990.
Blowes, Ptacek, Cherry, Gillham, Robertson, In: *Geoenvironment 2000: Characterization, Containment, Remediation, and Performance in Environmental Geotechnics,* Yalcin B A, Daniel D E, eds., Geotechnical Special Publication No. 46, American Society of Civil Engineers, New York, 2:1608–1621, 1995.
Bock and Kandler, In: *The Bacteria: A Treatise on Structure and Function, Volume VIII, Archaebacteria,* Woese C R, Wolfe R S, eds, Academic Press, New York, pp. 525–544, 1985.
Bolivar, Rodriguez, Greene, Betlach, Heynecker, Boyer, "Construction and characterization of new cloning vehicles. II. A multipurpose cloning system," *Gene,* 2(2): 95–113, 1977.
Bouwer and McCarty, "Transformations of 1- and 2-carbon halogenated aliphatic organic compounds under methanogenic conditions," *Appl. Environ. Microbiol.,* 45:1286–1294, 1983.
Bouwer, Rittmann, McCarty, "Anaerobic degradation of halogenated 1 carbon and 2 carbon organic compounds," *Environ. Sci. Technol.,* 15(5):596–599, 1981.
Braus-Stromeyer, Hermann, Cook, Leisinger, "Dichloromethane as the sole carbon source for an acetogenic mixed culture and isolation of a fermentative, dichloromethane-degrading bacterium," *Appl. Environ. Microbiol.,* 59(11):3790–3797, 1993.
Brock et al., "Biology of Microorganisms" 7th Edition, Prentice Hall, Inc., Englewood Cliffs, N.J., 1994.
Capecchi, M. R., "High efficiency transformation by direct microinjection of DNA into cultured mammalian cells," *Cell,* 22(2):479–488, 1980.
Chang, Nunberg, Kaufman, Erlich, Schimke, Cohen, "Phenotypic expression in *E. coli* of a DNA sequence coding for mouse dihydrofolate reductase," *Nature,* 275:617–624, 1978.
Chiu and Reinhard, "Metallocoenzyme-mediated reductive transformation of carbon tetrachloride in titanium (III) citrate aqueous solution," *Environ. Sci. Technol.,* 29(3): 595–603, 1995.
Chiu and Reinhard, *Environ. Sci. Technol.,* 30:1882–1889, 1996.
Chou and Fasman, "Conformational Parameters for Amino Acides in Helical, β-Sheet, and Random Coil Regions Calculated from Proteins," *Biochemistry,* 13(2):211–222, 1974b.
Chou and Fasman, "Empirical Predictions of Protein Conformation," *Ann. Rev. Biochem.,* 47:251–276, 1978b.
Chou and Fasman, "Prediction of β-Turns," *Biophys. J.,* 26:367–384, 1979.
Chou and Fasman, "Prediction of Protein Conformation," *Biochemistry,* 13(2):222–245, 1974a.
Chou and Fasman, "Prediction of the Secondary Structure of Proteins from Their Amino Acid Sequence," *Adv. Enzymol. Relat. Areas Mol. Biol.,* 47:45–148, 1978a.
Clesceri et al., *Standard Methods for the Examination of Water and Wastewater,* APHA-AWWA-WPCF, 17th Edition, 1989.
Criddle et al., "Transformation of carbon tetrachloride by Pseudomonas sp. strain KC under denitrifying conditions," *Appl. Environ. Microbiol.,* 56:3240–3246, 1990.
Daniels et al., "Bacterial methanogenesis and growth from $CO_2$ with elemental iron as the sole source of electrons," *Science,* 237:509–511, 1987.

DiStefano, Gossett, Zinder, "Hydrogen as an electron donor for dechlorination of tetrachloroethene by an anaerobic mixed culture," *Appl. Environ. Microbial.*, 58(11): 3622–3629, 1992.

Doong and Wu, "Reductive dechlorination of chlorinated hydrocarbons in aqueous solutions containing ferrous and sulfide ions," *Chemosphere*, 24:1063–1075, 1992.

Egli, Scholtz, Cook, Leisinger, "Anaerobic dechlorination of tetrachloromethane and 1,2-dichloroethane to degradable products by pure cultures of Desulfobacterium sp. and Methanobacterium sp." *FEMS Microbiol. Lett.*, 43:257–261, 1987.

Egli, Stromeyer, Cook, Leisinger, "Transformation of tetrachloromethane and trichloromethane to carbon dioxide by anaerobic bacteria is a non-enzymatic process," *FEMS Microbiol. Lett.*, 68(1–2):207–212, 1990.

Egli, Tschan, Scholtz, Cook, Leisinger, "Transformation of tetrachloromethane to dichloromethane and carbon dioxide by *Acetobacterium woodii*," *Appl. Environ. Microbiol.*, 54(11):2819–2824, 1988.

Eglitis and Anderson, "Retroviral vectors for introduction of genes into mammalian cells," *Biotechniques*, 6(7): 608–614, 1988.

Eglitis, Kantoff, Kohn, Karson, Moen, Lothrop, Blaese, Anderson, "Retroviral-mediated gene transfer into hemopoietic cells," *Avd. Exp. Med. Biol.*, 241:19–27, 1988.

Eichenlaub, "Mutants of the mini-F plasmid pML31 thermosensitive in replication," *J. Bacteriol.*, 138(2): 559–566, 1979.

Ellefson, Whitman, Wolfe, "Nickel-containing factor $F_{430}$: chromophore of the methylreductase of Methanobacterium," *Proc. Natl. Acad. Sci. USA*, 79(12): 3707–3710, 1982.

Fathepure and Boyd, "Dependence of tetrachloroethylene dechlorination on methanogenic substrate consumption by Methanosarcina sp. strain DCM," *Appl. Environ. Microbiol.*, 54(12):2976–2980, 1988.

Fathepure, Tiedje, Boyd, "Reductive dechlorination of hexachlorobenzene to tri- and dichlorobenzenes in anaerobic sewage sludge," *Appl. Environ. Microbiol.*, 54(2):327–330, 1988.

Fathepure and Tiedje, "Reductive dechlorination of tetrachloroethylene by a chlorobenzoate-enriched biofilm reactor," *Environ. Sci. Technol.*, 28:746–752, 1994.

Fiers, Contreras, Haegemann, Rogiers, Van de Voorde, Van Heuverswyn, Van Herreweghe, Volckaert, Ysebaert, "Complete nucleotide sequence of SV40 DNA," *Nature*, 273(5658):113–120, 1978.

Freedman and Gossett, "Biological reductive dechlorination of tetrachloroethylene and trichloroethylene to ethylene under methanogenic conditions," *Appl. Environ. Microbiol.*, 55(9):2144–2151, 1989.

Freedman and Gossett, "Biodegradation of dichloromethane and its utilization as a growth substate under methanogenic conditions," *Appl. Environ. Microbiol.*, 57(10): 2847–2857, 1991.

Fromm, Taylor, and Walbot, "Expression of genes transferred into monocot and dicot plant cells by electroporation," *Proc. Natl. Acad. Sci. USA*, 82(17): 5824–5828, 1985.

Galli and McCarty, "Biotransformation of 1,1,1-trichloroethane, trichloromethane, and tetrachloromethane by a Clostridium sp.," *Appl. Environ. Microbiol.*, 55:837–844, 1989.

Gantzer and Wackett, "Reductive dechlorination catalyzed by bacterial transition-metal coenzymes," *Environ. Sci. Technol.*, 25(4):715–722, 1991.

Gefter, Margulies, Scharff, "A simple method for polyethylene glycol-promoted hybridization of mouse myeloma cells," *Somat. Cell Genet.*, 3(2):231–236, 1977.

Gillham and O'Hannesin, "Enhanced degradation of halogenated aliphatics by zero-valent iron," *Groundwater*, 32(6):958–967, 1994.

Goeddel, Heyneker, Hozumi, Arentzen, Itakura, Yansura, Ross, Miozzari, Crea, Seeburg, "Direct expression in *Escherichia coli* of a DNA sequence for human growth hormone," *Nature*, 281(5732):544–548, 1979.

Goeddel, Shepard, Yelverton, Leung, Crea, Sloma, Pestka, "Synthesis of human fibroblast interferon by *E. coli*," *Nucl. Acids Res.*, 8(18):4057–4074, 1980.

Goel, Kumar, Payne, and Dube, "Plant cell biodegradation of a xenobiotic nitrate ester, nitroglycerin," *Nature Biotechnology*, 15:174–177, 1977.

Gorby and Lovely, "Enzymatic uranium precipitation," *Environ. Sci. Technol.*, 30:205–207, 1992.

Gossett, "Anaerobic degradation of C1 and C2 chlorinated hydrocarbons," ESL-TR-85-38, Air Force Engineering and Services Center, Tyndall Air Force Base, Fla., 1985.

Gould, "The kinetics of hexavalent chromium reduction by metallic iron," *Water Res.*, 26:871–877, 1992.

Graham and van der Eb, "Transformation of rat cells by DNA of human adenovirus 5," *Virol.*, 54(2):536–539, 1973.

Green, Issemann, Sheer, "A versatile in vivo and in vitro eukaryotic expression vector for protein engineering," *Nucl. Acids Res.*, 16(1):369, 1988.

Guan et al., "Sorption rates for the uptake of $Cr^{+6}$ by a consortia of denitrifying bacteria," *Biotechnol. Lett.*, 15(7):733–736, 1993.

Hamilton, "Sulphate-reducing bacteria and anaerobic corrosion," *Annu. Rev. Microbiol.*, 39:195–217, 1985.

Hansen, Koch, Borggaard, and Sorensen, "Abiotic nitrate reduction to ammonium: Key role of green rust," *Envir. Sci. Technol.*, 30(6):2053–2056, 1996.

Helland et al., "Reductive dechlorination of carbon tetrachloride with elemental iron," *J. Hazard Mater.*, 41:205–216, 1995.

Hess et al., *J. Adv. Enzyme Reg.*, 7:149, 1968.

Hickey, Vanderwielen, Switzenbaum, "The effects of organic toxicants on methane production and hydrogen gas levels during the anaerobic digestion of waste activated sludge," *Water Res.*, 21(11):1417–1428, 1987.

Hitzeman, Clarke, Carbon, "Isolation and characterization of the yeast 3-phosphoglycerokinase gene (PGK) by an immunological screening technique," *J. Biol. Chem.*, 255 (24):12073–12080, 1980.

Holland and Holland, "Isolation and identification of yeast messenger ribonucleic acids coding for enolase, glyceraldehyde-3-phosphate dehydrogenase, and phosphoglycerate kinase," *Biochemistry*, 17(23):4900–4907, 1978.

Holliger et al., "A highly purified enrichment culture couples the reductive dechlorination of tetrachloroethylene," *Appl. Environ. Microbiol.*, 59:2991–2997, 1993.

Holliger, "The anaerobic microbiology and biotreatment of chlorinated ethenes," *Curr. Opin. Biotechnol.*, 6:347–351, 1995.

Hughes and Parkin, "Concentration effects on chlorinated aliphatic transformation kinetics," *J. Environ. Eng.*, 122:92–98, 1996.

Ishibashi, Cervantes, Silver, "Chromium reduction in *Pseudomonas putida*," *Appl. Environ. Microbiol.*, 56(7): 2268–2270, 1990.

Itakura, Hirose, Crea, Riggs, Heyneker, Bolivar, Boyer, "Expression in *Escherichia coli* of a chemically synthesized gene for the hormone somatostatin," *Science,* 198 (4321):1056–1063, 1977.

Johnson et al., "Kinetics of halogenated organic compound degradation by iron metal." *Environ. Sci. Technol.,* 30:2634–2640, 1996.

Jones, "Proteinase mutants of *saccharomyces-cerevisiae,*" *Genetics,* 85(1):23–33, 1977.

Kaplan et al., "Formation of a barrier to groundwater contaminants by injection of zero-valent iron colloids: suspension properties," *Proc. In Situ Remediation: Scientific Basis for Current and Future Technologies Symposium. Thirty-third Hanford Symposium on Health and the Environment;* Nov. 7–11, 1994.

Katz, "The analytical biochemistry of chromium," *Environmental Health Perspectives,* 92L13–16, 1991.

Kazi and Katz, "The biocycling of some micronutrients and some toxic elements from sewage sludge used as agricultural fertilizers," Second International Conference on Health Disease, Karachi, 1987.

Khudenko, "Mathematical models of cementation processes," *ASCE J. Environ. Engrg.,* 113:681–702, 1987.

Kingsman, Clarke, Mortimer, Carbon, "Replication in *Saccharomyces cerevisiae* of plasmid pBR313 carrying DNA from the yeast trp1 region," *Gene,* 7(2):141–152, 1979.

Koch and Hansen, "Reduction of nitrate to ammonium by sulphate green rust," *Advances in GeoEcology,* 30:373–393, 1997.

Kohler and Milstein, "Continuous cultures of fused cells secreting antibody of predefined specificity," *Nature,* 256 (5517):495–497, 1975.

Kohler and Milstein, "Derivation of specific antibody-producing tissue culture and tumor lines by cell fusion," *Eur. J. Immunol.,* 6(7):511–519, 1976.

Kriegman-King and Reinhard, "Abiotic transformation of carbon tetrachloride at mineral surfaces," U.S. EPA, EPA/600/SR-94/018, March, 1994.

Krone, Laufer, Thauer, Hogenkamp, "Coenzyme $F_{430}$ as a possible catalyst for the reductive dechlorination of chlorinated $C_1$ hydrocarbons in methanogenic bacteria," *Biochemistry,* 28(26):10061–10065, 1989a.

Krone, Thauer, Hogenkamp, "Reductive dehalogenation of chlorinated C-1-hydrocarbons mediated by corrinoids," *Biochemistry* 28(11):4908–4914, 1989b.

Krone, Thauer, Hogenkamp, Steinbach, "Reductive formation of carbon monoxide from carbon tetrachloride and freons 11, 12 and 13 catalyzed by corrinoids," *Biochemistry,* 30(10):2713–2719, 1991.

Lewis, Morra, Brown, "Comparative product analysis of carbon tetrachloride dehalogenation catalyzed by cobalt corrins in the presence of thiols or titanium (III) reducing agents," *Environ. Sci. Technol.,* 30(1):292–300, 1996.

Lewis, David G., "Factors influencing the stability and properties of green rust," *Advances in GeoEcology,* 30:345–372, 1997.

Lieber et al., "Cadmium and hexavalent chromium in Nassau County groundwater," *Water Works Assoc.,* 56:739–747, 1964.

Longmire et al., "Hydrogeochemical Interactions and Evolution of Acidic Solutions in Soil," In: *Chemical Modeling of Aqueous Systems II,* Melchior and Bassett, (Eds.), ACS Symposium Series 416, American Chemical Society, Washington, D.C., pp. 154–168, 1990.

Lorowitz, Nagle, Tanner, "Anaerobic oxidation of elemental metals coupled to methanogenesis by *methanobacterium-thermoautotrophicum,*" *Environ. Sci. Technol.,* 26(8): 1606–1610, 1992.

Lovely and Phillips, "Bioremediation of uranium contamination with enzymatic uranium reduction," *Environ. Sci. Technol.,* 26:2228–2234, 1992b.

Lovely and Phillips, "Reduction of Uranium by *Desulfovibrio desulfuricans,*" *Appl. Environ. Microbiol.,* 58:850–856, 1992a.

Maegli, Rainey, Leisinger, "Acetogenesis from dichloromethane by a two-component mixed culture comprising a novel bacterium," *Appl. Environ. Microbiol.,* 61(8): 2943–2949, 1995.

Maloy et al., "Microbial Genetics" 2nd Edition. Jones and Barlett Publishers, Boston, Mass., 1994.

Maloy, In: *Experimental Techniques in Bacterial Genetics,* Jones and Bartlett Publishers, Boston, Mass., 1990.

Maniatis et al., "Molecular Cloning: a Laboratory Manual," Cold Spring Harbor Laboratory, Cold Spring Harbor, N.Y., 1982.

Matheson and Tratnyek, "Reductive dehalogenation of chlorinated methanes by iron metal," *Environ. Sci. Technol.,* 28:2045–2053, 1994.

Matheson, Leah J., "Abiotic and biotic processes affecting the dechlorination of chlorinated solvents by zero-valent iron," *Abstracts of Papers,* 20th ACS National Meeting, American Chemical Society, Mar. 13–17, 1994, Abstract No. 135.

Metcalf and Eddy, Inc., *Wastewater engineering: treatment, disposal, and reuse,* 3rd ed., McGraw-Hill, New York, 1991.

Mikesell and Boyd, "Dechlorination of chloroform by Methanosarcina strains," *Appl. Environ. Microbiol.,* 56:1198–1201, 1990.

Morrison, Spangler, and Tripathi, "Coupled Reaction/Transport Modeling of a Chemoical Barrier for Controlling Uranium (VI) contamination in Groundwater:. *J. Contaminant Hydrology,* 17:343–363, 1995.

MSE Technology Applications. "Analysis of Technologies for the Emplacement and Performance Assessment of Subsurface Reactive Barriers for DNAPL Containment". Report for U.S. Department of Energy (TTP# PE1-6-PL-341) under Contract No. DE-AC22-88ID12735, 1996.

Murray and Zinder, "Nitrogen fixation by a methanogenic archaebacterium," *Nature,* 312(5991):284–286, 1984.

Myneni, Tokunaga, and Brown, "Abiotic selenium redox transformations in the presence of Fe(II,III) oxides," *Science,* 278:1106–1109, 1997.

National Research Council, "Alternatives for groundwater cleanup," *Report of the National Academy of Science Committee on Groundwater Cleanup Alternatives,* National Academy Press, Washington, D.C., 1994.

O'Hannesin and Gillham, "A permeable reaction wall for in situ degradation of halogenated organic compounds," *Proc. 5th Canadian Geotechnical Society Conference,* Toronto, Ontario, Canada, 1992.

Olowe, Benbouzid-Rollet, Génin, Prieur, Confente and Resiak, "La présence simultanée de rouille verte 2 et de bactéries sulfato-réductrices en corrosion perforante de palplanches en zone portuaire," *C.R. Acad. Sci. Paris,* t. 314, Série II, pl. 1157j-1163, 1992.

Ormerod, "Science and secrecy," *Nature,* 350(6319): 551–552, 1991.

Orth and Giliham, "Dechlorination of trichloroethylene in aqueous solution using Fe(0)," *Environ. Sci. Technol.,* 30:66–71, 1996.

Perkins, Koimisar, Puhakka, Ferguson, "Effects of electron donors and inhibitors on reductive dechlorination of 2,4, 6-trichlorophenol," *Water Res.,* 28(10):2101–2107, 1994.

Powell et al., "Coupled iron corrosion and chromate reduction: mechanisms for subsurface remediation," *Environ. Sci. Technol.,* 29:1913–1922, 1995.

Powell, R. M. & Puls, R. W. Proton Generation by Dissolution of Intrinsic or Augmented Aluminosilicate Ninerals for In Situ Contaminant Generation by Zero-Valence-State Iron," *Environ. Sci. Technol.* 1997, 31 (8), 2244–2251.

Prins, van Nevel, Demeyer, "Pure culture studies of inhibitors for methanogenic bacteria," *Antonie van Leeuwenhoek*, 38(3):281–287, 1972.

Prokop and Bajpai, "Recombinant DNA Technology I: Conference on Progress in Recombinant DNA Technology and Application," Potosi, Mo., Jun. 3–8, 1990, *Annu. N.Y. Acad. Sci.,* 646:1–383, 1991.

Rajagopal and LeGall, "Utilization of cathodic hydrogen by hydrogen-oxidizing bacteria," *Appl. Microbiol. Biotechnol.,* 31:406–412, 1989.

Rawn, In: *Biochemistry,* Harper & Row Publishers, New York, 1983.

Reardon, *J. Environ. Sci. Technol.,* 29:2936–2945, 1996.

Rhodes and Carty, "The corrosion of certain metals by carbon tetrachloride," *Ind. Eng. Chem.,* 17:909–911, 1925.

Rickard and Fuerstran, "An electrochemical investigation of copper cementation by iron," *Trans. Metallurg. Soc. AIME,* XX:1487–1493, 1968.

Riley, Zachara, Wobber, "Chemical contaminants on DOE lands and selection of contaminant mixtures for subsurface science research," DOE/ER-0547T; U.S. DOE; Office of Energy Research, Washington, D.C., 1992.

Roberts, Totten, Arnold, Burris, Campbell, "Reductive elimination of chlorinated ethylenes by zero-valent metals," *Environ. Sci. Technol.,* 30(8):2654–2659, 1996.

Sambrook et al., "Molecular Cloning: A Laboratory Manual," Cold Spring Harbor Laboratory, Cold Spring Harbor, N.Y., 1989.

Scholz-Muramatsu, "Isolation and characterization of *Dehalospirillum multivorans* gen. nov, sp. nov, a tetrachloroethene-utilizing, strictly anaerobic bacterium," *Arch. Microbiol.,* 163:48–56, 1995.

Schuppler, Wagner, Schön and Göbel, "In situ identification of nocardioform actinomycetes in activated sludge using fluorescent rRNA-targeted oligonucleotide probes," *Microbiology,* 144:249–259, 1998.

Segal, In: *Biochemical Calculations,* 2nd Edition, John Wiley & Sons, New York, 1976.

Siegrist and McCarty, "Column methodologies for determining sorption and biotransformation potential for chlorinated aliphatic compounds in aquifers," *J. Contam. Hydrol.,* 2:31–50, 1987.

Sparling and Daniels, "The specificity of growth inhibition of methanogenic bacteria by bromoethanesulfonate," *Can. J. Microbiol.,* 33(12):1132–1136, 1987.

Spoerel and Kafatos, "Identification of genomic sequences corresponding to cDNA clones," *Methods Enzymol.,* 152:588–597, 1987.

Stinchcomb, Struhi, Davis, "Isolation and characterization of a yeast chromosomal replicator," *Nature,* 282(5734):39, 1979.

Stromeyer, Stumpf, Cook, Leisinger, "Anaerobic degradation of tetrachloromethane by *Acetobacterium-Woodii* separation of dechlorinative activities in cell extracts and roles for vitamin B-12 and other factors," *Biodegradation,* 3(1):113–123, 1992.

Stromeyer, Winkelbauer, Kohler, Cook, Leisinger, "Dichloromethane utilized by an anaerobic mixed culture: acetogenesis and methanogenesis," *Biodegradation,* 2(2):129–137, 1991.

Swanwick and Foulkes, "Inhibition of anaerobic digestion of sewage sludge by chlorinated hydrocarbons," *Water Pollut. Control,* 70:58–68, 1971.

Sweeny, "The reductive treatment of industrial wastewaters. II process applications," *AIChE Symp. Ser.,* 77:72–78, 1980.

Tatara, Dybas, Criddle, "Effects of medium and trace metals on kinetics of carbon tetrachloride transformation by psudomonas-SP strain KC," *Appl. Environ. Microbiol.,* 59(7):2126–2131, 1993.

Thiel, *Water Res.,* 3:215–223, 1969.

Thomas and Macaskie, "Biodegradation of tributyl phosphate by naturally occurring microbial isolates and coupling to the removal of uranium from aqueous solution," *Environ. Sci. Technol.,* 30:2371–2375, 1996.

Till B. A., L. J. Weathers, and P. J. J. Alvarez (1998). $Fe^0$-supported autotrophic denitrification. *Environ. Sci. Technol.,* 32(5), 634–639.

Trolard, Abdelmoula, Bourrié, Humbert and Génin, "Mise en évidence d'un constituant de type << rouilles vertes << dans les sols hydromorphes. Proposition de l'existence d'un nouveau minéral: la << fougérite >>," Trolard, Abdelmoula, Bourrié, Humbert and Génin," *C.R. Acad. Sci. Paris,* t. 323, série II a, p. 1015 à 1022, 1996.

Tschumper and Carbon, "Sequence of a yeast DNA fragment containing a chromosomal replicator and the TRP1 gene," *Gene,* 10(2):157–166, 1980.

Van Genutchen and Parker, "Boundary conditions for displacement experiments through short laboratory columns," *Soil Sci. Soc. Am. J.,* 48:703–708, 1984.

Vidic and Pohland, "Treatment Walls", *Groundwater Remediation Technologies Analysis Center,* Technology Evaluation Report TE-96-01. Uiniversity of Pittsburgh, Pittsburgh, Pa., October 1996.

Vogel et al., "Transformations of halogenated aliphatic compounds," *Environ. Sci. Technol.,* 21:722–736, 1987.

Wang, Mori, Komori, Sasatsu, Toda, Ohtake, "Isolation and characterization of an *Enterobacter cloacae* strain that reduces hexavalent chromium under anaerobic conditions," *Appl. Environ. Microbiol.,* 55(7):1665–1669, 1989.

Warwick, Bowen, McVeigh and Empley, "A phylogenetic analysis of the family Pseudonocardiaceae and the gnera Actinokineospora and Saccharothrix with 16S rRNA sequences and a proposal to combine the genera Amycolata and Pseudonocardia in an emended genus Pseudonocardia," *Int. J. Syst. Bacteriol.,* 44(2):293–299, 1994.

Weathers and Parkin, "Metallic iron-enhanced biotransformation of carbon tetrachloride and chloroform under methanogenic conditions," In: *Bioremediation of Chlorinated Solvents,* Hinchee et al. (Eds.), CRC Press, pp. 117–122, 1995.

Weathers and Parkin, In: *Bioremediation of Chlorinated Solvents,* Hinchee R E, Leeson A, Semprini L, (Eds.), CRC Press, Boca Raton, Fla., pp. 117–122, 1995.

Weathers, Parkin, Novak, and Alvarez, "Chloroform cometabolism by a methanogenic consortium utilizing zero-valent iron as ultimate electron donor," *Abst. Gen. Meet. Am. Soc. Microbiol.,* 95(0):399, 1995a.

Weathers, Parkin, Novak, and Alvarez, "Methanogens couple anaerobic Fe(0) oxidation and $CHCl_3$ reduction," *Abst. Papers Am. Chem. Soc.,* 209(1–2):ENVR225, 1995b.

Weathers, Ph.D. Dissertation, University of Iowa, 1995.

Wild, Winkelbauer, Leisinger, "Anaerobic dechlorination of trichloroethene, tetrachloroethene and 1,2-dichloroethane by an acetogenic mixed culture in a fixed-bed reactor," *Biodegradation,* 6(4):309–318, 1995.

Wong and Neumann, "Electric field mediated gene transfer," *Biochim. Biophys. Res. Commun.,* 107(2):584–587, 1982.

Yamamoto et al., "Kinetics and modeling of hexavalent chromium reduction in *Enterobacter cloacae*," *Biotechnol. Bioeng.*, 41:129–133, 1993.

Yang and Speece, "The effects of chloroform toxicity on methane fermentation," *Water Res.*, 20(10):1273–1280, 1986.

Zhang, Liu, Logan, Mazumnder and Phelps, "Enhancement of Fe(III), Co(III), and Cr(VI) reduction at elevated temperatures and by a thermophilic bacterium," *Appl. Biochem. Biotech.*, 57/58:923–932, 1996.

Zinder, Anguish, Cardwell, "Selective inhibition by 2 bromo ethanesulfonate of methanogenesis from acetate in a thermophilic anaerobic digestor," *Appl. Environ. Microbiol.*, 47(6):1343–1345, 1984.

Zinder, In: *Methanogenesis*, Ferry (Ed.), Chapman and Hall, New York, pp. 128–206, 1993.

All of the compositions, methods and apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions, methods and apparatus and in the steps or in the sequence of steps of the methods described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A device comprising a composition comprising one or more autotrophic hydrogenotrophic bacteria in culture medium comprising zero-valent iron, wherein said device is comprised within a water-, wastewater- or sewage-treatment system or a system for remediating pollution in an aqueous solution or an environmental site.

2. The device in accordance with claim 1, wherein said hydrogenotrophic bacteria comprise one or more species of bacteria selected from the group consisting of Acetobacterium spp., Achromobacter spp., Aeromonas spp., Acinetobacter spp., Aureobacterium spp., Bacillus spp., Comamonas spp., Dehalobacter spp., Dehalospirillum spp., Dehalococcoide spp., Desulfurosarcina spp., Desulfomonile spp., Desulfobacterium spp., Enterobacter spp., Hydrogenobacter spp., Methanosarcina spp., Pseudomonas spp., Shewanella spp., Methanosarcina spp., Micrococcus spp., and Paracoccus spp.

3. The device of claim 2, wherein said hydrogenotrophic bacteria comprise one or more strains of bacteria selected from the group consisting of *Acetobacterium woodi, Aeromonas hydrophila, Aeromonas sobria, Alcaligenes eutrophus, Comamonas acidovorans, Dehalococcoide restrictus, Dehalococcoide multivorans, Dehalococcoide ethenogene, Desulfobacterium tiedje, Enterobacter agglomerans, Hydrogenobacter thermophilus, Methanosarcina barkeri, Methanosarcina mazei, Methanosarcina thermophila, Paracoccus denitrificans, Pseudomonas aureofaciens, Pseudomonas maltophilia, Pseudomonas mendocina,* and *Shewanella putrefaciens.*

4. The device of claim 3, wherein said hydrogenotrophic bacteria comprise *Paracoccus denitrifcans* ATCC17741, *Paracoccus denitrificans* ATCC35512, *Paracoccus denitrificans* ATCC 13543, or *Paracoccus denitrificans* ATCC 19367.

5. The device of claim 1, wherein said zero-valent iron comprises Fe(0) metal, an Fe(0) alloy, or an Fe(0)—Ni(0), Fe(0)—Zn(0), Fe(0)—Pt(0), or Fe(0)—Pd(0) bimetal.

6. The device of claim 5, wherein said zero-valent iron comprises filings, shavings, turnings, wool, powder, mesh, beads, rods, pellets, or flakes.

7. The device of claim 1, further comprising a support.

8. The device of claim 7, further comprising a glass, concrete, metallic, zeolite, mineral, fiber, fiberglass, ceramic, plastic, polymeric, or resin support.

9. The device of claim 1, further defined as an ex situ bioreactor.

10. The device in accordance with claim 9, comprising an inlet port, an outlet port and a container means for containing said composition.

11. The device of claim 10, further defined as a continuous culture system, a flow-through packed column, an inline water filter, a biofermenter, a fluidized bed, a sequencing batch reactor, or an anaerobic digester.

12. The device of claim 1, comprised within a water-, wastewater- or sewage-treatment system.

13. The device in accordance with claim 12, comprised within a water treatment system, a sewage or wastewater treatment system, a municipal water supply system, or a pollution decontamination system.

14. The device of claim 1, comprised within a system for remediating pollution in an aqueous solution or an environmental site.

15. A device comprising a composition comprising one or more autotrophic hydrogenotrophic bacteria in culture medium comprising zero-valent iron, said device being comprised within an environmental site.

16. The device of claim 15, comprised within a landfill site, an agricultural site, an agricultural runoff site, or an irrigation site.

17. The device of claim 15, further defined as an in situ reactive barrier.

18. The device in accordance with claim 17, further defined as a permeable barrier, a semipermeable barrier, a treatment wall, and injected treatment zone, or a funnel and gate system.

19. A method of removing or reducing the concentration of an organic or inorganic compound in an environmental site, comprising providing to said site an effective amount of a composition comprising one or more hydrogenotrophic bacteria and zero-valent iron, or contacting said site with a device comprising a composition comprising culture medium comprising one or more hydrogenotrophic bacteria and zero-valent iron.

20. A method for denitrifying groundwater or an environmental site in situ comprising contacting said groundwater or said environmental site with a composition comprising zero-valent iron and a culture of one or more hydrogenotrophic bacteria, or contacting said site with a device comprising a composition comprising zero-valent iron and a culture of one or more hydrogenotrophic bacteria.

21. A method for removing or reducing the concentration of a nitrogen- or sulfur-containing compound in a sample, comprising contacting a sample suspected of containing said compound with a composition comprising zero-valent iron and a culture of one or more hydrogenotrophic bacteria, or contacting said site with a device comprising a composition comprising zero-valent iron and a culture of one or more hydrogenotrophic bacteria.

22. The method in accordance with claim 21, wherein said sulfur-containing compound is sulfate or sulfite.

23. A method for removing or reducing the concentration of a halocarbon compound in a sample, comprising contacting a sample suspected of containing said halocarbon with a composition comprising one or more autotrophic hydrogenotrophic bacteria and zero-valent iron, or contacting said sample with a device comprising a composition comprising culture medium comprising one or more autotrophic hydrogenotrophic bacteria and zero-valent iron.

24. The method in accordance with claim 23, wherein said halocarbon is carbon tetrachloride, dichloromethane, a polychlorinated biphenyl, a chlorinated benzene, trichloroethylene, perchloroethylene, dichloroethylene, vinyl chloride, chloroethane, bromoform, dichlorodifluoromethane, trihalomethanes, tetrachlorodibenzodioxin pentachlorophenol, a chlorobenzoate, atrazine, or 1,1,1-TCA.

25. The method of claim 24, wherein said halocarbon is carbon tetrachloride, dichloromethane, trichloroethylene, perchloroethylene, dichloroethylene, vinyl chloride, chloroethane, dichlorodifluoromethane, trihalomethanes, tetrachlorodiberzodioxin pentachlorophenol, a chlorobenzoate, atrazine, or 1,1,1-TCA.

26. The method of claim 25, wherein said halocarbon is carbon tetrachloride, trichloroethylene, or dichloromethane.

27. A method for removing or reducing the concentration of a haloaromatic compound in a sample, comprising contacting a sample suspected of containing said haloaromatic compound with a composition comprising zero-valent iron and a culture of one or more hydrogenotrophic bacteria, or contacting said sample with a device comprising a composition comprising zero-valent iron and a culture of one or more hydrogenotrophic bacteria.

28. The method in accordance with claim 27, wherein said haloaromatic compound is a polychlorinated biphenyl, a chlorinated benzene, tetrachlorodibenzodioxin pentachlorophenol, a chlorobenzoate, atrazine, or 1,1,1-TCA.

29. A method for degrading or detoxifying a pesticide, comprising contacting a sample suspected of containing said pesticide with a composition comprising zero-valent iron and a culture of one or more hydrogenotrophic bacteria, or contacting said sample with a device comprising a composition comprising zero-valent iron and a culture of one or more hydrogenotrophic bacteria.

30. The method in accordance with claim 29, wherein said pesticide is methoxyclor, alachlor, metolachlor, lindane, DDT, DDE, DDD, dieldrin, aldrin, heptachlor, chlordane, 2,4-dichlorophenoxyacetic acid, 2,4,5-trichlorophenoxyacetic acid or atrazine.

31. The method of claim 30, wherein said pesticide is atrazine.

32. A method for detoxifying a metal ion-containing compound, comprising contacting a sample suspected of containing said compound with a composition comprising zero-valent iron and a culture of one or more hydrogenotrophic bacteria, or contacting said sample with a device comprising a composition comprising zero-valent iron and a culture of one or more hydrogenotrophic bacteria.

33. The method in accordance with claim 32, wherein said compound comprises strontium (II), cesium (I), chromium (VI) uranium (VI), technetium (VII), silver (I), or mercury (II).

34. The method of claim 33, wherein said compound comprises chromium (VI) or uranium (VI).

35. A method for reducing the concentration of nitrite-, nitrate-, sulfite-, or sulfate-containing compound in an aqueous solution or environmental site, comprising (a) selecting an aqueous solution or an environmental site containing said compound; and (b) contacting said solution or site with a composition comprising zero-valent iron and a culture of one or more hydrogenotrophic bacteria, or contacting said solution or site with a device comprising a composition comprising zero-valent iron and a culture of one or more hydrogenotrophic bacteria.

36. A method for reducing the concentration of a pesticide or organic pollutant in an aqueous solution or environmental site, comprising (a) selecting an aqueous solution or an environmental site containing said pesticide or pollutant; and (b) contacting said solution or site with a composition comprising zero-valent iron and a culture of one or more autotrophic hydrogenotrophic bacteria, or contacting said solution or site with a device comprising a composition comprising zero-valent iron and a culture of one or more autotrophic hydrogenotrophic bacteria.

37. A method for reducing the concentration of a mercury-, silver-, technetium-, strontium-, cesium-, chromium- or uranium-containing pollutant in an aqueous solution or environmental site, comprising (a) selecting an aqueous solution or an environmental site containing said pollutant; and (b) contacting said solution or site with a composition comprising zero-valent iron and a culture of one or more hydrogenotrophic bacteria, or contacting said solution or site with a device comprising a composition comprising zero-valent iron and a culture of one or more hydrogenotrophic bacteria.

38. A method for reducing silver (I), mercury (II), technetium (VII), strontium (II), cesium (I), chromium (VI) or uranium (VI) ions in an aqueous solution, comprising contacting an aqueous solution suspected of containing one or more of said ions with a composition comprising zero-valent iron and a culture of one or more hydrogenotrophic bacteria, or contacting said aqueous solution with a device comprising a composition comprising zero-valent iron and a culture of one or more hydrogenotrophic bacteria.

39. A method for removing or reducing the concentration of a nitroaromatic compound in a sample comprising contacting a sample suspected of containing said nitroaromatic compound with one or more hydrogenotrophic bacteria and zero-valent iron, or a device comprising culture medium comprising zero-valent iron.

40. The method in accordance with claim 39, wherein said nitroaromatic compound is trinitrotoluene, RDX, HMX, 2-aminodintrotoluene, 4-aminodinitrotoluene, or parathion.

41. The method in accordance with claim 39, wherein said nitroaromatic compound is trinitrotoluene, RDX, or HMX.

* * * * *

UNITED STATES PATENT AND TRADEMARK OFFICE
CERTIFICATE OF CORRECTION

PATENT NO. : 6,719,902 B2
DATED : April 13, 2004
INVENTOR(S) : Pedro J. Alvarez et al.

It is certified that error appears in the above-identified patent and that said Letters Patent is hereby corrected as shown below:

<u>Column 49,</u>
Line 18, please delete "tetrachlorodiberzodioxin" and insert -- tetrachlorodibenzodioxin -- therefor.

Signed and Sealed this

Twenty-first Day of December, 2004

JON W. DUDAS
*Director of the United States Patent and Trademark Office*